United States Patent [19]

Krueger et al.

[11] Patent Number: 4,843,568
[45] Date of Patent: Jun. 27, 1989

[54] REAL TIME PERCEPTION OF AND RESPONSE TO THE ACTIONS OF AN UNENCUMBERED PARTICIPANT/USER

[76] Inventors: Myron W. Krueger, 55 Edith Rd., Vernon, Conn. 06066; Katrin Hinrichsen; Thomas S. Gionfriddo, both of 81 Willington Oaks, Storrs, Conn. 06268

[21] Appl. No.: 850,770

[22] Filed: Apr. 11, 1986

[51] Int. Cl.[4] .............................................. H04N 7/18
[52] U.S. Cl. ..................................... 364/518; 358/93; 358/107; 364/521
[58] Field of Search ............................... 364/518–522; 358/93, 107, 108, 81

[56] References Cited

U.S. PATENT DOCUMENTS

| | | | |
|---|---|---|---|
| 3,846,826 | 11/1974 | Mueller | 358/81 |
| 4,163,941 | 8/1979 | Linn, Jr. | 324/178 |
| 4,232,334 | 11/1980 | Dyson | 358/93 |
| 4,276,570 | 6/1981 | Burson et al. | 358/903 |
| 4,361,830 | 11/1982 | Honma et al. | 340/146.3 AC |
| 4,375,674 | 3/1983 | Thornton | 364/559 |
| 4,400,724 | 8/1983 | Fields | 358/85 |
| 4,405,940 | 9/1983 | Woolfson et al. | 358/93 |
| 4,533,944 | 8/1985 | Eby et al. | 358/107 |
| 4,539,585 | 9/1985 | Spackova et al. | 358/93 |
| 4,561,017 | 12/1985 | Greene | 358/93 |
| 4,670,781 | 6/1987 | Aubert et al. | 358/93 |
| 4,703,347 | 10/1987 | Yasuda et al. | 358/93 X |

OTHER PUBLICATIONS

W. Buxton, R. Hill and P. Rowley, "Issues and Techniques in Touch-Sensitive Tablet Input", *Computer Graphics*, vol. 19, No. 3 (ACM SIGGRAPH Conference Proceedings), Jul. 1985, pp. 215–224.

Bolt, R. A., "'Put-That-There': Voice and Gesture at the Graphics Interface", *Computer Graphics*, vol. 14, No. 3 (ACM SIGGRAPH Conference Proceedings), Jul. 1980, pp. 262–270.

Krueger, M. W., *Artificial Reality*, Addison-Wesley, Redding, Massachusetts 1983, Chapters 4, 9 and 11.

T. DeWitt and P. Edelstein, "Pantomation—A System for Position Tracking", *Proceedings of the Second Symposium on Small Computers in the Arts*, Oct. 1982, pp. 1–9.

Foley, James D., "Interfaces for Advanced Computing", *Scientific American*, Oct. 1987, pp. 127–130, 132.

Dagg, Anne Innis, *Running, Walking and Jumping—The Science of Locomotion*, Wykeham Publications, London, 1977, pp. 4–7.

Grieve, D. W., Miller, D. I., Mitchelson, D., Paul, J. P. and Smith, A. J., *Techniques for the Analysis of Human Movement*, Princeton Book Co. Publishers, Princeton, New Jersey, 1976, pp. 24, 25.

Krueger, M. W., Gionfriddo, T. and Hinrichsen, K., "Videoplace—An Artificial Reality", *CHI '85 Proceedings*, Apr. 1985, pp. 35–40.

*Primary Examiner*—Gary V. Harkcom
*Assistant Examiner*—H. R. Herndon
*Attorney, Agent, or Firm*—Fred A. Keire

[57] ABSTRACT

Apparatus and method for using an image of the human body to control real time computer events wherein data regarding a participant are acquired through any means of imaging without marking the participant or requiring that he or she use or wear a stimulus source, sensing device or special clothing. Perception and feature analysis are carried out by specialized circuitry and computer software, and response to perception is expressed using any device controllable by a computer. Participants generally are unaware of processing delays between action and reaction, and their perception of an event is similar to dealing with a human being or animate creature. Perception and response occur in real time with action and reaction closely coupled.

39 Claims, 28 Drawing Sheets

```
st39 (tickle
    acts-list (acts act1 (move-critter to *ophand*
182                                    speed (slow))
             actnum (1))
    trans-list (trans tran1 (tran test *no-ophand*
183                                state (choice))
               tran2 (tran test *nr-ophand*
                           state (tic1))
               tran3 (tran test (true)
                           state (tickle))
               trannum (3)))
```

```
;
; presence primitive -- find if a person is in the environment
;
(dp presence
    (nambda (u)
      (let*
        [ (arglist (cons 'roles (car u)))
          (confrel (grf '(confrel) arglist))
          outlprim presprim
          bbloc
          test ]

(msg 10 "PRESENCE")

(cond      ; check if previously called in same state
          ; if previously called - get previous output index
          [ (plist:prim-p 'presence nil)
            (dv presprim nil)
            (setq bbloc
              (bb:get 'presence (car (presence:RTSINDX)) nil)) ]
          ; if first call - instantiate it and build prim. call
          [ t
            (bb:store 'presence nil)
            (plist:add 'presence nil)
            (setq bbloc
              (bb:get 'presence (car (presence:RTSINDX)) nil))
            (setq presprim `(((,:code ,@bbloc) presence))) ] )

; check if outline has already been called in this state
185     (setq outlprim (car (eval (list 'outline (car u)))))

; determine which result of presence we must test for
        (cond
          [ (equal confrel '(no-contact))
            (setq test `(,@(cdr bbloc) 0 =)) ]
          [ (equal confrel '(surrby))
            (setq test `(,@(cdr bbloc) 1 =)) ]
          [ t   (msg "ERROR IN PRESENCE PRIMITIVE") ] )

; return list of primitive calls and list of tests
184    `< [ ,@outlprim       ; outline call - nil if not needed
             ,@presprim  ]   ; presence primitive call

[ ,test ]  > ))   ; test results of call to presence rtstype (p)        ; perceptive primitive
    rtscode (1)        ; position in prim list
    rtsindx (pres))    ; primitive name
```

FIG. 27

```c
#include "/user2/vplace/nscdir/bin/cprim.h"

/****************************************************************/
/* PRESENCE -- determine whether or not the participant is      */
/*             present in the environment                       */
/*                                                              */
/* - parameters : *parm -- address where return value is        */
/*                         to be placed                         */
/* - returns : 1 if present, 0 if not present                   */
/****************************************************************/ presence (parm)
   int *parm;

BEGIN
      short scanline,leftcnt,rightcnt,lpres,rpres,lval,rval;
      short *ltable,*rtable,*blbd;

scanline = 16;   leftcnt = 0;   rightcnt = 0;
      ltable = LTAB + 16;   rtable = RTAB + 16;
      blbd = *parm;

while (scanline < TABSIZ)
         BEGIN
            lval = *(ltable - 1) - *ltable;
            if ((((*ltable == 0) && (*(ltable - 1) == 0)) ||
                ((lval < -3) || (lval > 3)))
               BEGIN   leftcnt = 0;   lpres = 0;   END
               else leftcnt++;
            rval = *(rtable - 1) - *rtable;
            if ((((*rtable == 0) && (*(rtable - 1) == 0)) ||
                ((rval < -3) || (rval > 3)))
               BEGIN   rightcnt = 0;   rpres = 0;   END
               else rightcnt++;

scanline++;   ltable++;   rtable++;

if (leftcnt > 11)
               BEGIN   lpres = 1;   scanline = TABSIZE;   END
            if (rightcnt > 11)
               BEGIN   rpres = 1;   scanline = TABSIZE;   END
         END /* while */ if ((lpres == 1) || (rpres == 1))
         *blbd = 1;         /* participant is present */
         else *blbd = 0;    /* participant is not present */

END /* presence primitive */
```

FIG. 28

```
;
;
; RTS -- Run Time System -- PRIMITIVES DIRECTORY
;
;

( outline      ; get top, left, right from outline processor
  presence     ; determine if participant is in environment
  transition   ; wait until participant absent for some length
               ;     of time to transition to new interaction
  headpnt      ; find location of participant's head
  handpnt      ; find number and location of participant's
               ;     hands
  fingers      ; find number and location of participant's
               ;     fingers
  outlpnt      ; find nearest point on participant's outline
               ;     with respect to graphic object/critter
  contpnt      ; move along participant's contour starting
               ;     with nearest contour point
  inside       ; determine if critter is inside participant
  slope        ; find slope at nearest contour point
  true         ; return value '1' -- for default transition
  setpoint     ; set termination point for movement of a
               ;     graphic object/critter
  ptdist       ; determine distance and direction from graphic
               ;     object/critter to a specified point
  boxoffset    ; return point offset from participant's edge
               ;     by half width of graphic object/critter
187⌐moveg     ; move a graphic object/critter
  removeg      ; remove graphic object from environment
  nearest      ; of a given group of features, find the one
               ;     nearest to a particular graphic object
  colorb       ; color the background
  colorg       ; color a graphic object/critter
  coloro       ; color the participant's silhouette image
  rancolor     ; return random color values for red, green,
               ;     and blue
188⌐ranloc    ; return random X,Y coordinates
  stnxst       ; set next state for current state machine
  wrbb         ; write blackboard for current state machine
  smprim       ; trigger state of a sub state machine
  initcrit     ; initialize system for critter interaction
  initfract    ; initialize system for fractal interaction
  fracdriv     ; one state in ongoing fractal interaction
  initint      ; initialize system for intersect interactions,
               ;     i.e. colorizing applied to image overlaps
  i_orig       ; original intersect (first version)
  i_rand       ; random color intersect
  i_jig        ; jigsaw intersect
  i_rain       ; rainbow intersect
```

FIG. 29(a)

```
i_separ         ; intersect showing separate overlaps
i_prob          ; probability intersect
initrband       ; initialize for rubber band interaction, i.e.
                ;    display of outline points
rub_band        ; state in ongoing rubber band interaction
spline          ; draw a B-spline curve using fingertips
                ;    as control points
delay           ; delay by counting vertical blanks -- slow
                ;    down an interaction
initflow        ; initialize for flow interactions
flow            ; shape flowing colors with body movements
initpaint       ; initialize for flow painting
multipaint      ; flow painting with fingertips
surround        ; find if graphic object/critter is outside
                ;    participant but enclosed by contour points
openhand        ; find location of open hands
initspline      ; initialize for spline interactions
splineman       ; use points along contour of participant's
                ;    body as control points for B-spline curve
initdraw        ; initialize for drawing interaction
draw            ; draw graphic curve using single fingertip
life            ; use edges of participant's image as seeds
                ;    for game of life
exitcrit        ; cleanup on leaving critter interaction
lefthand        ; locate the participant's left hand
righthand       ; locate the participant's right hand
horizfing       ; find a horizontally outstretched finger
leavepaint      ; leave flow painting interaction -- flowing
                ;    pattern stays on screen
fastcycle       ; run through sequence of currently available
                ;    interactions for demonstration purposes
leavesound      ; cleanup after sound interaction
humancrit       ; human critter interaction
sound_onefing   ; sound interaction
sound_harm      ; sound interaction
sound_hand      ; sound interaction    )
```

FIG. 29(b)

REAL TIME PERCEPTION OF AND RESPONSE TO THE ACTIONS OF AN UNENCUMBERED PARTICIPANT/USER

DEFINITIONS

For ease of description only, the means disclosed herein are for (a) using a perceived Image of the human body to control real time computer events, and further (b) expressing a response to the perceived image by any means which may be controlled by the computer; thus perception and response both take place in real time. A coined term—VIDEOTOUCH—is used to express the above. Other coined terms will be introduced and defined in the specification below.

DESCRIPTION OF PRIOR ART

Implementation of real time perception and response represents the confluence of many different disciplines, including computer art, vision research, and real time systems. Described or existing devices which have some relevance to the invention described herein fall into a number of categories, including computer input devices, human movement tracking systems, and video control systems.

(a) Computer Input Devices

Most existing computer input devices are not relevant since they involve direct physical contact between the user and the device. Traditional devices of this type include the keyboard, light pen, joy stick, stiff stick, trackball, mouse, and so on. A more unusual approach is exemplified by the experimental GROPE system [Batter, J. J. and P. B. Fredrich Jr., "Grope-1", *IFIPS Proceedings*, no. 71, p. 759], in which the user moves a mechanical manipulator of the type used for handling radioactive materials, thereby indirectly controlling the actions of a graphic manipulator in a graphic environment.

Further, the detection and measurement of eye movements is a well established technique in vision research, generally involving some apparatus which must be attached to the subject's head in a fixed position with respect to the eye. Eye movements have been used for control by the Architecture Machine Group at MIT. Also at MIT, magnetic transducers worn on the hand have been used to allow pointing in three dimensions [Bolt, R. A., "'Put-that-there': voice and gesture at the graphics interface", Computer Graphics, vol. 14, no. 3 (ACM SIGGRAPH Conference Proceedings), July 1980, pp. 262–70]. Similarly, a hand held stylus manufactured by Polyhemus can be used for 3-D digitizing. All of these devices are intrusive in the sense that the user must wear either a sensor or a stimulus source in order to give the device the necessary control input.

Another type of computer input device is the touch sensitive tablet or display. Touch may be detected in a number of ways. Some devices of this type operate by scanning a line of light emitting diodes (LEDs) on one side of the screen, using a photocell on the opposite side of the screen to detect the occlusion of light caused by a user's finger. Another approach involves the actual detection of pressure on the touch surface. No matter how touch is detected, however, all commercially available touch tablets are limited to one degree of freedom—they can only isolate and respond to a single touch point.

Some experimental work has been done with multipoint touch sensors. A large scale multipoint touch surface, in the form of a sensory floor, was implemented by Myron Krueger, one of the inventors herein, in 1971 [Krueger, M. W., *Artificial Reality*, Addison-Wesley, Reading, Mass., 1983, chap. 4]. The locations of people walking about in a room could be detected via a grid of pressure sensitive switches in the floor. More recently, William Buxton of the University of Toronto has presented a multipoint pressure tablet that varies its output with the amount of pressure being exerted [Buxton, W., R. Hill and P. Rowley, "Issues and techniques in touch-sensitive tablet input", *Computer Graphics*, vol. 19, no. 3 (ACM SIGGRAPH Conference Proceedings), July 1985, pp. 215–24]. Buxton reports that a similar device is under investigation at Bell Labs. The idea of a more ambitious multipoint tactile sensor, with both variable pressure and torque detection, is reportedly being explored at Carnegie-Mellon University. As far as is known to the inventors herein, no truly successful multipoint touch tablets have yet been developed—Buxton's device was not manufacturable and has been abandoned, while the Carnegie-Mellon University device is probably still in the design phase.

Multipoint touch and pressure sensors do produce an image, in that they scan a grid of sensors. However, since these devices only record the points of contact, they cannot be used to provide visual feedback to the user. At best, the image produced would be a disconnected collection of those regions making the strongest contact with the tablet. These devices provide no clear information as to what part of the user's hands and fingers should be associated with each high pressure area. For example, in most cases it would be impossible to determine which finger of which hand was responsible for a particular touch stimulus—the visual context which allows a human observer to make this distinction is simply unavailable in a tactile image. The invention disclosed herein, on the other hand, analyzes a visual image of the user and is, therefore, able to make such distinctions.

(b) Human Movement and Human Features

Scientific studies of human movement have generally relied on markers affixed to the body of the subject. These markers can then be tracked over time to reveal the patterns of movement of various parts of the body. For example, Ivan Sutherland's 'Twinkle Box', developed at the University of Utah, depended upon marking the joints of the participating subjects with light emitting diodes (LEDs) [Sutherland, Ivan, *Proceedings of the National Computer Conference*, 1969]. Thus, when the ambient lighting was turned off, only the glowing points marking the subject's joints remained visible.

Marking points of interest such as the joints is only the first step in analyzing human movement. Before any analysis can occur, the markers must be detected and their position measured. Such measurement can be tedious and time consuming. For example, athletes participating in early film studies of human motion wore X's on their joints while throwing a football or carrying out some other athletic task. Researchers then went through the films frame by frame, digitizing the positions of the X markers to get the data required to analyze force, acceleration, and so on.

More recently, the measurement of marker position has been automated in various ways. One example is the approach described by William Thornton [U.S. Pat. No.

4,375,674 Mar. 1983]. Thornton's kinesimetric apparatus relies upon one or more incandescent lamps affixed to the subject's body as markers. The 3-D position of each marker is determined through triangulation, given the output signals of a number of video cameras focused on the subject. This makes it possible to build up a movement envelope over time for each marker. The use of a distinctive color as a marker has been used in a number of devices, including a golf swing analyzer described by Roy Linn [U.S. Pat. No. 4,163,941 Aug. 1979]. In this invention, a subject swings a golf club whose head has been given a specified color. Color video cameras adjusted so as to be sensitive to this color are focused on the golfer during the swing, thereby picking up periodic points along the trajectory of the club head. Although it seems unlikely that a motion as rapid as a golf swing can be usefully analyzed through data collected at normal video frame rates, the use of a color marker is a feasible technique.

The use of marker shape to provide 3-D information without triangulation or multiple sensor is proposed by Spackova et al. [U.S. Pat. No. 4,539,585 Sep. 1985]. An equilateral triangle is affixed to the face of a subject who is to be photographed by a video camera. Clearly, as the subject turns his head from side to side the apparent shape of the triangle will change. A computer determines the orientation of the face from the amount of change, and a picture of a pair of eyeglasses, properly oriented, is superimposed on the picture of the face.

What all of these approaches have in common is the use of markers or signal sources which must be worn or held by the person whose movements are being measured. In other words, the techniques are intrusive. Moreover, analysis of motion does not take place in real time, even though data about marker positions may be collected at video rates. Spackova et al. [U.S. Pat. No. 4,539,585 Sep. 1985] describe an extension of the face orientation measurement mentioned above, in which the subject wears a special garment covered with labeled equilateral triangles. The computer is to identify each triangle, determine its orientation, and eventually 'fit' the subject with a properly oriented article of clothing. Although the inventors claim that this can be done in real time, the means for implementing real time responses have not been disclosed.

A number of other devices exist which rely on a human operator to identify features of interest after the fact. In such a system, the subject wears no markers while his image is being recorded. Instead, an operator marks the specified features by using a light pen or similar device. Evelyna Dyson describes a system whose purpose is to match an appropriate make-up pattern with a customer's face [U.S. Pat. No. 4,232,334 Nov. 1980]. A beauty adviser working with the system views a video image of the customer's face and uses a light pen to mark salient points such as the nose, lips, chin, and so on. Burson et al. rely on a standard grid of facial features in order to simulate the appearance of a different age on a person's face [U.S. Pat. No. 4,276,570 Jun. 1981]. Again, a light pen is used to mark the important facial features which make up the grid points. Clearly, any perception involved in such a system falls into the province of the human operator rather than being carried out as an integral part of the system. The intervention of an operator also ensures that such systems do not function in real time.

At this juncture, in order to further clarify the disclosure, the major differences between the techniques just mentioned and the invention described herein are outlined. The invention described herein differs from existing techniques in two major ways. Firstly, the user does not wear or hold any type of marker, nor does a human operator intervene to mark the features of interest. The use of markers is superseded by perceptual analysis of the user's image, identifying features of interest such as the head, hands, fingers, and so on. Secondly, the analysis of motion is accomplished in real time, making it possible to provide feedback to the user as he is moving.

(c) Video Control Systems

A number of devices and techniques exist which actually use the video image itself as a control signal. The oldest of these techniques is probably video keying, a special effect which has been in routine use for decades. In keying, only those areas of an image which are above a certain threshold are inserted into another video image. Thus, for example, a person standing against a black or blue background can be keyed into a cloud scene, so that he appears to walk on a cloud in the composed image.

Traditional video keying simply controls the electronic selection of one video signal in favor of another, and involves no computer intervention. However, a number of existing computer graphics systems make use of a very similar effect. For example, a human image may be stored into a digital memory without disturbing existing information at the locations not covered by the person. Thus, as the person moves in front of the camera, the memory image accumulates in those parts of the screen contacted by the person. This type of effect is at the heart of a system developed by Ed Tannenbaum, currently on display at the Exploratorium in San Francisco [Tannenbaum visual display system, as seen by the inventors herein at the Exploratorium in San Francisco, July 1985].

Another system based on keying into a digital memory was invented by Richard Greene of San Francisco [U.S. Pat. No. 4,561,017 Dec. 1985]. In this system, a piece of glass is covered with a film of oil or water. A prism arrangement assures that only those parts of a brush, finger, or other drawing implement which are in direct contact with the liquid film will be seen by a video camera, and hence keyed into the image memory. A similar system, also using a prism, was developed by Robert Mueller in 1974 [U.S. Pat. No. 3,846,826 Nov. 1974]. It is important to note that none of the effects described requires any analysis—they all rely on simple electronic switching on a point by point basis throughout the screen.

Yet another type of input is used in a system developed by Tom Dewitt, formerly of RPI [DeWitt, T. and P. Edelstein, "Pantomation—a system for position tracking", *Proceedings of the 2nd Symposium on Small Computers in the Arts*, Oct. 1982, pp. 1-9]. The system detects objects of a particular color held by a participant in the environment, locates those objects, and then replaces them with graphic objects in the final image. Again, the computer in this system has no idea what it is looking at—no analysis of the incoming image is necessary to achieve this effect.

REFERENCES KNOWN TO THE INVENTORS

As a summary of prior and concurrent art which is known to us in the areas of computer input devives, human movement tracking systems, and video control systems, as described above, we include the following list of references.

U.S. Patent Documents

U.S. Pat. No. 3,846,826 11/1974, Mueller—358/81
U.S. Pat. No. 4,163,941 8/1979, Linn—358/107
U.S. Pat. No. 4,232,334 11/1980, Dyson—434/377
U.S. Pat. No. 4,276,570 6/1981, Burson et al.—358/93
U.S. Pat. No. 4,361,830 11/1982, Honma et al.—358/107
U.S. Pat. No. 4,375,674 3/1983, Thornton—364/413
U.S. Pat. No. 4,400,724 8/1983, Fields—358/93
U.S. Pat. No. 4,533,944 8/1985, Eby et al.—358/107
U.S. Pat. No. 4,539,585 9/1985, Spackova et al.—358/93
U.S. Pat. No. 4,561,017 12/1985, Greene—358/93

Other Publications

Batter, J. J. and P. B. Fredrich Jr., "Grope-1", *IFIPS Proceedings*, no. 71, p. 759.

Bolt. R. A.. "'Put-that-there': voice and gesture at the graphics interface", *Computer Graphics*, vol. 14, no. 3 (ACM SIGGRAPH Conference Proceedings), July 1980, pp. 262–70.

Buxton, W., R. Hill and P. Rowley, "Issues and techniques in touch-sensitive tablet input", *Computer Graphics*, vol. 19, no. 3 (ACM SIGGRAPH Conference Proceedings), July 1985, pp. 215–24.

DeWitt, T. and P. Edelstein, "Pantomation—a system for position tracking", *Proceedings of the 2nd Symposium on Small Computers in the Arts*, Oct. 1982, pp. 1–9.

Krueger, M. W., *Artificial Reality*, Addison-Wesley, Reading, Mass., 1983.

Krueger, M. W., T Gionfriddo and K. Hinrichsen, "VIDEOPLACE—an artificial reality", *SIGCHI Conference Proceedings*, Apr. 14–18, 1985, pp. 35–40.

Sutherland, Ivan, *Proceedings of the National Computer Conference*, 1969.

Tannenbaum visual display system, as seen by some of the inventors herein at the Exploratorium in San Francisco, July 1985.

BRIEF DESCRIPTION OF APPLICATIONS USING THE INVENTION HEREIN

The ability to perceive and understand the actions of an unencumbered user in real time is a desirable and useful capability. Moreover, it is a capability which has not been previously implemented. The following describes some of the possible applications of VIDEOTOUCH, and is not intended to limit the scope of the disclosure herein but only to serve for the purpose of illustration.

(a) Applications for Man-Machine Interface

VIDEOTOUCH can be used in place of traditional input devices for a number of different applications, including menuing, parameter input, low speed typing, drawing, painting, and manipulation of graphic objects. An example of such manipulation is dragging, in which the graphic object is first selected and then pulled along from place to place, following the movements of an input device such as a mouse or light pen. VIDEOTOUCH goes beyond conventional devices in that it permits two-handed control, allowing the user to carry out a variety of tasks far more efficiently. For example, it is possible to move a graphic object or block of text to a different on-screen location by using one hand to indicate the object and the other to point to the destination location. Similarly, painting programs allow the user to control color with one hand while simultaneously controlling brush position with the other. Further, the fingertips can be used as control points for spline curves, allowing the movement of up to ten control points simultaneously (in conventional systems, only one control point can be moved at a time). The spline curve controlled by the fingers may be used as an aperture of an extruding device, thus allowing the user to mold three dimensional graphic solids in real time.

(b) Applications for Entertainment

Perception of a participant's actions supports a form of sophisticated interactive entertainment, going beyond passive media such as television and motion pictures, and also beyond existing video games. Video games normally allow input only through a single limited device such as a joy stick. VIDEOTOUCH allows a participant to use his body in natural and intuitive ways in interacting with an artificial graphic environment. The participant meets graphic creatures, flies his image around the graphic world, or becomes involved in graphic adventures.

(c) Applications for Musical Control

Traditional musical controls date back to the time when the control action provided the mechanical energy which created the sound. Music need no longer be limited by this restriction, since control may now be provided through anything that can be coupled or connected to the human body. In a sense, the body itself becomes the musical keyboard. The body may be used to create sound when it touches a graphic object, or the shape of the body may be used to modulate a created waveform. Direction or speed of movement can also be used to modify sound. For example, if touching a particular object triggers a sound, then the trajectory of the approach defines the attack envelope and harmonic content of the note, while motions afterward control the modulation of the note as it is being played.

(d) Applications for Computer Aided Instruction

VIDEOTOUCH allows a child to learn from experiences in an artificial reality in which his or her actions provoke reactions from the environment. According to the invention herein, the child's image might navigate an alien planet and experience the effects of different physical laws. Such an experience allows the child to play the part of a scientist, forming hypotheses, planning experiments to test those hypotheses, and debating experimental results with his colleagues (i.e. the other children who have explored the same alien planet). VIDEOTOUCH also allows children to explore more conventional subject matter in a new way. For example, it becomes possible to 'touch' mathematical abstractions such as curves and geometric shapes, e.g. deforming a curve to see how the associated equation changes, or superimposing two shapes to discover if they are congruent.

(e) Applications for Telecommunications

The images of two or more people, who need not actually be near one another physically, can appear on screen simultaneously. Each person has his own camera and display screen, and sees his own image, together with the images of an other participants. In this manner an environment for communication is created in real time, independent of physical reality. The perceived reality of this created environment grows out of the fact that people tend to identify strongly with their video images. Participants in VIDEOTOUCH telecommunications may share a graphic world as well as simply encountering the images of other participants. In this case, participants might pass graphic objects to one another, or cooperatively create new objects. It is now possible, for example, for two participants at different locations to jointly manipulate the control points of a spline curve.

(f) Applications for Means of Control for the Disabled

Cerebral palsy victims and others lack the fine motor control required to use a normal keyboard. A larger keyboard, with each character several inches square, may be created to cover an entire desk top. Contact might be signalled not simply by touching a key area, but by lingering there for a certain period of time. Magnetically operated keyboards of similar style exist, but the invention described herein achieves the same result more simply. Beyond this variation on the traditional keyboard, VIDEOTOUCH allows any movement of a person's body to be used as a control input to the computer. A severely disabled person might use an individually tailored VIDEOTOUCH system to control his environment via his attainable range of motions.

(g) Applications for Presenting Graphics to the Blind

There is currently no satisfactory way of presenting graphic information to the blind. Through VIDEOTOUCH, a blind user may move his hands around a desk, touching graphic objects on a display screen. As each object is touched, a unique sound is triggered, identifying the object touched. The sound might change in pitch or intensity as the user moves from the edge of the object to the interior.

(h) Applications in the Field of Advertising

A system that can perceive passersby may be placed in a store window or shopping mall. Such a system could attract the attention of people walking by, engaging them in an interaction, and then slipping in some commercial material, much as is done on television. The approach is distinguished from television or radio in that the potential customer is engaged in an interaction on an individual basis, rather than being a passive recipient of canned information.

(i) Applications for Data Analysis

The perceptual capabilities of a VIDEOTOUCH system may be used in a non-real time mode, without feedback, to replace the use of markers in human motion studies. Data about feature locations over time could be recorded for later analysis, either directly or from stored images on videotape.

SUMMARY OF THE INVENTION

An object of the described invention is to perceive, understand, and respond to the actions of an unencumbered user or participant in real time. In order to accomplish this objective, the invention comprises a means for imaging, a means for distinguishing the person from the background, a means for digitizing the incoming image, a means for identifying salient features in the digitized image, and a means for responding to the perceived actions of the person in the environment.

Imaging is currently done via a standard video camera which is sensitive to visible light. Other means of imaging are feasible (e.g. infrared, ultrasonics, grids of photocells, laser scanning, flying spot scanner, and so on). In order to distinguish the user from the background, an embodiment of the invention relies on backlighting to create a neutral background.

The camera signal is digitized by an analog to digital converter, and then thresholded to a binary image by a simple digital threshold circuit with hysteresis. Means for digitizing and thresholding analog signals are well known in the art, and alternative or equivalent means for that purpose may be employed. Thus, any means producing a binary image distinguishing the user from the background is acceptable.

After appropriate filtering to reduce noise, the binary image is processed in order to identify important features such as the head, hands, fingers, and so on. An embodiment of the invention works with three types of information in parallel—(1) left-most and right-most image points on each horizontal scan line, (2) directed measurements searching for transitions in a specified direction in the bit-map image, and (3) contour following, coupled with measurement of distances between contour point [i] and contour point [i+n].

This perceptual processing is currently carried out by dedicated special purpose hardware (i.e. perceptual processors), since software is too slow to accomplish such processing in real time. Software is used to direct the actions of the perceptual processors as well as to integrate the results produced.

Once perceptual processing is complete, the system can respond in a wide variety of ways. The location of particular features on screen can be used as input to guide response—a known feature location may be used as a coordinate for drawing, as a selector indicating a particular graphic object, as a control point in the creation of spline curves, as a goal or perch for a graphic creature, as a value for controlling the pitch or intensity of sound, or for any number of other purposes. The movement of a particular feature over time may also be used as a control parameter.

The means for responding to the perceived actions of the participant may be any means which can be controlled by the computer. An embodiment of the invention employs both graphics and synthesized sound; other types of responses are equally feasible. Such alternate responses may include the control of discrete light displays or the orchestration of mechanical actions such as the movements of a robot.

The invention herein allows the display of the participant's image in conjunction with a variety of graphic information; as an illustration, this may be done in one of two ways. In the first case, a full-size silhouette image is displayed as a graphic plane, which means that other objects can be colorized so as to appear in front of or behind the silhouette. In the second alternative, hardware which digitally scales down the binary image allows the participant to assume the role of a graphic creature or sprite in a larger graphic environment. Other modifications or distortions of the video image, achieved by either analog or digital means, are feasible.

Beyond the direct use of the video image, the participant or user can be represented by any graphic creature created and animated by any number of graphic techniques, so long as the creature's behavior is in some way controlled by the user's behavior. For example, in one existing interactive mode we sample at regular intervals along the contour of the participant's silhouette, and then use the sample points to control a B-spline curve. The result is an amoeba-like creature which mimics the movements of the participant. Again, other types of mapping from the participant to a graphic alter ego are feasible.

In addition to a large amount of specialized hardware, the preferred embodiment of the invention also comprises a software control strategy; this software requirement has proved necessary because of a simultaneous need for rapid response and for developmental flexibility. A knowledge driven artificial intelligence program allows the system designer to describe new interactive behaviors in high level terms (by 'high level', we mean that interactive behaviors can be described in a form similar to normal English language). The run time software (by 'run time software', we mean the software which is executed while the system is actually engaged in real time interactive behavior), on the other hand, is stripped down for speed, executing a series of primitive software modules which interface with system hardware. The connection between the high level description (created off line) and the real time system is established via a specially developed numeric shorthand known as FLEX code (developed by the inventors herein). This numeric code directs the order of primitive execution in such a way as to achieve the interactive behavior outlined in the high level description.

BRIEF DESCRIPTION OF THE DRAWINGS AND EMBODIMENTS OF THE INVENTION

With reference to the drawings, these illustrate various aspects of the invention, in which:

FIG. 25 shows a segment of the high level conceptual dependency notation used in programming interactions within the embodiment illustrated in FIG. 1;

FIG. 26 shows an equivalent segment of FLEX code, i.e. the numerical sequence which actually directs the activities of the system, i.e. the embodiment depicted in FIG. 1, at run time;

FIG. 27 shows an information file, known as a LISP interface file, which is used to direct formation of the FLEX code;

FIG. 28 shows a file, known as a software primitive module, containing run time code which is executed in response to instructions contained in the FLEX code sequence;

FIGS. 29(*a*) and 29(*b*) represent a system reference file which contains a list of all such software primitive modules in the described embodiment of the invention.

DETAILED DESCRIPTION OF THE DRAWINGS AND PREFERRED EMBODIMENT OF THE INVENTION

Figure 1:
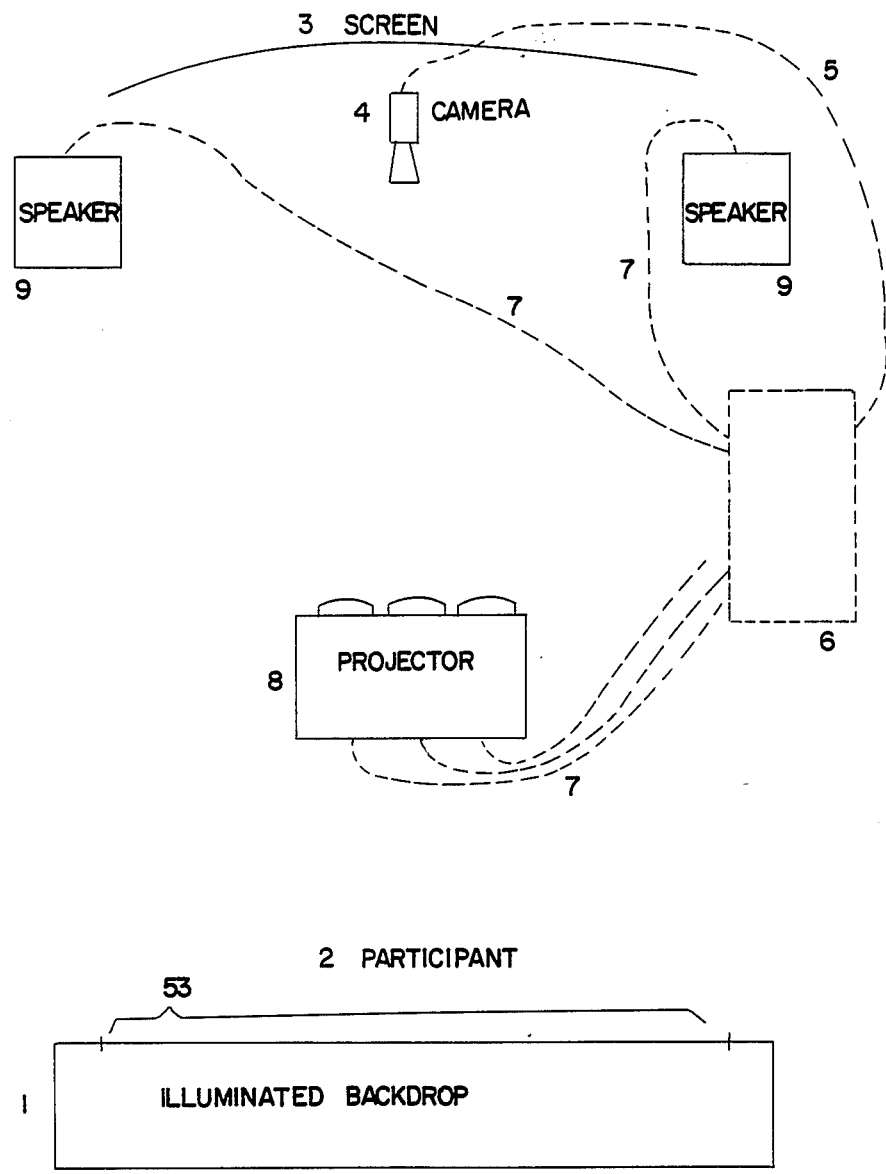
FIG. 1 shows schematically the physical setting for an embodiment of the invention, in which a user or participant standing in front of a neutral background is imaged by a camera facing the user.

In the description to follow, the details of an embodiment, shown in FIG. 1, are illustrated for the sake of describing the associated hardware and software.

Thus, FIG. 1 shows a top view of a setting for carrying out the invention. For ease of description we refer to this setting as VIDEOPLACE. The environment is dominated by two screens—an illuminated backdrop, shown as 1, whose essential purpose is to make the participant 2 visible to the system, and a video projection screen 3 which displays the system's graphic responses. The screen 3 and the backdrop 1 face one another across a darkened room. Immediately below the screen 3 is a video camera 4 pointed toward the uniform illumination of the backdrop 1. The participant 2 stands in front of the backdrop 1, visible to the camera 4 as a dark silhouette against the illuminated backdrop 1. The camera 4 image is transmitted over cable 5 to the main equipment rack 6. Rack 6 is the site of hardware and software which digitizes, processes, and analyzes an incoming image. Graphic and auditory responses are fed back over a second set of cables 7 to the video projector 8, and to two loudspeakers 9 which flank the projector screen 3. Thus, as the participant 2 moves about in front of the backdrop 1, he sees and hears the system's reactions from the projector screen 3 and speakers 9 on the opposite side of the room.

Figure 2:
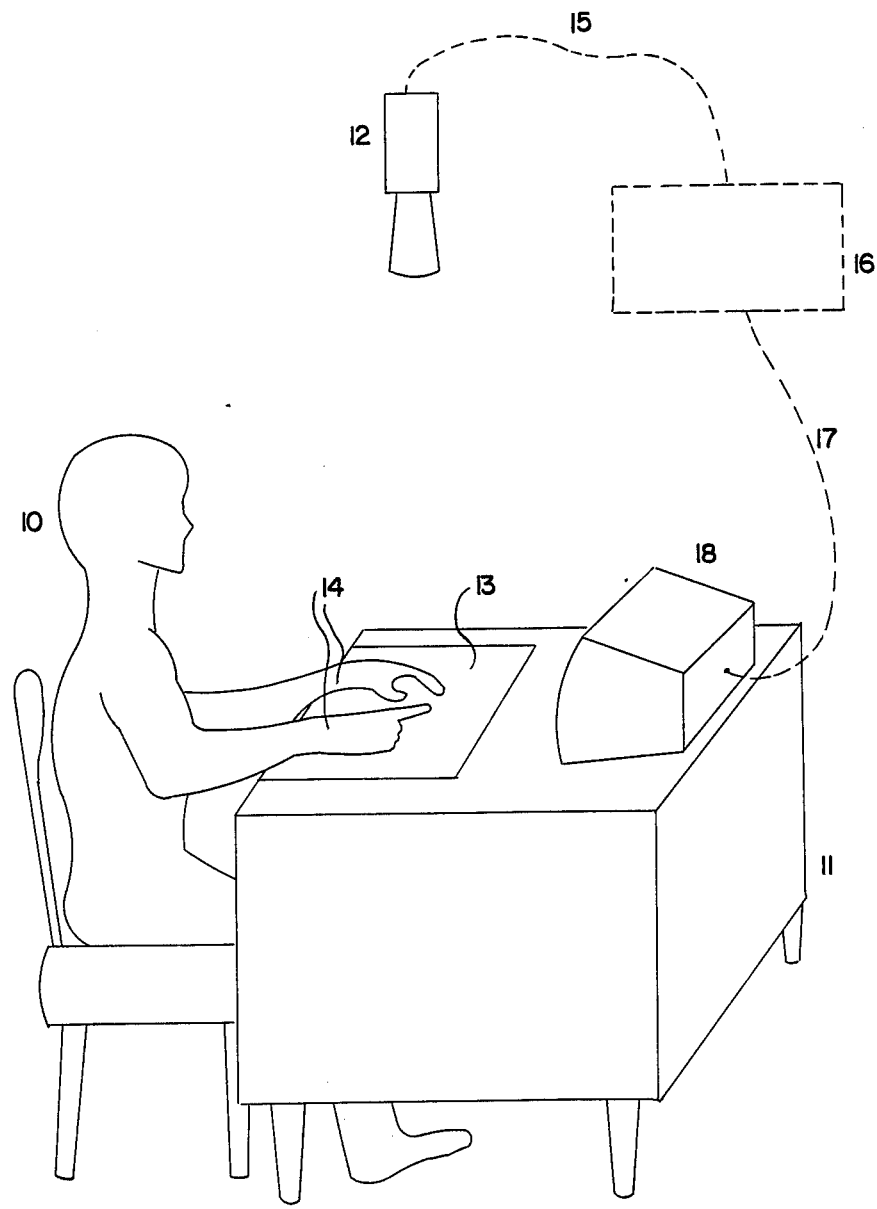
FIG. 2 shows schematically the physical setting for an alternate embodiment of the invention, in which the user's hands are imaged by a camera pointing down at a desk surface from above.

FIG. 2 shows an alternative embodiment of the invention, which, for ease of description, we call VIDEODESK. In this embodiment, the user 10 is seated at a desk 11 which is viewed from above by a video camera 12. A neutral background 13 on the desk allows the system in this embodiment to distinguish the user's hands 14 from the background 13. The camera 12 signal is transmitted via cable 15 to processing equipment 16, just as is done in the embodiment shown in FIG. 1. The results of processing in 16 are output on cable 17 and displayed to the user 10 via a desk top monitor 18. Alternatively, a flat screen display (not shown) might be mounted on a wall (not shown) behind the desk 11, facing the user 10, so that no desk space would be occupied by the system.

A physical environment as described above is more or less peripheral to the nature of the invention herein, and other peripheral means may be employed for establishing a physical environment. Of the components mentioned, for example, the camera, the video projector, and the loudspeakers are all basically off-the-shelf items, modified slightly for this particular application. At the heart of the invention, from the hardware point of view, the method point of view, or mixed hardware and software point of view, is a multitude of general purpose and special purpose processors, running under the direction of a large body of specialized software.

Figure 3:
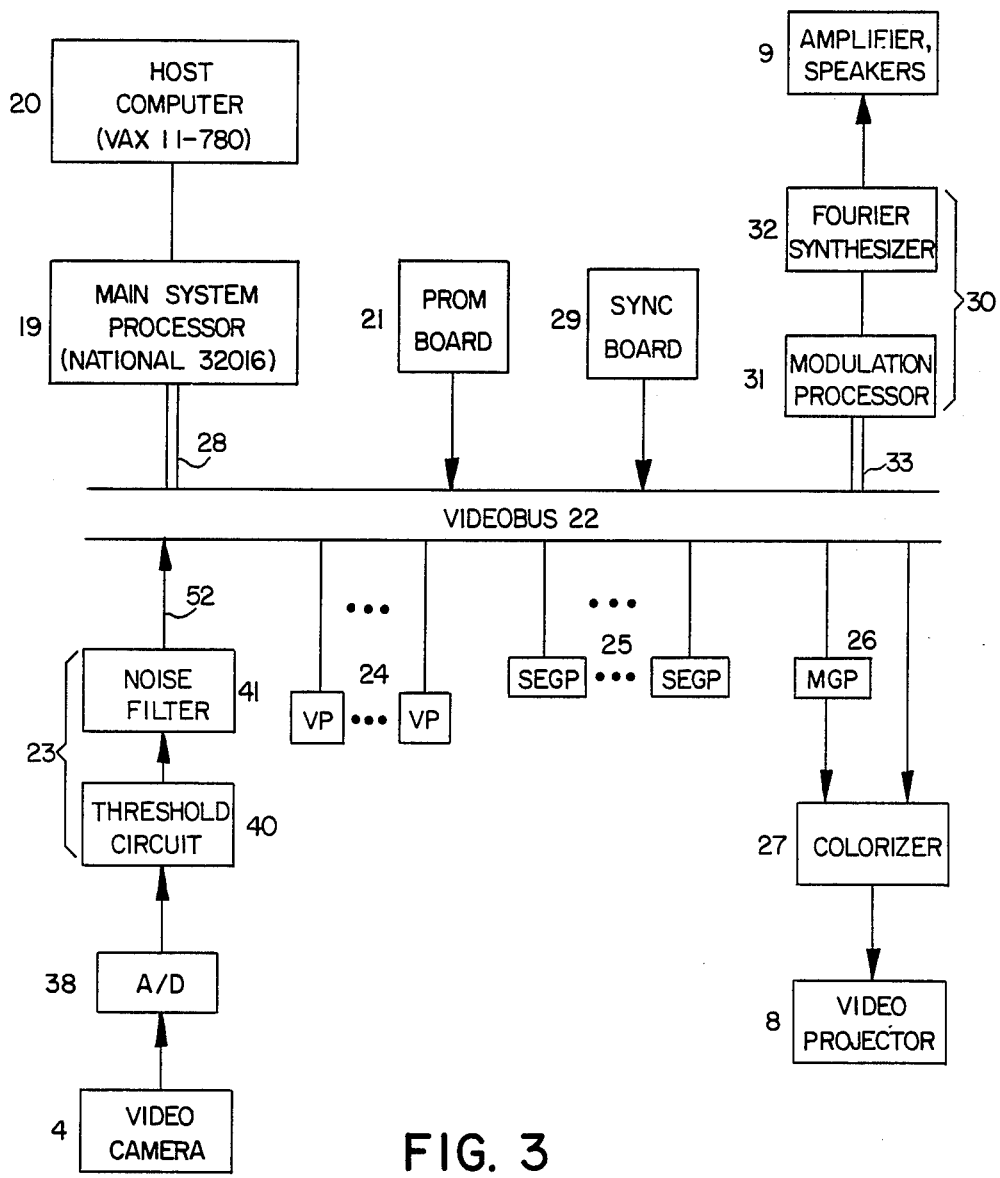
FIG. 3 illustrates schematically, by means of a system block diagram, the system bus and the relationship of the various special purpose and general purpose processors to that bus and to one another.

The central coordinator of the running system, which is shown schematically in FIG. 3, is a general purpose processor 19 which executes the system code. At present, this role is filled by a processor identified as a NATIONAL 32016, available from National Semiconductor Corporation, 2900 Semiconductor Drive, Santa Clara, Calif. 95051. During the development of software for a particular embodiment, e.g. FIG. 1 or FIG. 2 or any other physical environment, the system is linked to a host computer 20, such as a VAX 11-780, available from Digital Equipment Corporation, Maynard, Mass. 01754. The host computer 20 cross compiles to produce object code executable on the NATIONAL 32016 processor, i.e. processor 19. The system also supports a free standing mode, running from object code stored in programmable read only memory (PROM). The object code in PROM is stored external to the main system processor 19, on a PROM board 21 plugged into the system bus 22.

Although a central processor 19 is important for coordination and for the execution of system software, it is only a small part of the total hardware configuration. Such a processor 19 cannot capture visual input directly, nor can it produce graphic output. Because of time constraints, it also cannot be entrusted with much of the perceptual processing between input and output. Real time response simply cannot be achieved through software alone. Instead, most of these critical tasks are turned over to a variety of special purpose processors, each of which has been specifically designed and built for its particular task in the achievement of the various purposes of a particular embodiment.

The entire array of special purpose processors exists in a specially designed bus 22 which is called VIDEOBUS herein. The VIDEOBUS 22 incorporates 24 address lines and 16 data lines, as well as 8 video data lines, various control signals, clocks, and a number of necessary video rate signals, as will be further explained herein. To a large extent, the processors attached to the VIDEOBUS 22 can operate in parallel with one another, since much of the important video and timing information is present, i.e. universally available, on the VIDEOBUS 22—each board (e.g. a vision processor 24 or a special effects graphics processor 25) can pick off what it needs without interfering with the operations of the other boards (e.g. a different vision processor 24 or the main graphics processor 26) sharing the VIDEOBUS 22. As explained earlier, the term 'board' refers to an individual physical entity which attaches or 'plugs in' to a bus such as the VIDEOBUS 22. Normally 'board' is equivalent to 'processor' herein—the functionality of each processor is normally implemented in terms of a single board.

The various special purpose processors, such as the threshold processor 23, the vision processors 24, the special effects graphics processors 25, the main graphics processor 26, and the colorizer 27, shown in FIG. 3, may run in parallel with software, but they do not place signals onto common VIDEOBUS 22 lines unless requested to do so by the main system processor 19. There is no need for conventional direct memory access (DMA) operations, since every processor which needs memory access is given its own on-board memory. This memory can be consulted internally, i.e. within the board or 'on-board', without involving the VIDEOBUS 22 in any way. A board may make a readable flag available when it has completed a certain processing task, but it does not actively interrupt the software by setting the flag. By 'readable flag' we mean a binary value which the software running on the main system processor 19 can read by addressing a known absolute memory location which falls within the address range assigned to a particular processor.

The main system processor 19 is itself a single board which is plugged into a MULTIBUS chassis (MULTIBUS, a widely used bus convention, is a trademark of Intel Corporation). The MULTIBUS chassis is not shown independently in FIG. 3, but is included in 19. The VIDEOBUS 22 is linked to the MULTIBUS via a set of bi-directional interface boards (shown as connection 28), one of which is plugged into the VIDEOBUS 22 while the other is plugged into the MULTIBUS. The design of such interface circuitry, i.e. connection 28, is well known In the art. This connection 28 enables the main system processor 19 to communicate with individual boards attached to the VIDEOBUS 22, such as the threshold processor 23, any one of the vision processors 24, any one of the special effects graphics processors 25, the main graphics processor 26, the sync board 29, the colorizer 27, or external memory, as exemplified by the PROM board 21. The main system processor 19 may, for example, request information from one board, direct another to start a particular processing task, and order a third to send some specified graphic output to the projector 8 via colorizer 27.

The processors making up the harmonic synthesizer 30 are not described in detail herein, as the details of synthesizer design do not fall within the scope of the described invention. Moreover, functionally equivalent harmonic synthesizers are readily available from commercial sources. For this reason also, the processors making up the harmonic synthesizer 30 are not all individually illustrated in FIG. 3. The modulation processor 31 acts as an interface between the VIDEOBUS 22 and the Fourier synthesizer proper 32, which is currently made up of four boards, all included in the item identified as 32 in FIG. 3. The exact number of synthesizer boards is not directly relevant to the function of the synthesizer as part of the invention herein. As mentioned above, functionally equivalent synthesizers are commercially available, although details of design may vary. The modulation processor 31 and the boards making up the Fourier synthesizer 32 are resident in yet another bus, called the SOUNDBUS. This bus is not individually illustrated in FIG. 3, but is included in 30. Thus, there are three different bus conventions (MULTIBUS, VIDEOBUS, SOUNDBUS) in the apparatus (i.e. system), linked together by specially designed interface boards shown as 28 and 33. As is evident from the foregoing, timing and interface protocol are important to proper system operation.

With reference to pixels, resolution, and video timing in a digital system, image processing is only possible if the image is broken down into a finite number of discrete picture elements or 'pixels', each of which is treated as having a uniform color or brightness over its entire surface area. An image composed of a large number of small pixels will have better resolution than an image composed of a smaller number of larger pixels—the image with more pixels is more detailed and less grainy for its size. However, since each pixel requires a certain fraction of system resources in terms of storage and processing time, attainable resolution is always limited.

For the embodiment shown in FIG. 1, the resolution of the image is 256 by 256 pixels. In part this is a compromise between desired image quality and available resources. Of course, appropriate design modifications within the above described compromise are possible. In part the chosen resolution of 256 by 256 pixels is also a function of available video technology. Since standard video equipment is used for the apparatus (i.e. for system input and output), it is convenient to coordinate system operations with readily available video conventions. It is evident, however, that the chosen resolution is ancillary to the basic functioning of the described system, and that the same techniques are applicable at higher or lower resolution.

Figure 4:
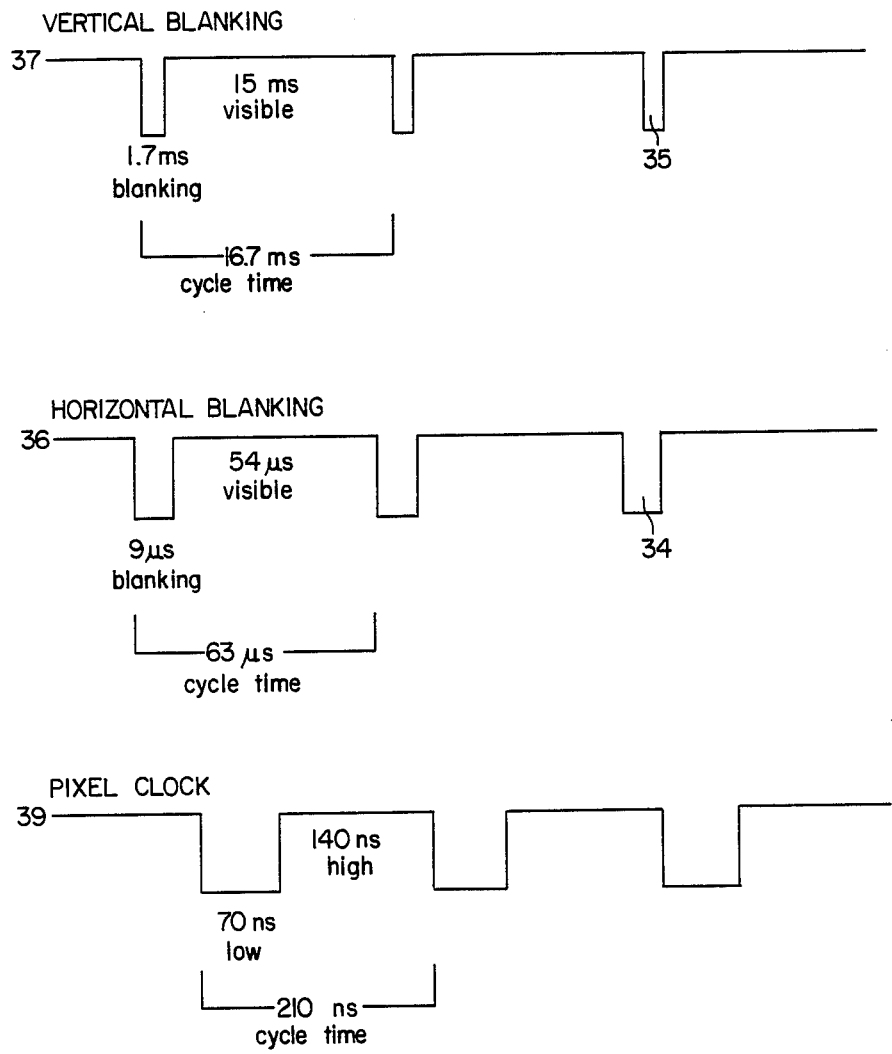
FIG. 4 illustrates by means of wave forms and timing information the characteristics and relationships of a number of system clocks.

A television picture is actually the result of an electron beam traveling over the interior surface of the screen, successively striking and exciting the phosphorescent particles that produce the light visible to the viewer. The beam starts at the upper left corner of the screen, scans from left to right to produce the first of the many scan lines making up the total image, and then turns off briefly in order to retrace its path to the left side of the screen for the next scan line. This off time is referred to as the horizontal blanking period, shown as 34 in FIG. 4. When the beam finally reaches the bottom of the screen, it must turn off for a longer period of time in order to return to the upper left corner for the next scan. This return time is known as the vertical blanking period, shown as 35 in FIG. 4.

Referring again to FIG. 3, the horizontal and vertical blanking signals described above (and shown in FIG. 4) are produced by the sync board 29 and placed on the VIDEOBUS 22 by that board along with a number of other video timing signals. This means that other boards attached to the VIDEOBUS 22 can make use of these timing signals for their own processing. In addition, the horizontal 36 and vertical 37 blanking signals have been selected as useful system clocks, with a horizontal blanking period 34 marking the end of each scan line and a vertical blanking period 35 marking the end of each scan.

In order to allow use of these system clocks, both the horizontal 36 and vertical 37 blanking signals are made available in the system as readable values, allowing the software to consult the current status of these system clocks whenever necessary by querying the sync board 29. The vertical blanking signal 37 is particularly important as a software clock, since certain graphics and colorizing operations can only be carried out during the blanking period 35. In addition, the beginning of the vertical blanking period 35 marks the end of image acquisition, which has an impact on certain types of perceptual processing, as will be further explained herein.

American television standards provide for an interlaced scan to a total of 525 scan lines every 1/30 of a second. This means that on each half of the interlace (every 1/60 of a second) approximately 262 scan lines are covered, close to the vertical dimension of 256 pixels chosen as the standard for the apparatus used for the embodiment shown in FIG. 1. The horizontal dimension is also set to 256 pixels, thus yielding approximately square pixels. Information is captured on the odd scan only, in order to avoid spurious up and down motion in the video image from one captured scan to the next. This odd scan convention sets the system's response cycle time at 1/30 of a second—the interval between successive odd scans. In other words, the processing and response for each captured scan must be completed within 1/30 of a second, before new information comes in for the next odd scan.

The chosen dimensions of 256 by 256 pixels are followed throughout the apparatus used for the embodiment shown in FIG. 1. This number of pixels is read in and stored in memory when an image is recorded, and, when an image is displayed on the projector screen 3, 256 lines containing 256 pixels each are output in proper sequence. Input and output occur at the same per pixel rate, since the scan rates of camera and projector are synchronized. This per pixel rate is one of the most important clock functions in system hardware, since input and output must both occur at this speed.

Still referring to FIG. 3, and now discussing imaging from camera input to threshold image, the video camera 4 produces a constantly fluctuating output voltage as it scans the image area, with the voltage level varying as a function of local brightness. The camera 4 output is passed through an analog to digital converter 38, yielding 8 bits of digital information for each pixel. This is the point in the circuit where the per pixel rate first becomes important, since the A/D converter 38 is clocked every 210 nanoseconds by a hardware timing signal known as pixel clock, shown as 39 in FIG. 4. Like the horizontal 36 and vertical 37 blanking signals described above, pixel clock 39 is generated and placed onto the VIDEOBUS 22 by the sync board, shown as 29 in FIG. 3.

Figure 5:
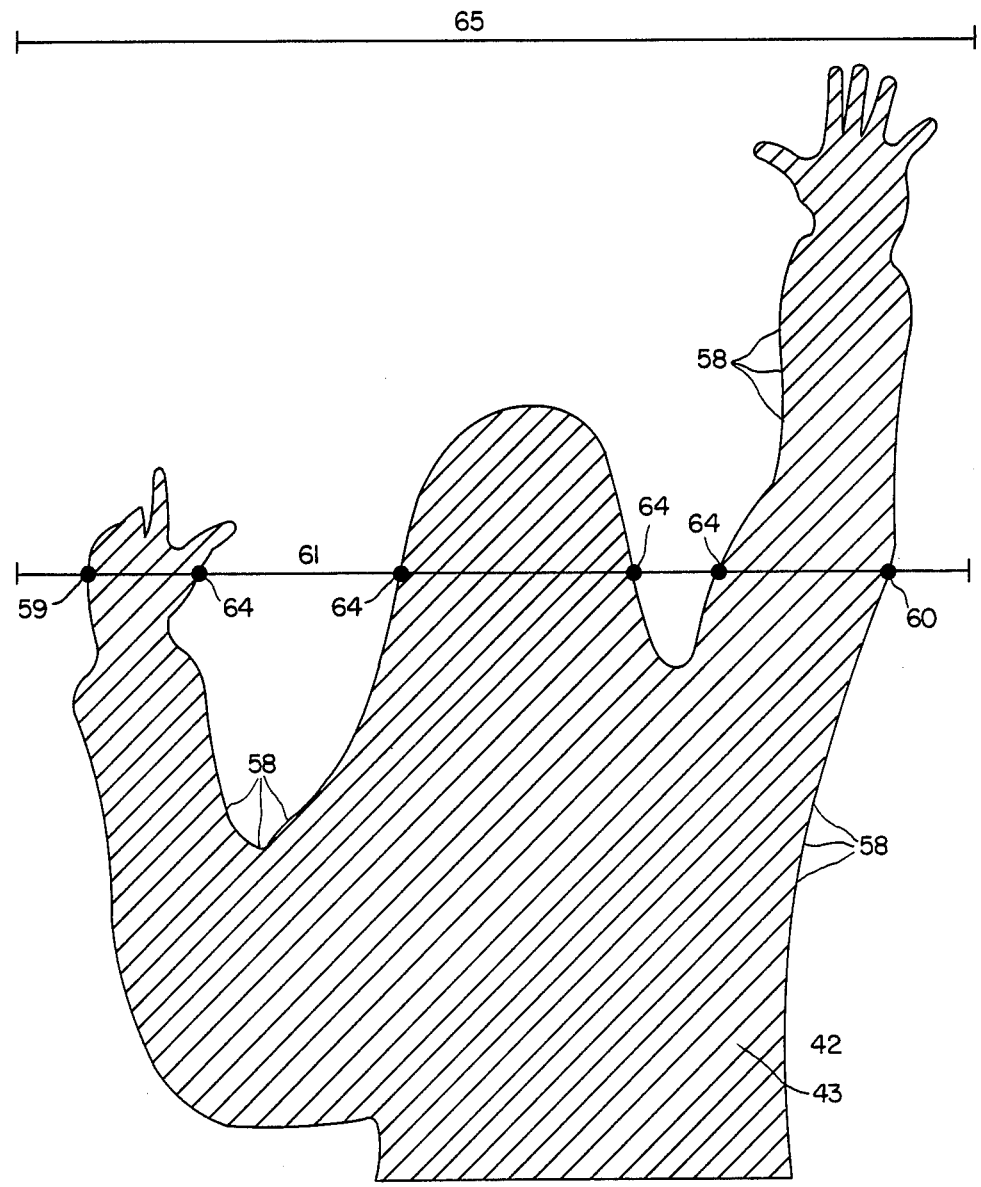
FIG. 5 illustrates a typical binary visual image, as processed by the embodiment of FIG 1.

The output of the A/D converter 38 consists of 8 bits of grey level information for each image pixel. This means that a single scan (one half of the total interlace pattern) brings in 256*256*8 or over half a million bits of data every 1/60 of a second. To bring this quantity of information down to manageable levels, the A/D 38 output is fed into a threshold processor 23, which is made up of a threshold circuit 40 followed by a noise filter 41. The threshold circuit 40 reduces the original 256 grey levels to a binary image. Since a participant 2 in the environment appears to the video camera 4 as a dark silhouette in front of the illuminated backdrop 1, the pixels which are judged to be 'on' can be considered background, while the pixels judged to be 'off' represent the participant's 2 body. FIG. 5 represents such a binary image, with 42 indicating a region of background pixels and 43 indicating a region of participant pixels.

Once a binary value has been assigned to an incoming pixel, the threshold processor 23 does some further processing to clean up single pixel noise in the image. This processing is carried out by a noise filter circuit, identified as 41 in FIG. 3. The noise filter circuit 41 is represented in greater detail in FIG. 6. In this figure, i.e. FIG. 6, and all subsequent figures dealing with chip level circuitry detail, the notation conventions followed are based on the conventions in the *TTL Data Book for Design Engineers*, as published by Texas Instruments.

Returning now to the function of the noise filter circuit 41, basically, the eight neighbors of each pixel are scanned, and if all neighbors are found to have the background value then the center pixel is also forced to the background value, regardless of its original state. In order to have the eight neighbors of a pixel available for inspection, information must be available from three successive scan lines. Turning now to a description of FIG. 6, information from the two preceding scan lines is continually stored in the memories 44, with the multiplexer 45 switching from one memory to the other on a scan line by scan line basis. The third scan line under consideration is always the current scan line.

On each cycle of the pixel clock 39 (the same 210 nanosecond clock discussed above with reference to the A/D converter 38), the old value is first read out of one of the memories 44 and then a new value is written in. The stored values from the oldest scan line (two lines ago) go into a shift register 46, while the stored values from the immediately preceding scan line go into a second shift register 47. A third shift register 48 receives values from the current scan line. The eight neighbor values are fed into a comparator 49, and if all are at the background level, then the value of the center pixel of that group of nine is effectively ignored. No matter what the original value of the center pixel value 50, the NAND ('NAND' being the conventional contraction for the 'not and' logical function) gate 51 will place a background high level onto the VIDEOBUS 22. If at least one neighbor is not at the background level, however, then the original center pixel value is allowed to go through.

Figure 6:
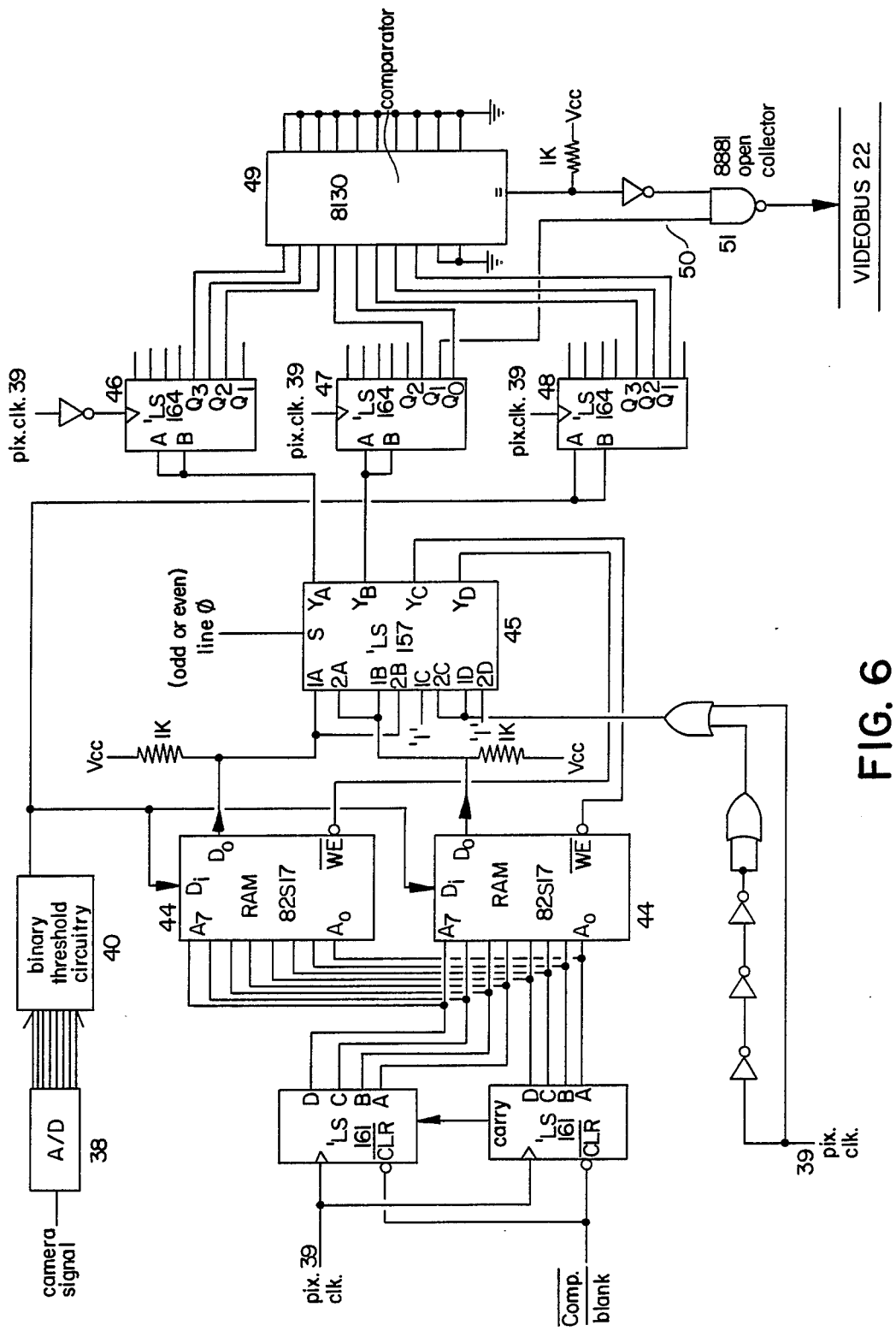
FIG. 6 illustrates a circuitry detail from a threshold processor, including a noise filter stage.

This noise filtering is done on the fly, although the filter circuitry 41 shown in FIG. 6 does delay the output of each pixel by one scan line plus one pixel. The phrase 'on the fly' is used to describe any processing which goes on at per pixel rates, meaning that the rate of processing is just as fast as the rate at which new input information arrives for processing. The one scan line plus one pixel delay imposed by the noise filter circuitry 41 shown in FIG. 6 is insignificant, having no detectable effect on the visual display produced on projector screen 3 by the apparatus used for the embodiment shown in FIG. 1. The output of the threshold processor 23, shown as 52 in FIG. 3, is made available to the rest of the system as a signal on the VIDEOBUS 22. The threshold signal itself is evanescent, with a new value clocked onto the VIDEOBUS 22 at every pulse of the pixel clock 39. Any board designed to further process the threshold must cope with the information at pixel clock 39 rates, either doing analysis on the fly, or storing the threshold data in memory for slower processing in the future, as will be explained in more detail later.

All perceptual processing in the apparatus used for the embodiment shown in FIG. 1 relies on the basic vision information inherent in the threshold signal. The threshold signal, in turn, depends, at least in part, upon adequate lighting. The existing threshold processor, shown as 23 in FIG. 3, is based on the assumption that the user will be positioned in front of a neutral background. This background is currently implemented in terms of a uniform low level of backlighting.

Diffuse lighting is provided by a number of fluorescent fixtures inside the illuminated backdrop 1 which is shown in FIG. 1. The backdrop 1 is enclosed, allowing light to emerge only from the surface 53 directly behind the participant 2. By enclosing the light sources in this manner, the contrast between the background 1 and the participant 2 is enhanced, while ambient light in the rest of the environment is minimized. The material interposed between the light sources in the illuminated backdrop 1 and the video camera 4 has also proved to be important to the quality of backlighting—surface 53 consists of a sheet of translucent material such as plexiglass, which greatly reduces the problem of local variations in brightness.

It is important to note that good backlighting is sufficient for present purposes, i.e. it is necessary at the moment because the system must deal with a simplified silhouette image in order to perceive and respond in real time. It is contemplated for further enhancement of the apparatus disclosed herein that the emphasis will shift away from lighting and toward more sophisticated and available processing of 'normal' visual input. Thus, for example, some additional filtering allows the use of a simple neutral background, without the need for backlighting. More complex processing, however, is needed to deal with a non-uniform background, requiring the subtraction of known static background data from each frame to isolate the image of the user. In addition, it is suggested that processing capability is usefully extended by dealing with grey level information rather than focusing exclusively on binary data.

Figure 7:
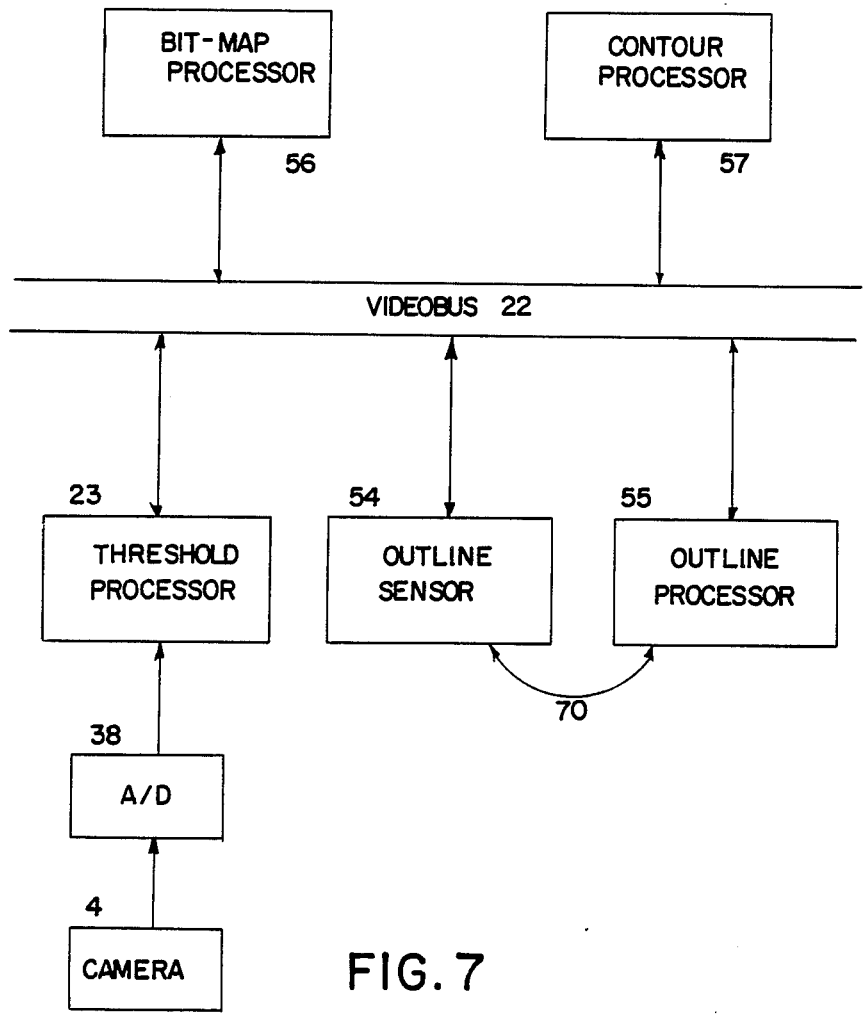
FIG. 7 illustrates schematically, by means of a block diagram, the organization of the vision processors, the boards responsible for perceptual processing on the hardware level (by 'board' we mean the physical entity which actually carries out the functionality of a described processor—the terms 'board' and 'processor' are occasionally used synonymously hereinafter)

With reference to the means for perception, the binary threshold signal produced by the threshold processor shown as 23 in FIG. 3, along with the video timing signals produced by the sync board 29, comprise the basic visual information available throughout the system. These video timing signals, which include the vertical blanking signal 37 the horizontal blanking signal 36, and the pixel clock 39, provide a frame of reference for the threshold signal. The boards which work on this information to draw perceptual conclusions are known collectively as the vision processors, shown as 24 and indicated by the abbreviation 'VP' in FIG. 3. The sixty five thousand bits per frame of threshold data output by the threshold processor 23 must be organized and simplified to make perception possible. A number of processors, shown as 54 to 57 in FIG. 7 and further described herein, attack this problem from different angles. FIG. 7 thus describes the existing vision processors 54 to 57 and shows the relationship of each vision processor 54 to 57 to the overall system shown in FIG. 3 and FIG. 7 and also shows the relationship of each vision processor 54 to 57 to each of the other vision processors 54 to 57.

In general, the vision processors 54 to 57 focus on the edge of the participant's image, shown as 58 in FIG. 5, since these regions of transition from dark to light and from light to dark convey most of the information in a binary image as shown in FIG. 5. The four vision processors shown in FIG. 7 are the outline sensor 54, the outline processor 55, the bit-map processor 56 and the contour processor 57. The outline sensor 54 and the outline processor 55 deal with the extreme transition points on each scan line (e.g. points shown as 59 and 60 for scan line 61 in FIG. 5), with the outline sensor 54 acting as a front end for the outline processor 55. Both of these vision processors operate on the fly, doing all necessary processing at the same rate that the data points become available on the threshold signal. In other words, vision processors 54 and 55 carry out all processing at pixel clock 39 rates, since this is the rate at which new pixel values are placed onto the threshold signal by the threshold processor 23.

The other vision processors 56 and 57 capture an entire 256 by 256 pixel image, such as is shown in FIG. 5, on the fly, and then extract edge information from this image after the capture step is complete. A vision processor 56 called the bit-map processor and a vision processor 57 called the contour processor exemplify this type of perceptual processing. Further explanation concerning all of the vision processors 54 to 57 will be provided herein.

The existence of multiple vision processors 54 to 57 allows parallel processing, with each vision processor drawing its own conclusions from the common threshold signal, which is produced by the threshold processor 23 and available throughout the system as a signal on the VIDEOBUS 22. Further, perception for the embodiment shown in FIG. 1 relies on hardware processing, particularly for frequently repeated or time critical tasks, combined with extensive integration and refinement of hardware results by software for the apparatus used in the embodiment shown in FIG. 1.

Turning now to the outline sensor 54 and describing it in greater detail, the simplest of the vision processors employed for the embodiment shown in FIG. 1 is the outline sensor, shown as 54 in FIG. 7. This vision processor, i.e. outline sensor 54, takes in the threshold signal from the VIDEOBUS 22, along with pixel clock 39 (to mark pixel boundaries) and the horizontal blanking signal 36 (to mark scan line boundaries), and finds the first background-to-participant transition (e.g. 59 in FIG. 5) and the last participant-to-background transition (e.g. 60 in FIG. 5) on each scan line of a binary image such as is shown in FIG. 5. These two pixel locations are temporarily recorded in two on-board registers, shown as 62 and 63 in FIG. 8. Although interior light-to-dark and dark-to-light transitions (e.g. 64 in FIG. 5) are noted in passing by the outline sensor circuitry detailed in FIG. 8, this information is not preserved by outline sensor 54.

Figure 8:
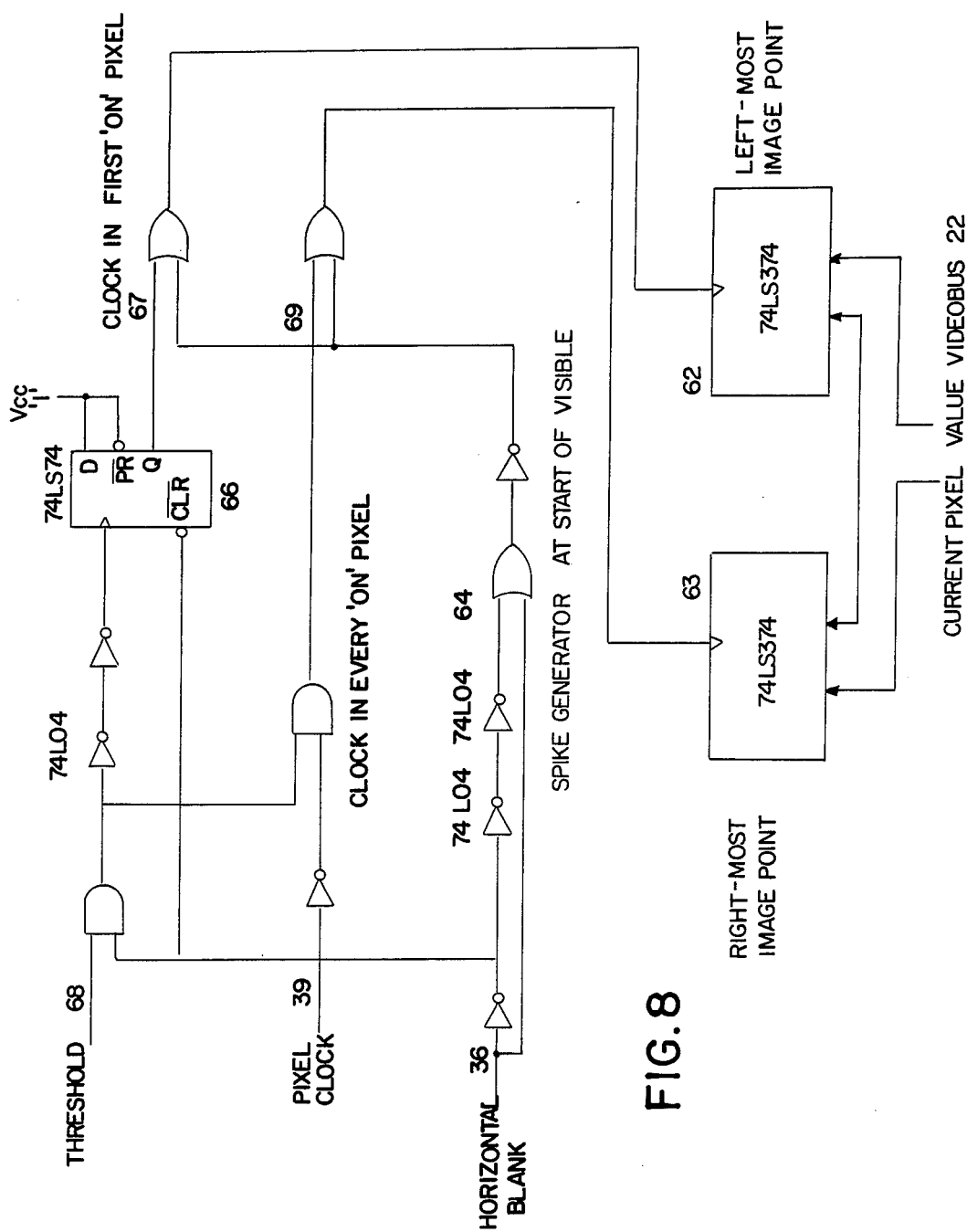
FIG. 8 illustrates a circuitry detail from an outline sensor, i.e. the hardware which detects the left-most and right-most image points on each scan line.

FIG. 8 is a detailed representation of some of the important outline sensor 54 circuitry (i.e. vision processor 54 circuitry). At the beginning of each scan line, the spike generator, shown as 64 in FIG. 8, causes the current pixel value (i.e. pixel '0') to be clocked into both the left-most image point register 62 and the right-most image point register 63. If there is no participant presence on that particular scan line, as on the scan line shown as 65 in FIG. 5, for example, these initialization values will be preserved.

The flip-flop circuit 66 in FIG. 8, which is cleared during the horizontal blanking period 34, generates a clock, shown as 7, from the Q output of flip-flop 66, to the left-most image point register 62 when the first 'on' pixel is detected in the incoming threshold signal 68. In FIG. 5, the point identified as 59 is an example of the first 'on' pixel on the particular scan line 61. This clock 67 in FIG. 8 can only occur once for each scan line, since the flip-flop 66 will not be cleared again until the next horizontal blanking period 34. The right-most image point register 63, on the other hand, is clocked by 69 every time an 'on' pixel is encountered. In effect, this register 63 always contains the value of the last 'on' pixel seen up to that point in the scan line, so at the end of the line the right-most image point register 63 will contain the location of the last participant-to-background transition. In FIG. 5, the point identified as 60 is an example of such a final transition on the particular scan line 61.

The outline sensor 54 in FIG. 7 is unique among the processors used in the apparatus herein, i.e. as shown in FIG. 3 and FIG. 7, in that it is directly answerable to a different special purpose processor, i.e. outline processor 55, without software intervention. The outline sensor 54 can make its data available when addressed over the VIDEOBUS 22 by software running on the main system processor, shown as 19 in FIG. 3. This software access to the outline sensor 54 is used for testing, allowing us to determine if the outline sensor 54 is functioning correctly.

Figure 9:
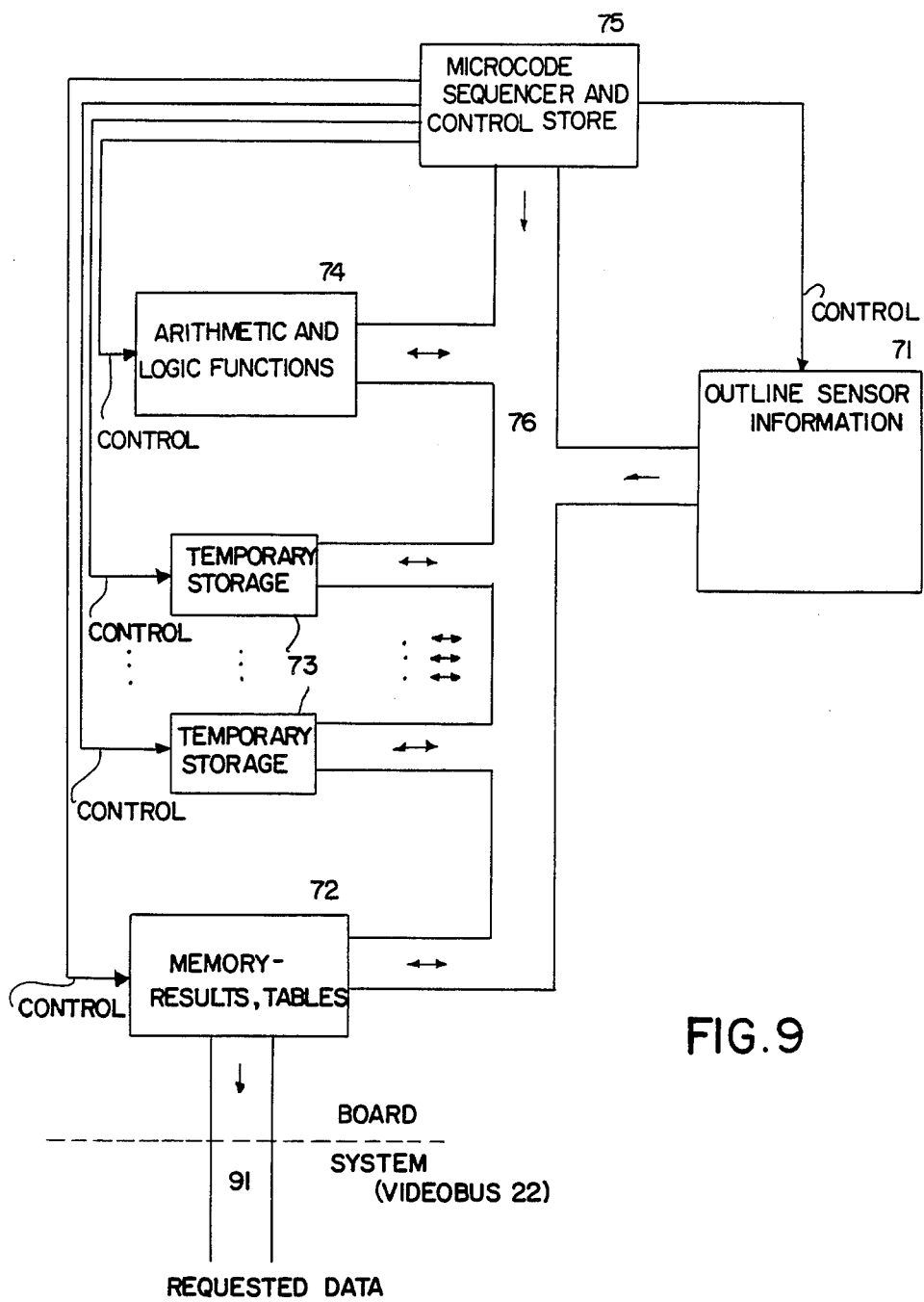
FIG. 9 illustrates a high level block diagram of an outline processor, i.e. the hardware which performs further analysis on the outline sensor data.

On the other hand, the outline processor 55 circuitry must also have access to the basic outline information gathered by the outline sensor 54, but cannot take control of the VIDEOBUS 22 to request such information. Referring back to FIG. 7, a hardwired link 70 allows communication between the two processors, i.e outline sensor 54 and outline processor 55, with the interface being isolated from other outline sensor 54 activities by a set of buffer registers. These buffer registers are not shown in the outline sensor 54 circuitry detail of FIG. 8, but they derive their input values from the outputs (not shown) of the left-most image point register 62 and the right-most image point register 63. The outputs of the buffer registers, in turn, are directly tied to the outline processor 55 via link 70. In FIG. 9, the buffer registers are represented collectively by block 71, identified as 'outline sensor information'.

Turning now to the outline processor 55, this vision processor collects the outline points from the outline sensor 54, records these points in an on-board memory, shown as 72 in FIG. 9, and performs a number of method steps to derive a variety of information from the basic outline sensor 54 data. FIG. 11 illustrates the type of information extracted from a binary image by an outline processor 55, which will be further elaborated and described with reference to FIG. 10.

The following information is recorded in on-board memory 72 for each scan processed—(a) a table of left-side outline points for each scan line; (b) a table of right-side outline points for each scan line, with the solid lines in FIG. 11 representing the actual outline points on both left and right sides of the silhouette image; (c) a table of values containing the calculated width for each scan line, with 77 respresenting the width for one particular scan line in FIG. 11; (d) a number of tables detailing the location and size of discontinuities 78 on both sides of the image of the participant's body, with discontinuities being defined as large changes in X position from one scan line to the next, often marking perceptually interesting areas such as the top of the head, the shoulder, the elbow, a hand raised to shoulder height, etc.; (e) a one-bit flag giving the result of the presence/absence test (i.e. is there or is there not a participant 2 in the environment), which is carried out by checking for non-zero width on at least eight consecutive scan lines; (f) X and Y coordinates for the top-most 79, left-most 80, and right-most 81 image points, and (g) four values describing cumulative motion between the previous scan and the current scan, with one value indicating total motion toward the left among all left outline points recorded, another value indicating total motion toward the right among all left outline points recorded, a third value indicating total motion toward the left among all right outline points recorded, and a fourth value indicating total motion toward the right among all right outline points recorded.

FIG. 9 is a functional block diagram showing the major functional units making up the outline processor shown as 55 in FIG. 7. All outline processor 55 operations take place under microcode control 75. An AMD2910 microcode sequencer, shown as 82 in FIG. 12, operates in conjunction with a control store in programmable read only memory (PROM), shown as 83. The AMD2910 microcode sequencer 82 is available from Advanced Micro Devices Inc., 901 Thompson Place, Sunnyvale, Calif. 94086. The microcode sequencer 82, the control store 83, the pipeline registers 84, and the condition code multiplexer 85 make up a configuration which we call the micro-engine, shown as a single functional unit 75 in FIG. 7, and shown in more detail in FIG. 12.

Figure 12:
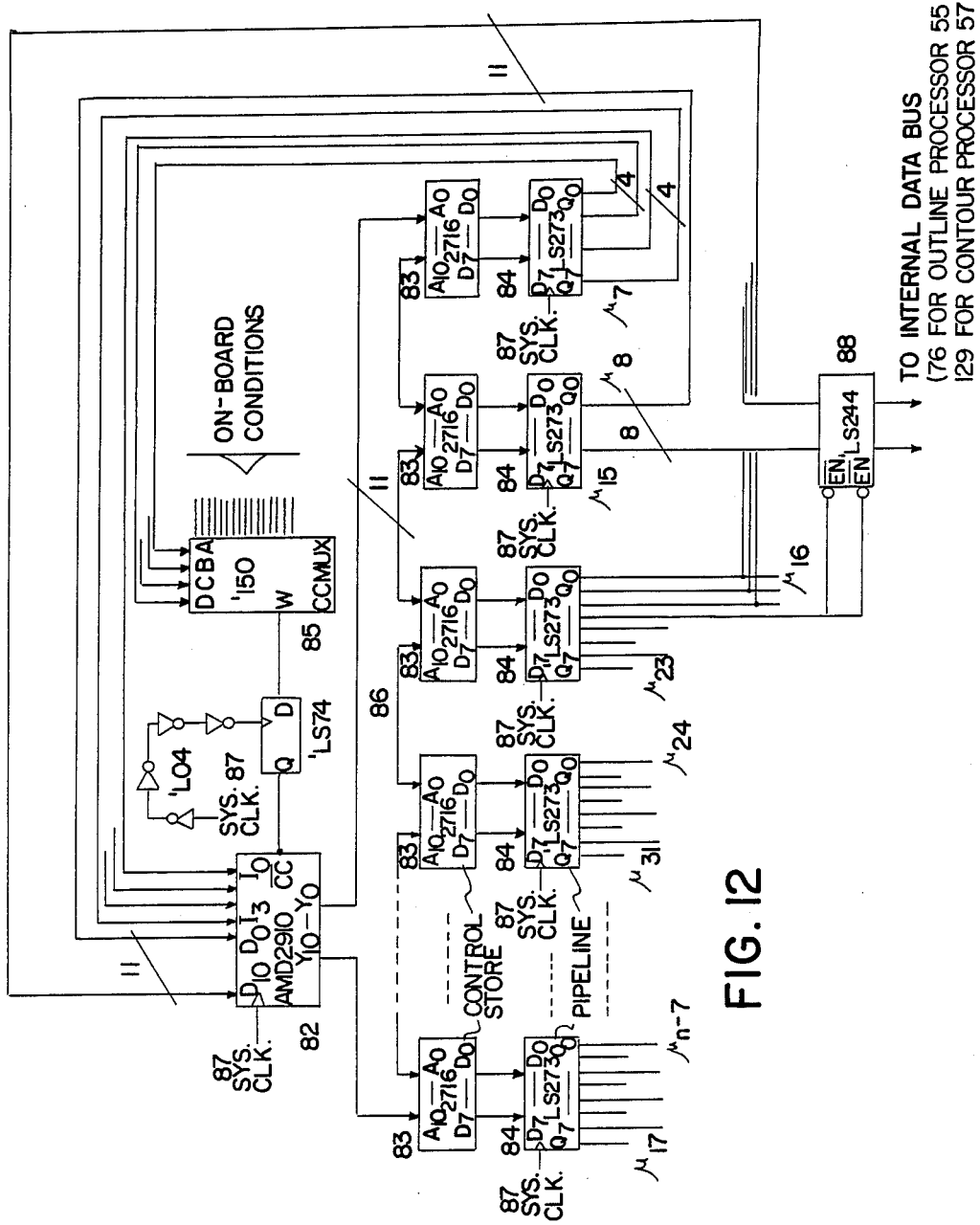
FIG. 12 illustrates circuitry detail from a microengine architecture, i.e. an implementation of microcode control used in the described embodiment.

Since speed is of the essence, the outline processor 55 microword is wide (almost 80 bits) rather than deep (by 'microword' we mean the bit values stored in the control store PROMs 83 in FIG. 12 at any given memory address. All the bits of a given microword emerge in parallel when the control store PROMs (83) are addressed by the microcode sequencer 82 via the address path 86. The outline processor 55 microcode runs at a constant speed of approximately 630 nanoseconds per cycle, clocked by an on-board signal shown as 87 in FIG. 12 and identified as 'sys. clk'. This clock speed is dictated largely by the access time of the microcode PROMs 83. The clock rate limits the amount of on the fly processing possible—the interval between horizontal blanking periods 34 is 63 microseconds (see FIG. 4), so about 100 microcode instructions can be executed for each scan line. Although the apparatus as disclosed herein is adequate for the embodiment shown in FIG. 1, it is fully recognized that the use of faster memories for control store 83 allows more extensive processing.

Still referring to FIG. 12, the microcode sequencer 82 keeps track of various events, i.e. on-board conditions, via a 16-to-1 condition code multiplexer, shown as 85. Arithmetic and logical functions, i.e. process steps, such as addition, subtraction, and magnitude comparison, are carried out by specialized circuitry, shown as 74 in FIG. 9 and identified by the short-hand expression 'arithmetic and logic functions'. The output of a magnitude comparison operation is an example of the type of on-board condition fed into the condition code muItIpIexer 85 in FIG. 12. These process steps, i.e. arithmetic and logical operations, are under the direct control of the micro-engine 75 detailed in FIG. 12. On-board values are brought in for the process steps, i.e. arithmetic and logical operations, via an 8-bit wide internal data bus, shown as 76 in FIG. 9, and called 'internal data bus 762' hereinafter. The micro-engine illustrated in FIG. 12 itself has direct access to the internal data bus 76 via the data latch shown as 88 in FIG. 12, so it (the micro-engine 75) can write pre-defined values to various registers such as the temporary storage registers identified as 73 in FIG. 9 when appropriate.

The micro-engine 75 also directly controls access to a number of outline sensor buffer registers, collectively identified as 71, via the hardwired link identified earlier as 70 in FIG. 7. This link 70 comprises the connection between the buffer registers 71 and the outline processor 55 internal data bus 76, as well as a connection from the micro-engine 75 which is identified by the word 'control' in FIG. 9.

Further describing the functional units shown in FIG. 9, a large number (approximately twenty) of on-board registers 73 provide dedicated temporary storage during processing. Only two of these registers 73 are actually illustrated in FIG. 9; the others are implied through an ellipsis. On the fly operation would be impossible if every value needed during calculation had to be moved into and out of the relatively slow on-board memory 72. Instead, interim values for results such as the cumulative motion values mentioned earlier are kept in some of the dedicated temporary storage registers 73 while the scan is in progress. Calculated values are transferred from temporary storage 73 to the on-board memory 72 during the vertical blanking period 35. The micro-engine 75 recognizes the advent of the vertical blanking period 35 via the condition code multiplexer 85, and responds by controlling the temporary storage registers 73 and the on-board memory 72 so as to move information from the former to the latter via internal data bus 76.

Since the outline processor 55 must refer to information from the previous scan during some of its calculations, it maintains two copies of all of the information described above in the on-board memory 72—one version from the previous scan completed, and the other for the scan currently being processed. This double buffering of memory makes it possible for software to read the results of the previous scan, at the same time that the outline processor 55 is working on the current scan in the other half of memory 72. Only the complete version is accessible through software, ensuring that the values read by the software are always correct and internally consistent.

The outline processor 55 is designed to minimize the need for software control. A single software instruction can put the outline processor 55 into free-run mode, with the result that the outline processor 55 processes every odd scan as it comes along. Alternatively, the software, i.e. method steps, can initiate an on-request mode, forcing the outline processor 55 to wait for a further software signal before starting processing of each new scan. In either case, the actual processing done in the outline processor 55 is exactly the same. Moreover, the software, i.e. method steps, can make a request for processing at any time, since the hardware, i.e. the outline processor 55, will take care of the necessary wait for the top of the next odd scan before starting to collect outline points from the outline sensor 54. As explained earlier, image information is captured only during the odd scan, i.e. the odd half of the interlace pattern, in order to avoid spurious up and down motion in the captured image from frame to frame. A binary flag (not shown in FIG. 9) is made available which can be read by the software at any time, indicating the moment when the outline processor 55 completes the requested processing of a scan.

Reading results from the outline processor 55 after processing is quite simple, thanks to the double buffered memory, described above and shown as 72 in FIG. 9. If desired, the software can read any value produced by the outline processor 55 at any time.

Figure 10:
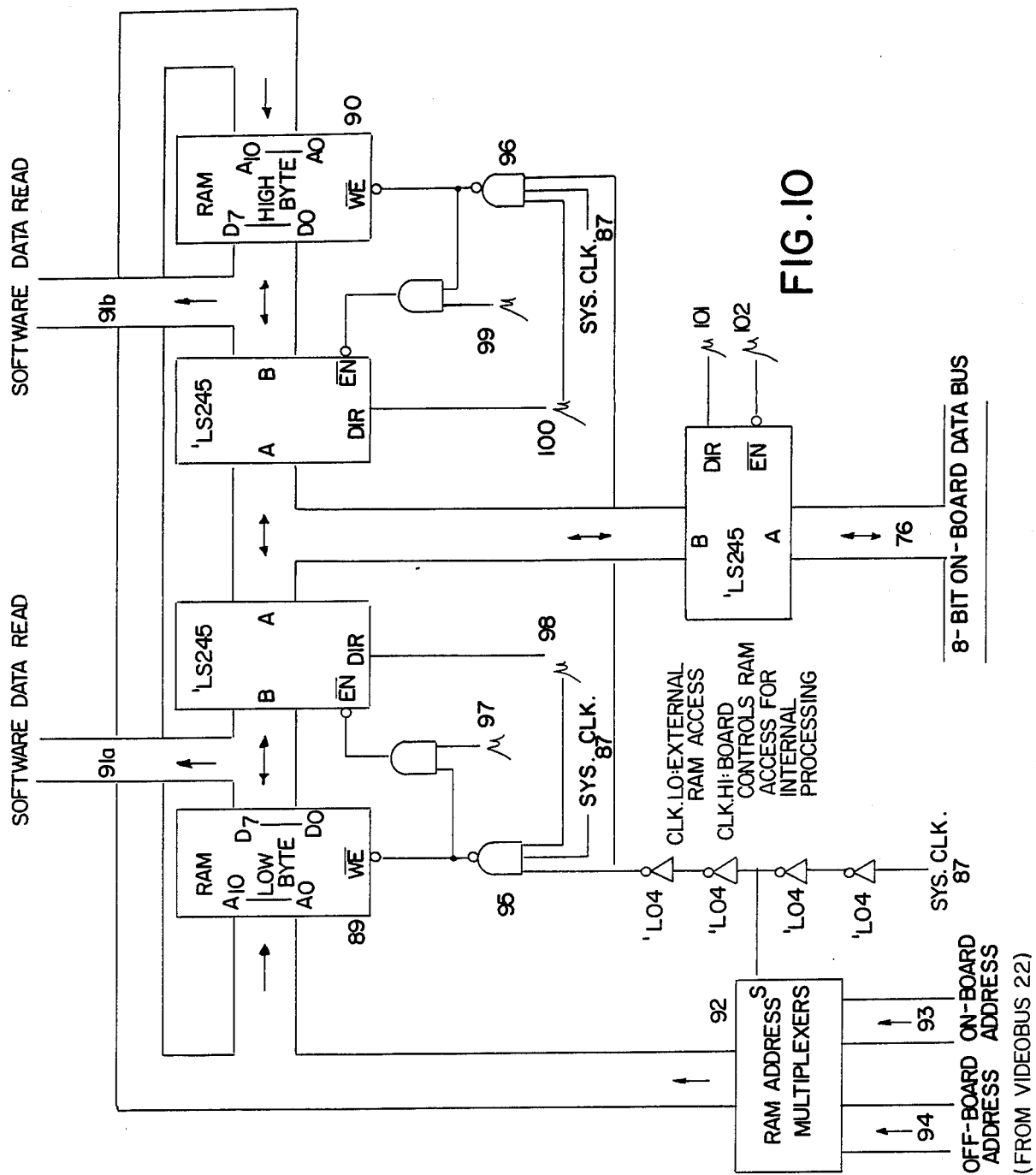
FIG. 10 illustrates a circuitry detail from an outline processor such as is shown in FIG. 9.
Figure 11:
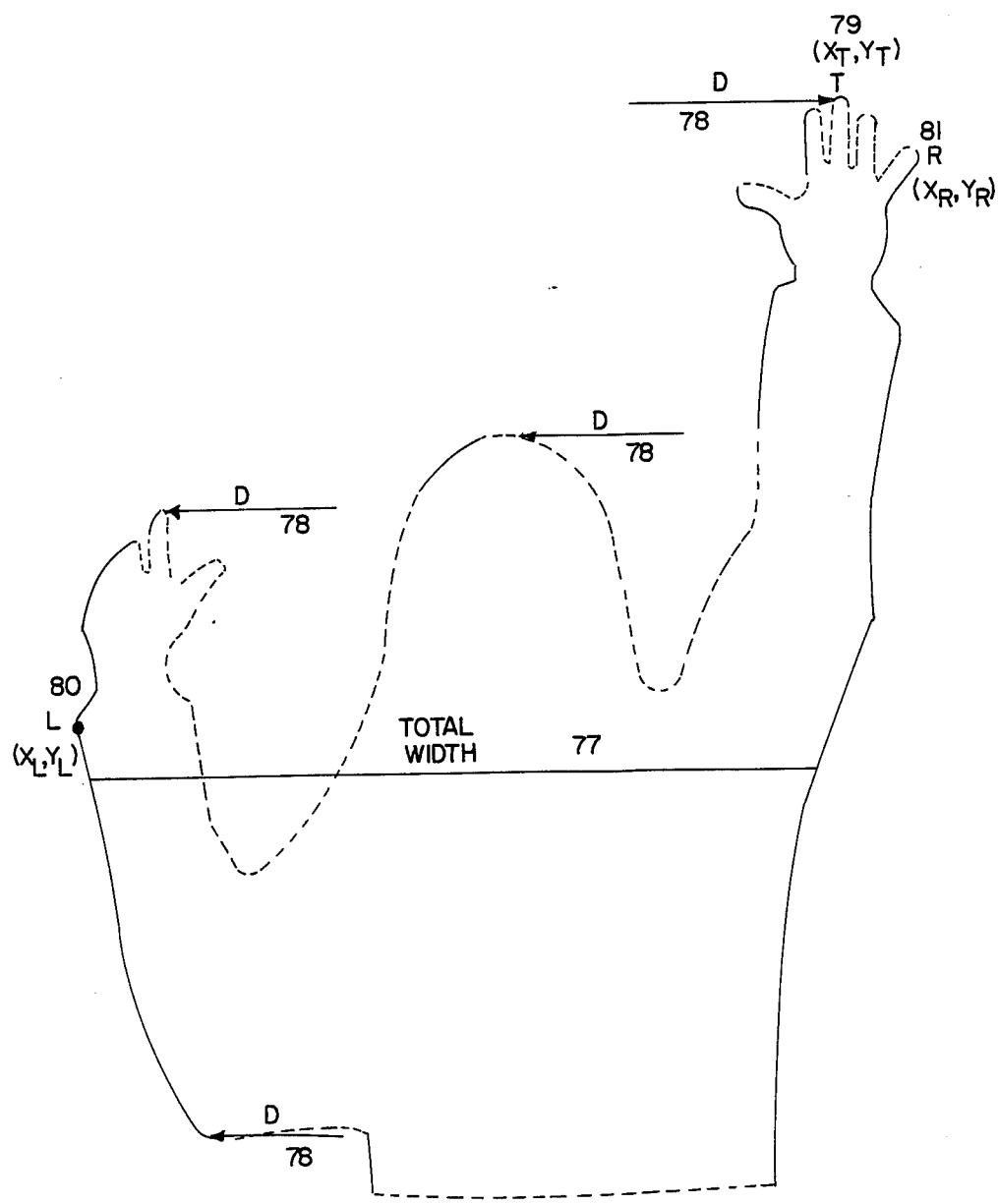
FIG. 11 illustrates the type of information extracted by an outline processor such as is shown in FIG. 9, given a typical binary image.

As shown in greater detail in FIG. 10, access to the outline processor 55 on-board memories 89 and 90 is shared between outline processor 55 on-board hardware and external software during each 630 nanosecond clock 87 cycle, with the software placing a request on the VIDEOBUS 22 and accessing the outline processor 55 memories 89 and 90 through the data paths shown as 91a and 91b (shown collectively as data path 91 in FIG. 9). The 630 nanosecond on-board clock is shown as 87 in FIG. 10 and identified as 'sys clk.'

A set of multiplexers, collectively identified as 92, receives input from the outline processor 55 on-board circuitry via the input path shown as 93 and identified as 'on-board address'. This input consists of memory addresses which the micro-engine 75 in FIG. 9 needs to access for calculation or for storage of results. The other set of inputs to the multiplexers 92 comes from external software via the input path shown as 94 and identified as 'off-board address'. This input consists of memory addresses which the software needs to read in order to make use of outline processor 55 data. The software running on the main system processor 19 places the address of a memory location to be read from memories 89 and 90 onto the VIDEOBUS 22, whereupon the requested address is passed to the multiplexers 92 via path 94. The exact details of the outline processor 55 VIDEOBUS 22 interface circuitry are not shown in FIG. 10, as the design of processor/bus interfaces is well known in the art.

Again referring to FIG. 10, access to the memories 89 and 90 is shared as follows. During the low half of each on-board clock 87 cycle, external (i.e. from software) addresses are passed through the multiplexers 92 to the random access memory (RAM) chips 89 and 90. These chips are readily available 2K by 8 static RAMs, such as the 6116 chip manufactured by Hitachi. At the same time, the low clock value, passing through the NAND gates 95 and 96, serves to disable memory writes. When the on-board clock 87 goes high, on the other hand, the on-board circuitry gains access to the RAM chips 89 and 90, and can read from or write to a chosen memory location, based on the values of the various control lines from the microcode, shown as 97 to 102. Illegal combinations of control bits are disallowed. The low byte 89 and high byte 90 RAMs are accessible in parallel to external software via the data paths 91a and 91b, although the outline processor 55 on-board circuitry, being limited to the 8-bit internal data bus 76, can only access one byte, i.e. one of the two memories 89 and 90, at a time. The need for 16 bits per word of memory is evident from the fact that some outline processor 55 results, namely the cumulative motion values, are too large for a single byte.

In some cases, a programmer may wish to synchronize the software running on the main system processor, shown as 19 in FIG. 3, with the operations of the outline processor 55, ensuring that all data read from the on-board memory 72 in FIG. 9 during a particular software cycle actually derives from the same scan. This can be done by placing the outline processor 55 into on-request mode and then going through a software cycle of issuing a request, checking the binary status flag (described earlier, not shown) to determine if processing is complete, reading all required data from the on-board memory 72, issuing a new request, and so on. While the outline processor 55 is dealing the new request, the software running on the main system processor 19 can simultaneously carry out further processing on the recorded data from the previous scan.

Turning now to a description of the bit-map processor 56 in FIG. 7, whereas the outline processor 55 deals only with the extreme transition points on each scan line (two data points per scan line, as exemplified by the points 59 and 60 in FIG. 5), the bit-map processor 56 has sufficient on-board memory to store the entire binary threshold image for a particular scan. Once such an image has been captured, the bit-map processor can check the status of any one of the sixty five thousand image pixels by reading its value from the on-board memory, shown as 110 in FIG. 13.

Capturing a binary image, as illustrated in FIG. 5, is not enough in itself—given such an image, useful processing steps must be carried out. In looking at a silhouette picture (please refer to FIG. 5), it is clear that much of the inherent information is contained in the edges 58 of the silhouette—the transition points between the person and the background are often points of interest. Outline processing steps have access to some of this transition information, focusing on the first and last transitions on each scan line, exemplified by points 59 and 60 respectively on the scan line identified as 61 in FIG. 5. The bit-map processor 56 goes much further in this direction, being able to find transition points anywhere on the edge of the silhouette, without being limited to the scan line organization of the outline tables.

The major functions of the bit-map processor 56 can be described as the capture of a readable bit-map image, containing all the binary information available in an image such as that shown in FIG. 5, and the location of background-to-participant and participant-to-background transitions, i.e. edge points such as 58, within that image. Specifically, the bit-map processor 56 has five mutually exclusive modes of operation or functions. These are (1) image capture, (2) image display, (3) unlimited transition search, (4) limited transition search, and (5) pixel read-back. Unlike the outline processor 55, the bit-map processor 56 uses a strict harware implementation to carry out all on-board tasks, i.e. tasks carried out within the bit-map processor 56, with no resort to microcode. External software accessing the bit-map processor 56 from the VIDEOBUS 22 must specify one of the particular five functions listed above to be executed, as well as providing any necessary parameters to the bit-map processor 56. Results are passed back to external software when requested, via 104 and 105.

The key function, listed as function (1) above, performed by the bit-map processor 56 is the simple capture, at video rates, of a new threshold image. The second function, listed as function (2) above, allows the output, also at video rates, of the current on-board data onto one of the eight bus video lines referenced earlier with respect to VIDEOBUS 22 specifications. The remaining three functions, listed as functions (3) to (5) above, involve the extraction of information from the stored image.

Figure 15:
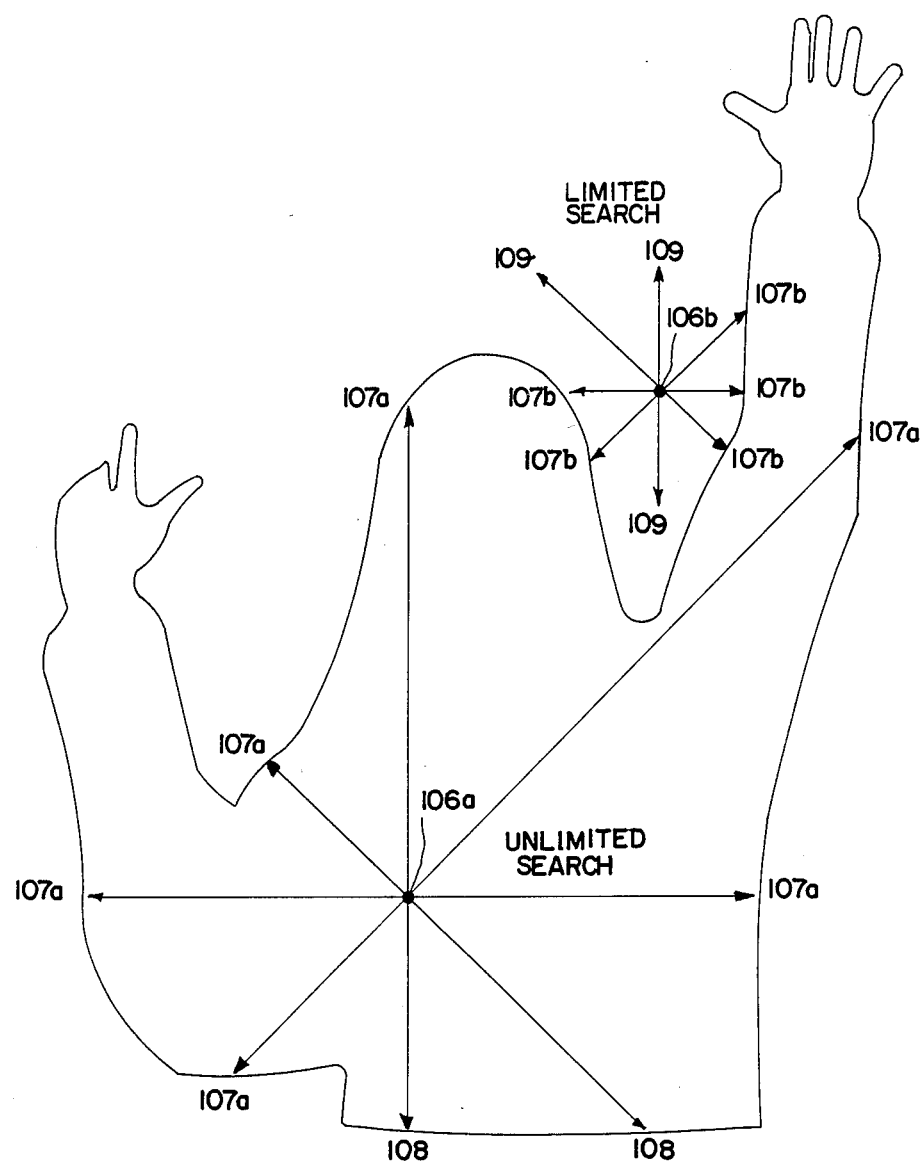
FIG. 15 illustrates the type of information extracted by a bit-map processor such as is shown in FIG. 13, given a typical binary image.

With reference now to FIG. 15, given a starting pixel denoted as 106a, the bit-map processor 56 can search, i.e. function (3) above, for the nearest transition point, shown as 107a and 108, in any one of eight directions (up, down, left, right, or along one of the four diagonals). Alternatively, i.e. function (4) above, the bit-map processor 56 can be told to look for a transition point in a specified direction, but to conduct its search only within a certain limited distance from a starting pixel shown as 106b. In both of these cases, i.e. functions (3) and (4), the software requesting the boundary search must provide all necessary initial parameters, including X and Y coordinates for the respective starting pixel, i.e. 106a or 106b, the desired search direction, and, in the case of the limited transition search, the maximum allowed search distance or limit. The final function, i.e. function (5) above, supported by the bit-map processor 56 is the ability to read back any specified pixel, and to report its binary value to external software via data path 105 in FIG. 13. In this case also, i.e. the case of the pixel read-back function, the software must first provide the bit-map processor 56 with the X and Y coordinates of the pixel in question.

Figure 13:
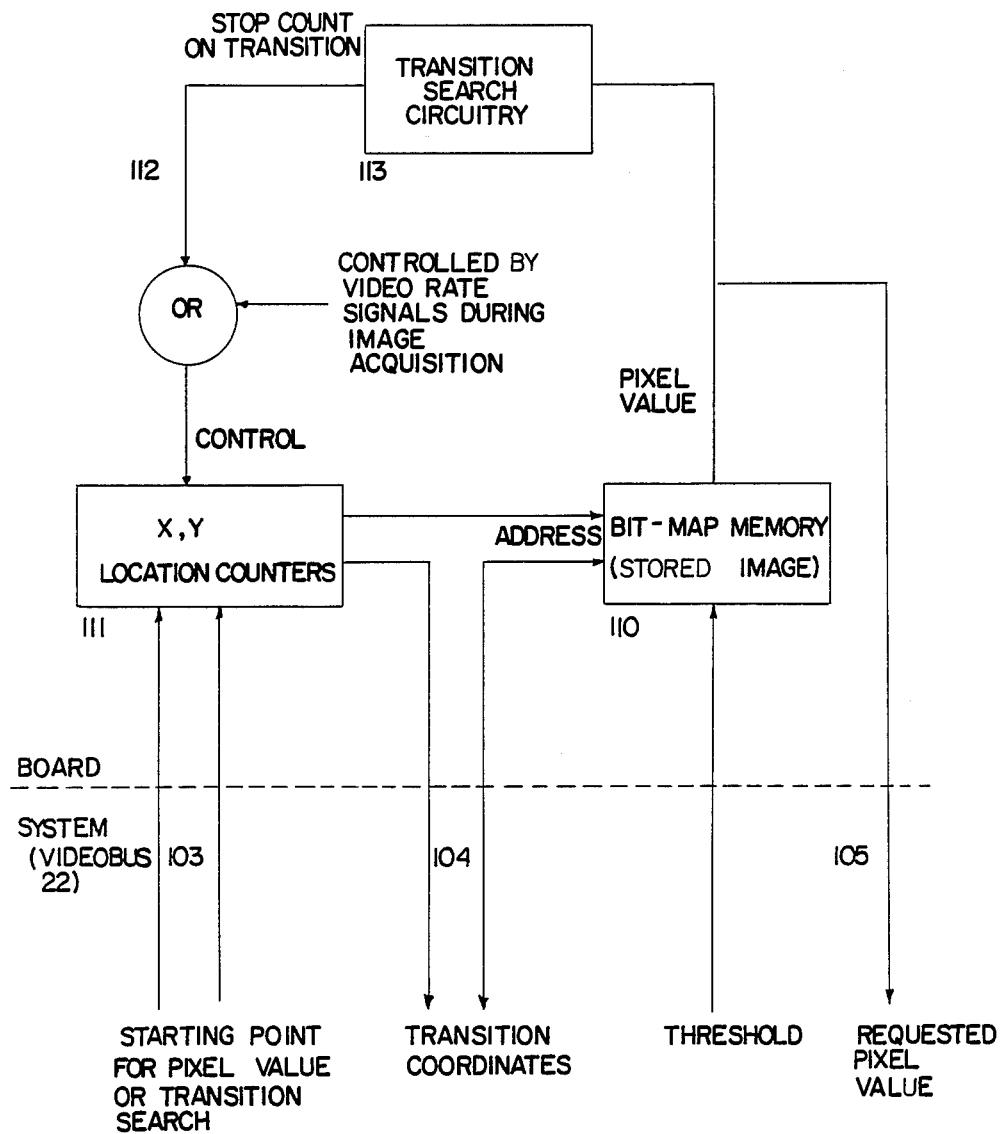
FIG. 13 illustrates a high level block diagram of a bit-map processor, i.e. the hardware responsible for directed transition searches from any point in an image.
Figure 14:
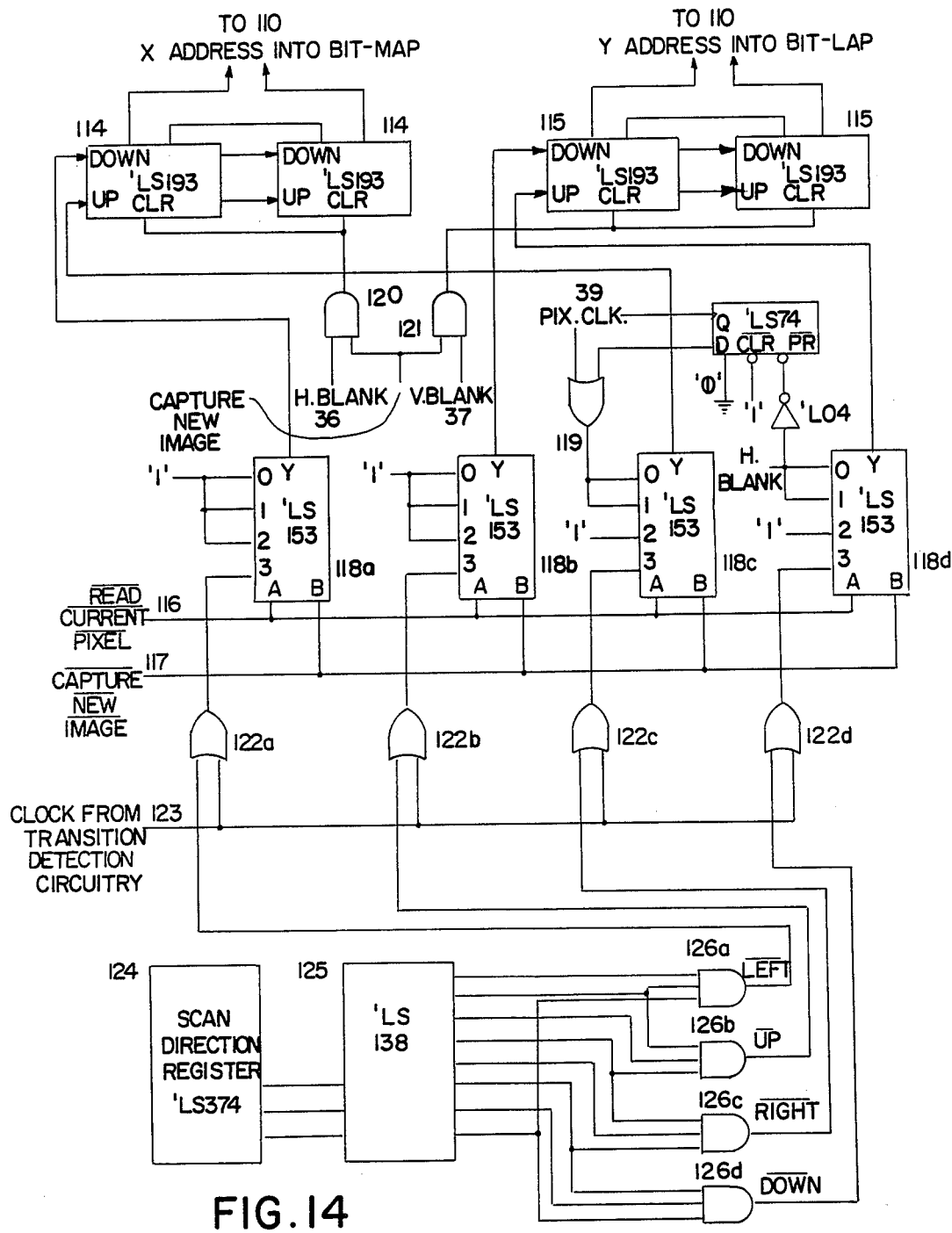
FIG. 14 illustrates a circuitry detail from a bit-map processor such as is shown in FIG. 13.

Turning now to FIG. 13, this drawing provides a high level functional overview of the organization of the bit-map processor 56, first shown in FIG. 7. The bit-map memory 110 is accessed via a set of X and Y location counters 111. The control of these location counters 111 is dependent on the particular function (of the five functions listed above) which has been specified. During image acquisition or display (functions 1) and (2) above), the X and Y location counters 111, shown in more detail as 114 and 115 in FIG. 14, are clocked at video rates, as will be explained in more detail below with respect to FIG. 14. This is done in order to synchronize the arrival of data with sequential access to bit-map memory (shown as 110 in FIG. 13) locations.

In the case of the pixel read-back function, i.e. function (5) above, the location counters 111 in FIG. 13 are simply loaded with the values specified by software via data path 103 and are not clocked at all. During unlimited or limited transition searches, i.e. functions (3) or (4) above, after being loaded with the specified starting coordinates via data path 103, the location counters 111 are clocked via signal 112 at a rate commensurate with the needs of the transition search and detection circuitry 113. This circuitry, i.e. transition search circuitry 113, turns off the clock 112 to the location counters 111 as soon as a transition point (e.g. points shown as 107a and 107b in FIG. 15), a screen boundary (e.g. points shown as 108 in FIG. 15), or the end of a limited search range (e.g. points shown as 109 in FIG. 15) is encountered.

Some of the circuitry controlling image acquisition and directional search is pictured in FIG. 14. Depending on the selects (signals 116 and 117 going to the inputs marked 'A' and 'B') at the multiplexers 118a to 118d, the clock inputs to the X location counters 114 and the Y location counters 115 may be controlled in a number of different ways. The select signals 116 and 117 are directly derived from the function selected of the five functions listed above.

If the image capture or image display function, i.e. function (1) or function (2) above, is chosen, then the X location counters 114 are clocked via multiplexer 118c by a signal 119 derived from pixel clock 39 while the Y location counters 115 are clocked via multiplexer 118d by the horizontal blanking signal 36. At the same time, the appropriate clear inputs to the X and Y location counters 114 and 115 are enabled via the AND gates 120 and 121. If the pixel read-back function, i.e. function (5) above, is chosen, all the multiplexers 118a to 118d output a logic '1' (selecting the logic '1' input which arrives at the input pin marked '2' at each multiplexer 118a to 118d chip), and the X and Y location counters 114 and 115 are not clocked.

Finally, if one of the directional search functions is chosen, i.e. function (3) or function (4) above, the multiplexers 118a to 118d pass on the outputs of a set of OR gates 122a to 122d. Each of these gates 122a to 122d essentially acts as a switch, either transmitting or blocking a clock pulse 123 from transition detection circuitry (not shown in detail). These OR gates 122a to 122d are part of the functional unit identified as 'transition search circuitry' 113 in FIG. 13, with the outputs of the OR gates 122a to 122d corresponding to the signal path shown as 112 in FIG. 13. The setting of these switches, i.e. the OR gates 122a to 122d, depends, in turn, upon the 3-bit value in the scan direction register 124. If, for example, the requested direction is either left, up and left, or down and left, the corresponding output on the decoder 125 will go low, which causes the output of the AND gate 126a to go low also. This then 'switches on' the matching OR gate 122a and allows a clock signal derived from 123 to pass through multiplexer 118a and to reach the 'down' input of the X location counters 114.

Referring again to FIG. 15, this drawing illustrates the type of information available from the bit-map processor 56. Both a limited (starting at the pixel shown as 106b) and an unlimited (starting at the pixel shown as 106a) transition search are shown. Either type of search ends when a background-to-participant (e.g. the points shown as 107b) or participant-to-background (e.g. the points shown as 107a) transition is encountered or when the image boundary, i.e. screen boundary, is reached 108. The limited search also comes to an end if the specified search distance from the starting pixel 106b is exceeded 109. Note that a limited search on the diagonal covers a longer distance than a horizontal or vertical search—this is because the diagonal search is simply implemented by clocking the X and Y location counters, shown as 114 and 115 in FIG. 14, simultaneously.

Directional search for transitions, from any starting point, yields immediate benefits when the bit-map processor 56 is placed into operation. In the long run, however, it is contemplated that the pixel by pixel readability of an entire bit-map image, such as is shown in FIG. 5, suggests itself as a more important feature for supporting additions and improvements to vision processing capabilities. This read-back capability gives freedom from video rate constraints by the fact that the captured image contains every last bit of information available from the threshold signal for a single frame. This means that any conceivable process step dealing with a static image can now be modeled and tested in software. In other words, the bit-map processor 56 makes it possible to test sequences of process steps for other special purpose vision processors (e.g. the contour processor, shown as 57 in FIG. 7, which will be further discussed herein) although, of course, such test programs will not be able to approach the speed of hardware. Software test programs, combined with the above information and the illustrated hardware, now make it possible to model and design equivalent new hardware.

Figure 16:
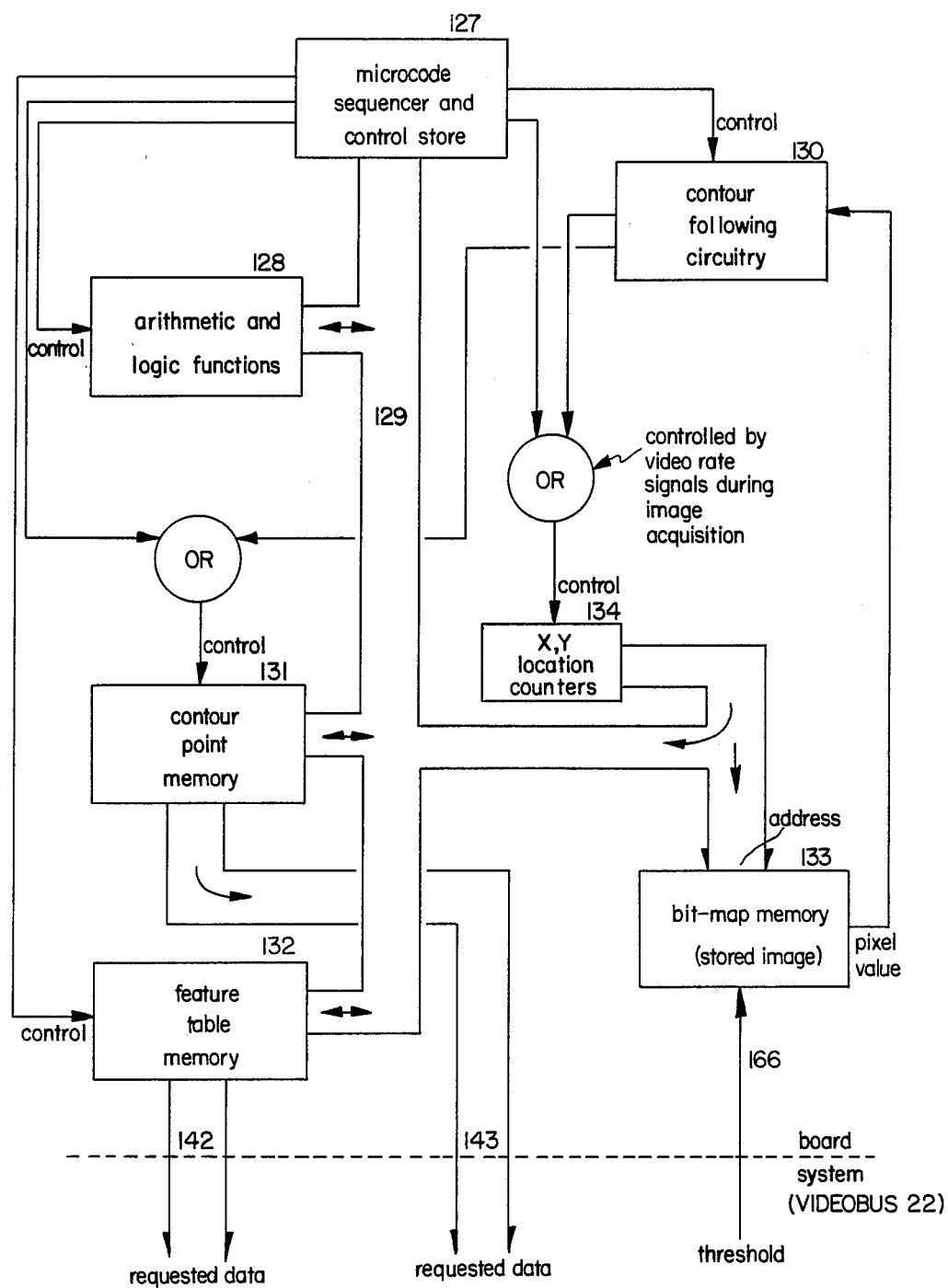
FIG. 16 illustrates a high level block diagram of a contour processor, i.e. the hardware responsible for contour following and finger detection.

Turning now to the contour processor, shown as 57 in FIG. 7, the contour processor 57, like the bit-map processor 56, starts its work by capturing a 256 by 256 pixel binary image and storing it in on-board memory, shown as bit-map memory 133 in FIG. 16. This image capture is the necessary first step for all further processing of the image. The contour processor 57 is similar to the other vision processors, i.e. the outline sensor 54, the outline processor 55, and the bit-map processor 56, in that it focuses on transition or edge points in the incoming image (as exemplified by the points shown as 58 in FIG. 5).

The contour processor 57, differs from the other vision processors, i.e. the outline sensor 54, the outline processor 55, and the bit-map processor 56, in imposing a different sort of organization on the transition points, thus recording these transition points according to their order of occurrence along the edge of the image of the participant's body. If one pictures the binary image shown in FIG. 5 as a landscape, with the participant's silhouette 43 rising above the background 42 like a plateau, then the contour processor 57 follows the path of a person who walks along the base of the plateau while constantly keeping one hand on the wall beside him. The 'walk' continues until the loop is closed by a return to the starting point.

Once all contour points have been found, further processing allows the detection of certain feature, such as fingers or hands. For the purposes of the processing steps carried out by the contour processor 57, a feature is defined as a relatively sharp curvature along the contour. It may be helpful at this point to refer to FIG. 18, which will be explained in more detail below. If one imagines taking a piece of string of fixed length (e.g. 135 in FIG. 18) and gradually moving it along the contour, then, whenever the two ends of the string are relatively close together (e.g. 136 or 137 in FIG. 18), a possible feature has been found. The midpoint of the string (e.g. 136b or 137b in FIG. 18) as it lies along the contour would be taken as the location of the feature.

Figure 18:
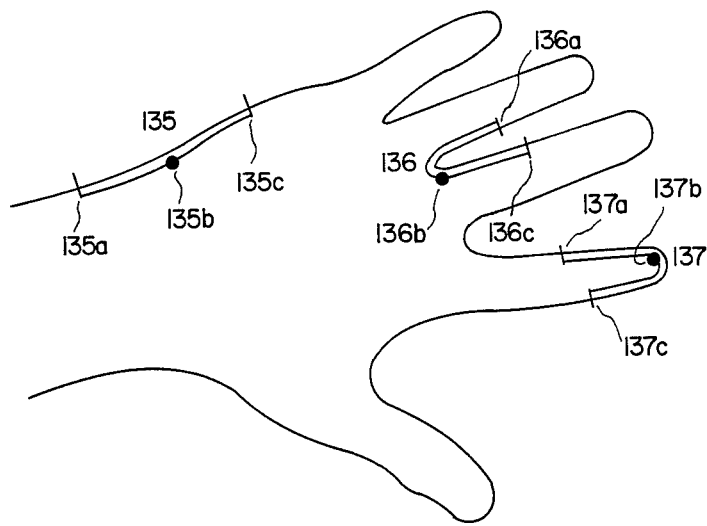
FIG. 18 represents, in general terms, contour processor feature detection process steps.

Basically, the contour processor 57 is engaged in frequency filtering as it traverses the sequence of previously recorded contour points. The search offset distance (the length of the string in terms of number of contour points included) and the minimum and maximum feature width (the needed distance between the two ends of the string) can be specified through software, allowing the extraction of a number of different types of features from the same set of contour points. In other words, multiple passes through the data are possible, each with a different set of filter parameters. Thus, FIG. 18 illustrates some of the basic concepts involved, showing three sequences of contour points of equal length, i.e. each sequence containing an equal number of immediately sequential contour points, at different positions along the contour of a silhouetted hand. In the first sequence 135, along the side of the hand, the end points 135a and 135c are far apart and none of the finger identification criteria are met. The second segment 136 does satisfy the end to end distance criterion between points 136a and 136c as does the third segment 137, so the midpoints 136b and 137b of the two seqments 136 and 137 are both possible candidates as fingertips. It is clear, however, that only one of these points 137b actually represents a fingertip, and that the other 136b should be disqualified. This distinction is only one example of the many special cases which must be handled by the contour processor 57, and is indicative of the complexity of the on-board processing representative of the contour processor 57.

This complexity has necessitated a design based on extensive microcode control. To give some idea of the level of complexity of the contour processor 57 process sequences, the contour processor 57 has over 1000 lines of microcode (compared to a total of about 300 lines on the outline processor 55). At each stage of contour processing, as the process sequences to be executed become more complex, the microcode becomes more heavily involved.

Figure 20:
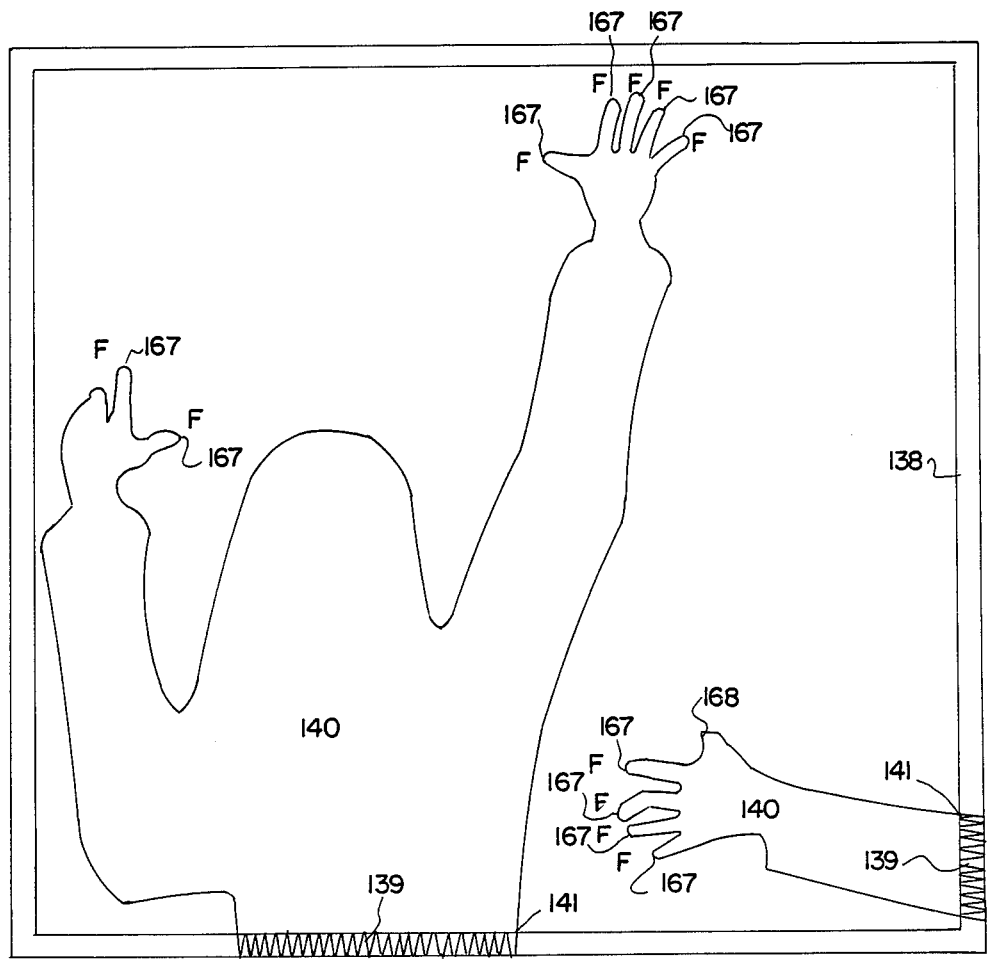
FIG. 20 illustrates the type of information extracted by a contour processor such as is shown in FIG. 16, given a typical binary image.

The initial capture of the binary threshold image is almost entirely under hardware control—the microcode 127 simply gives a signal initiating the capture. The capture does involve some subtleties in itself, however, as illustrated in FIG. 20. In order to facilitate later contour following, the image (i.e. the entire bit-map image, consisting both of participant and of background pixels, as defined earlier with respect to FIG. 5) is written into the bit-map memory 133 in FIG. 16 with a border of background pixels, shown as 138 in FIG. 20, on all four sides of the image. This ensures that any region of participant pixels will be completely surrounded by background, rather than running off the edge of the screen. The shaded areas 139, which are included in the silhouettes 140 of the two participants in the incoming threshold signal, are replaced by background pixels as the image is recorded in bit-map memory 133.

At the next stage, the microcode 127 must locate starting points for contour following. A clock-wise circuit is made of the four sides of the image, just inside the frame of background pixels 138 shown in FIG. 20, and every background-to-participant transition 141 encountered during the clock-wise circuit is recorded as a possible starting point for contour following. This strategy is, of course, based on the assumption that the participant will intersect at least one of the four sides of the screen—he is unlikely to float in front of the camera without visible means of support. The actual pixel by pixel contour following is executed in hardware, shown as 130 in FIG. 16 and identified as 'contour following circuitry', while the micro-engine 127 stands by and waits. As soon as a boundary case is encountered, which is defined through the design of the hardware as a return to the edge after once having left it (i.e. whenever one of the points shown as 141 in FIG. 20 is encountered), the microcode 127 steps in again, since the necessary decisions are too complex to be handled by the hardware contour following circuitry 130.

Finally, during the feature detection passes, the microcode 127 is in constant control, sequencing through the contour point memory (shown as 131 in FIG. 16), directing the calculation of point to point distances, determining when a feature has been found, and recording the location of detected features in on-board feature table memory (shown as 132 in FIG. 16). The problem of distinguishing a positive feature (e.g. a fingertip 137b) from a negative feature (e.g. the base of a finger 136b) is dealt with at this point, as are a number of other special cases.

The overall organization of the contour processor 57 can best be seen in FIG. 16. The micro-engine 127, which is shown in further detail in FIG. 12, is based on an AMD2910 microcode sequencer 82 addressing a microcode store in PROM 83. As with the outline processor 55, since the main goal is speed, the microword is wide (67 bits) rather than deep. A 16-to-1 condition code multiplexer 85 brings various events, i.e. on-board conditions, to the attention of the microcode sequencer 82. As an aside, FIG. 12 was also used to illustrate the outline processor 55 micro-engine, since the design of the micro-engine is basically the same for the outline processor 55 and the contour processor 57—only the number and arrangement of microword bits and the exact contents of the control store 83 distinguish the two micro-engines from one another. See the attached microcode listings (Appendices A and B) for more information on the microcode control fields and process steps for both the outline processor 55 (see Appendix A) and the contour processor 57 (see Appendix B).

Arithmetic and logical operations, such as addition, subtraction, and magnitude comparison, can be carried out by hardware, shown collectively as 128 in FIG. 16, under the direct control of the micro-engine 127. Various on-board values can be brought to this hardware 128 for processing by means of an 8-bit wide internal data bus 129. The micro-engine 127 also has direct access to internal data bus 129, and is thereby able to write pre-defined values to various on-board locations when appropriate.

In addition to the arithmetic and logical hardware 128 described above, the contour processor 57 has hardware 130, identified in FIG. 16 as 'contour processing circuitry', specifically designed to do basic contour following. This hardware 130 will be discussed in more detail hereinafter with reference to FIG. 19. Thus, the micro-engine 127 will determine starting points for contour following, will set up the necessary starting conditions, and will then relinquish control to the contour following hardware 130. The hardware contour following circuitry 130 retains this control, finding and recording contour points in the contour point memory 131, until it reaches some exit condition which requires further microcode processing. The microcode sequencer, shown as 82 in FIG. 12, recognizes the exit condition via the condition code multiplexer 85, and the micro-engine, shown collectively as 127 in FIG. 16, resumes its operations.

Still referring to FIG. 16, the third major functional component of the contour processor 57, in addition to the micro-engine 127 and the contour following hardware 130, is on-board memory, subsuming the contour point memory 131, the feature table memory 132, and the bit-map memory 133. These memories, i.e. 131 to 133, are organized into a number of tables, most of which are accessible to software when processing is complete. The largest table of information produced by the contour processor 57 actually consists of two parallel tables, with one containing the X coordinates of recorded contour points, and the other containing the corresponding Y coordinates. These tables in on-board contour point memory 131 have a maximum capacity of 4096 entries, which is more than adequate for the images being processed, even when there are several participants 2 in front of the video camera 4 in the embodiment as shown in FIG. 1.

Returning now to FIG. 16 and continuing with the description of contour processor 57 on-board memory, the feature table memory 132 contains five tables of information accessible to software via the data path shown as 142. These tables in feature table memory 132 are much shorter than the tables in contour point memory 131, and summarize information gathered during contour following and feature detection.

Three of these tables in feature table memory 132 run in parallel, with the first table containing the X coordinates of any features found, the second table containing the corresponding Y coordinates, and the third table containing indices into the contour point tables in the contour point memory 131. That is, for each feature found, a note is made of that feature's position in the sequence of contour points.

To clarify this by an example, suppose that the 300th contour point recorded in the contour point memory 131 satisfies the specified feature criteria during the feature detection pass carried out by the contour processor 57, and further suppose that two features have already been found and recorded up to that point in the feature detection pass. Given these assumptions, the X coordinate of the 300th contour point will be copied from the X contour point table in contour point memory 131 and placed into the next open location (i.e. into location three, since two features have already been found and recorded) in the X feature coordinate table described above as part of feature table memory 132. Similarly, the Y coordinate of the 300th contour point will be copied from the Y contour point table in contour point memory 131 and placed into location three in the Y feature coordinate table in feature table memory 132. Finally, the index value '300' is placed into location three of the feature index table described above as part of the feature table memory 132.

The remaining two tables in feature table memory 132 in FIG. 16 are organized in terms of the number of distinct closed curves detected during contour following. A closed curve is defined as a sequence of contour points with the end point immediately adjacent to the starting point, and with none of the component points being shared with any other curve. For example, if two people are standing in front of the video camera (4), without touching or overlapping their images, then they will form at least two distinct closed curves. FIG. 20 illustrates this case. Of the two remaining tables in feature table memory 132, one table contains information about the number of different curves found, along with indices into the contour point table in contour point memory 131 for the starting and ending point of each curve. The other table contains a count of the total number of features found, as well as a count of features for each independent curve.

Completing the roster of on-board memory for the contour processor 57 is the bit-map memory, shown as 133 in FIG. 16, where a captured threshold image, such as is shown in FIG. 20, is stored. As on the bit-map processor 56, this bit-map memory 133 serving the contour processor 57 is addressed via a set of X and Y location counters 134. Unlike the bit-map memory (shown as 110 in FIG. 13) on the bit-map processor 56, however, this bit-map memory 133 is strictly for on-board use, i.e. within contour processor 57—it cannot be accessed by external software.

Figure 17:
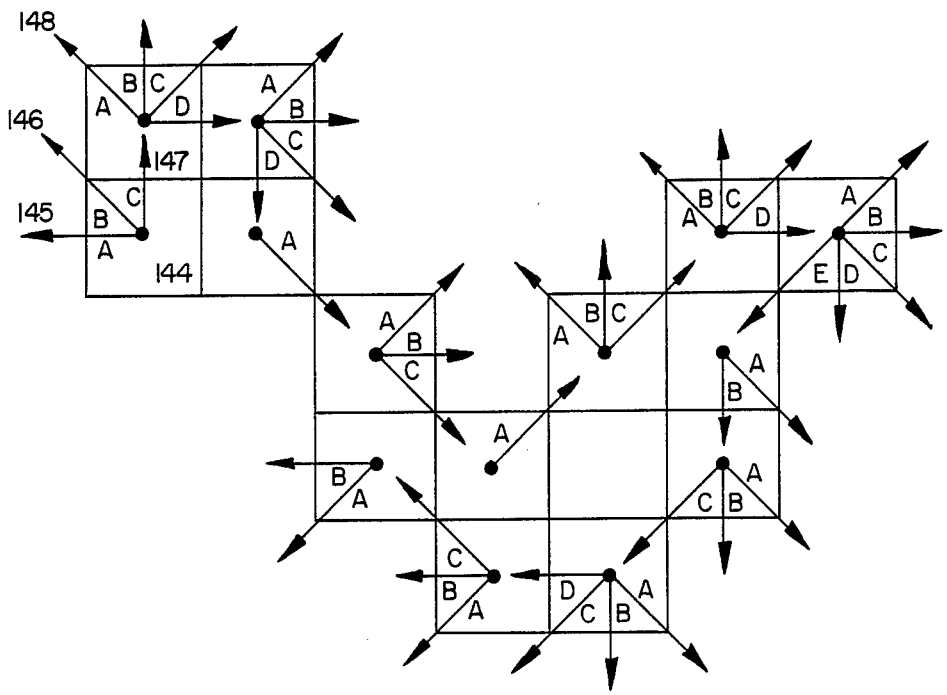
FIG. 17 shows an explanatory diagram which illustrates the method of contour following in a binary image.

FIG. 17 illustrates the basic process steps which underly the contour following hardware which is shown collectively as 130 in FIG. 16. Each square in the diagram in FIG. 17 represents a participant pixel in the threshold image. Assuming that a starting pixel 144 has been located along the contour, the labeled arrows indicate the path taken in following the contour in a clockwise direction. Basically, the contour following process steps involve an ordered examination of the eight neighbors of each contour pixel found. If the neighbor examined 145 is part of the background, then we move to the next pixel in clockwise sequence 146. This pixel is not a contour pixel either, so another move is made in the clockwise direction 147. The target pixel 147 this time is on the contour, so the center of search is moved to this new pixel. We back up by one or two positions from the successful search direction (back up by two positions if the successful search was on the diagonal, back up by one position otherwise) and start a new clockwise search from 147 to 148. Although the complete sequence is not shown in the diagram, repeated application of the contour following rules will eventually lead to a return to the starting point 144.

Figure 19:
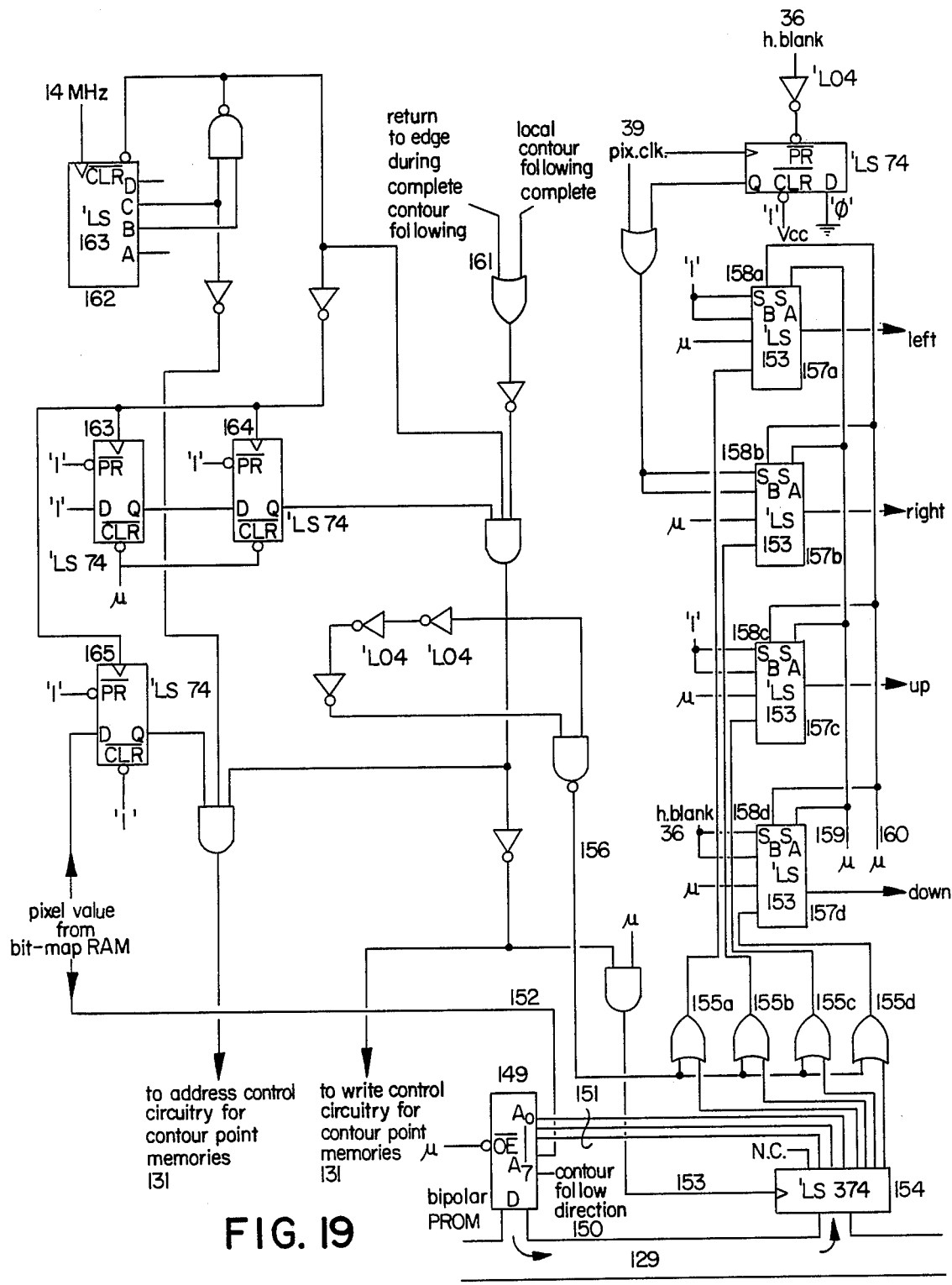
FIG. 19 illustrates a circuitry detail from a contour processor such as is shown in FIG. 16

FIG. 19 shows how these processing steps are actually implemented in hardware. The next pixel to be examined at any point is dictated by a table of rules contained in a bipolar PROM 149. This PROM 149 is a fast access (i.e. 9 nanoseconds) 32 by 8 bipolar PROM, such as is available from Fairchild or Signetics. The location accessed in the rules table in PROM 149 is a function of the travel direction around the contour (clockwise or counter-clockwise), the current search direction (i.e. which neighbor was previously examined—left, up-left, up, up-right, right, down-right, down, or down-left), and the state of that previously examined pixel (on or off).

The travel direction around the contour is shown as signal 150, identified as 'contour follow direction'. The current search direction is indicated by the three signals shown as 151. The state of the previously examined pixel is shown as signal 152, identified as 'pixel value from bit-map RAM'. These five signals together come in on the address lines A0 to A4 of the bipolar PROM 149, thus determining the location accessed in the rules table contained in that PROM 149. The search direction from the previous clock cycle, i.e. from the previous cycle of clock signal 153, is kept in a direction register 154 whose outputs feed back to the address lines A0 to A2 of the PROM 149. The state of the previously examined pixel comes from the bit-map memory (133 in FIG. 16, not shown in FIG. 19) via the signal shown as 152 in FIG. 19.

The outputs of the rules PROM 149, which are passed over internal data bus 129 to and through the direction register 154, are indirectly used to control access to the bit-map memory (133 in FIG. 16, not shown in FIG. 19) which contains a threshold image such as is shown in FIG. 20. As on the bit-map processor 56, the OR gates 155a to 155d in FIG. 19 serve to enable or disable a clock signal 156, depending on the desired search direction. The four potential clock signals are passed on to four multiplexers 157a to 157d whose outputs, identified as 'left', 'right', 'up', and 'down', go directly to clock the X and Y location counters (shown collectively as 134 in FIG. 16, not shown in FIG. 19) which control access to the bit-map memory 133. This part of the design is analogous to circuitry described earlier for the bit-map processor 56. The select inputs 158a to 158d for the multiplexers 157a to 157d are controlled by microcode, i.e. by specific bits from the previously described microword in control store 83 in FIG. 12. These microword bits to the select inputs 158a to 158d are shown as 159 and 160 in FIG. 19.

The contour following circuitry shown in FIG. 19 involves some fairly complex timing, since a number of different activities must be perfectly coordinated within each clock cycle. The location counters 134 in FIG. 16 must be incremented, the pixel value from the bit-map memory 133 must have time to stabilize, the direction register 154 must be clocked at the right moment by clock signal 153, the present pixel coordinates must be written into the contour point memory 131, and, in the event that a contour pixel is found, the address pointer (not shown) into the contour point memory 131 must be advanced by one location so that the present coordinate values are not overwritten when the next pixel is examined.

At the same time, the contour following circuitry shown in FIG. 19 must be able to recognize when an edge pixel, such as 141 in FIG. 20, is reached, and must respond by turning off the contour following clock and returning control to the micro-engine 127. The hardware logic for edge detection is not shown directly, but is indicated collectively by signal 161, identified as 'return to edge during complete contour following'. Basically, this signal 161 is the result of an OR (logical 'or') function between signals indicating that an edge has been reached at one of the four image edges, i.e. at the top, bottom, left, or right extreme of the image area.

For example, if the present value of the X location counter (included in item 134 in FIG. 16) indicates that the present pixel under consideration is inside the region of frame pixels (shown as 138 in FIG. 20 and described above) on the right side of the image, then the OR function is activated, and signal 161 goes to a logic high level, thereby turning off clock signals to other parts (e.g. the OR gates 155a to 155d and the direction register 154) of the circuit illustrated in FIG. 19. The counter 162 generates the basic clock signals needed by the contour following circuitry shown in FIG. 19, with the remaining gates and the flip-flops 163 to 165 serving to delay and offset the various clock edges (i.e. the moment at which a clock signal makes the transition from one of its possible binary values to the other) as needed within the contour following circuitry of FIG. 19.

The reason for choosing the hardware circuitry of FIG. 19, rather than doing the contour following process steps strictly under microcode control, is speed. The contour following hardware shown in FIG. 19 operates with a 420 nanosecond clock cycle, generated by counter 162, meaning that all processing for one pixel is completed within this time (typically, three or four pixels are processed for every contour pixel actually found). To do the same processing under microcode control would reduce speed by at least a factor of ten, since the microcode operates with a longer clock cycle, and since a number of microcode instruction would be needed to accomplish the various tasks carried out by the specialized hardware shown in FIG. 19 in a single 420 nanosecond interval.

The contour point memory 131 and the feature table memory 132 described earlier are readable by software, via data paths 143 and 142 respectively, but only when contour processor 57 is not actively engaged in processing. Unlike the outline processor 56, the contour processor 57 does not have double buffered memory—while microcode and hardware are engaged in updating the on-board tables in contour point memory 131 and feature table memory 132, those tables are incomplete and are not made available to external software. This design decision was reached to avoid overly complex memory access and to conserve physical space, i.e. area taken up by chips, on the contour processor 57 board.

The nature of the information available from the contour processor 57 also tends to make double buffering unnecessary. In general, external software is concerned with the condensed information in the feature table memory 132. This means that only a few read operations are necessary to transfer all information of interest from on-board feature table memory 132 to external software tables. The contour processor 57 can then continue with the capture and analysis of the next threshold image from the VIDEOBUS 22 threshold signal, shown coming onto contour processor 57 via signal 166 in FIG. 16, while the software goes on to process the feature information derived from the previous image.

Coordination between hardware and software is effected via a processing complete flag (not shown) which is always available from contour processor 57, even while access is denied to the memories 131 and 132. Thus, whenever the software has finished its processing, it can read this one-bit flag, placing a read request onto the VIDEOBUS 22 in order to do so, thus determining if the contour processor 57 is ready with the next set of data points or if, alternatively, the contour processor 57 is still engaged in processing for the last threshold image captured.

To counteract the periodic inaccessibility of the contour processor 57, the controlling software is able to specify a whole series of operations by writing a single byte (eight bits) of information to the contour processor 57 master control register (not shown), thus allowing software and hardware to run independently of one another as much as possible. Any readily available 8-bit register, such as the 74LS374 manufactured by Texas Instruments, can be used to carry out the function of the described master control register on the contour processor 57. The status of each bit written to the contour processor 57 master control register indicates whether or not a particular contour processor 57 operation is requested by the software running on the main system processor 19 in FIG. 3. For example, the software can direct the contour processor 57 to capture a new threshold image from data coming in at 166 in FIG. 16, to do complete contour following, and to search for features of a previously specified size, all with a single command. In the case of feature detection, the software must preface its single write to the contour processor 57 master control register with a specification of desired feature parameters. Once a request for processing is issued, the micro-engine 127 in the contour processor 57 takes responsibility for executing all required tasks in the proper order.

Accurate detection of features, particularly high frequency features such as fingers (see FIG. 18, item 137b and FIG. 20, items identified as 167) has proved to be the contour processor's 57 main strength. For example, fingers can be detected anywhere in the image area, at any orientation, and at high speed. Since human beings have a strong tendency to manipulate physical objects with their hands and fingers, participants in the observed environment commonly try to manipulate graphic objects in the same way. Accurate finger detection allows the system to respond to these attempts in real time in a convincing manner.

As shown in FIG. 20, the fingers 167 detected need not all belong to the same person—in fact, the contour processor 57 can deal capably with three or four participants simultaneously. The reason that the thumb 168 of one of the participants is not picked up as a finger is simply that it is not extended sufficiently to meet the finger parameters specified through software. With slight manipulation, i.e. slight experimentation by changing the finger parameters and observing the consequent performance in finger detection, these parameters can easily be tuned to the desired feature size.

Turning now to the graphics and colorizing feature of the disclosed device, the main graphics processor, shown as 26 in FIG. 3, and the colorizer, shown as 27, work together to produce the image visible on the video projection screen 3. In the simplest sense, the main graphics processor 26 is responsible for the shapes making up the image, while the colorizer 27 is responsible for the colors given to those shapes. Like the video camera 4, which scans the image area to get visual input, the video projector 8 constantly sweeps the screen 3 to produce visible output. For each pixel in the output scan, i.e. at each pulse of the pixel clock 39, the main graphics processor 26 sends a pixel value to the colorizer 27. The colorizer 27 uses this pixel value as an index into its own on-board color tables, shown as 169, 170, and 171 in FIG. 21, looks up the appropriate color levels, and transmits these as voltage levels to the projector 8.

Figure 21:
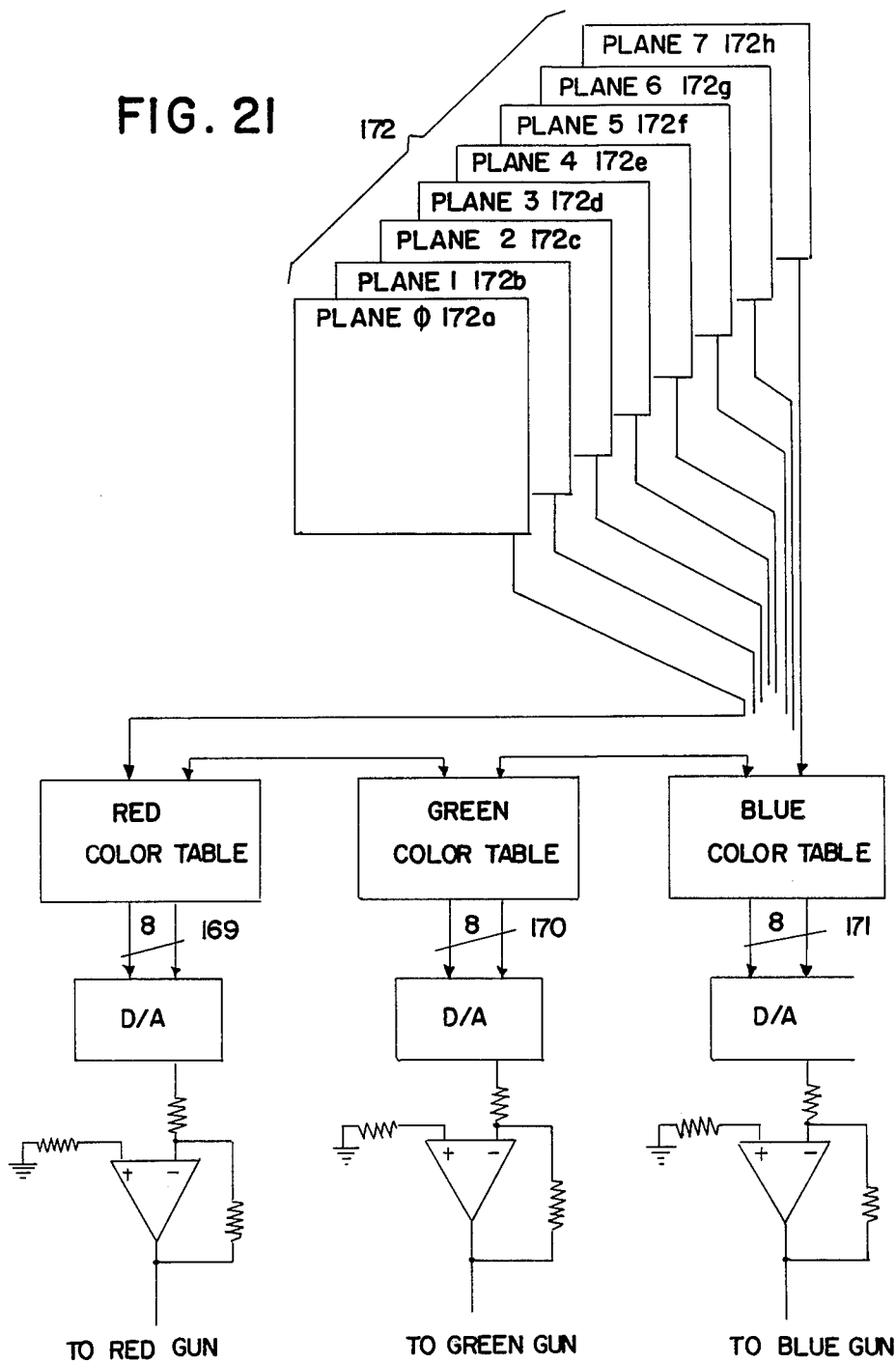
FIG. 21 shows a schematic representation of a path from a graphics processor, through a colorizer, to the eventual production of visible output by a video projector.

FIG. 21 shows the relationship of graphics and colorizing in more detail. Graphics memory 172, which is a major subset of the main graphics processor shown as 26 in FIG. 3, is organized as a set of eight parallel planes, shown as 172a to 172h and identified in FIG. 21 as 'plane 0' to 'plane 7', with each plane containing one bit of information per pixel over the enter image area. Thus, for example, it is possible to store eight complete binary threshold images, such as shown in FIG. 5, in the eight graphic planes 172a to 172h. Alternatively, one plane may be used for a live video image, while the other seven contain representations of various graphic objects (not shown) which appear together with the participant's 2 image on screen 3. Each pixel in graphics memory 172 is represented by an 8-bit value, with one bit from each plane. In other words, a pixel can have 256 possible pixel values.

Since the main graphics processor 26 in FIG. 3 can send 256 different pixel values to the colorizer 27, each of the color tables, shown as 169, 170, and 171 in FIG. 21, must have a total of 256 entries, one for each possible pixel value. The color tables 169, 170, and 171 are organized as three parallel tables to correspond to the three primary colors of visible light, namely red, green, and blue. When a pixel value arrives from graphics memory 172, it is used to index into the same location in each of the tables 169, 170, and 171. The value read out of a particular table defines the desired intensity for that particular primary color, with the output of the red table 169 controlling the red gun of the projector 8, the green table 170 controlling the green gun, and the blue table 171 controlling the blue gun. The values in the color tables can be modified through software, so that the same pixel value may produce different colors at different times.

Other visual effects achievable with the present device are accomplished by means of special effects hardware, producing visual effects beyond the capabilities of the main graphics processor 26 in FIG. 3. These special effects processors are shown as 25 in FIG. 3 and identified as 'special effects graphics processors'. The output of these special effects processors 25 is typically placed onto the VIDEOBUS 22, onto one or more of the eight open collector video data lines included in the VIDEOBUS 22 specification as mentioned earlier. As described above, the main graphics processor 26 normally passes the information contained in graphics memory 172 in FIG. 21 on to the colorizer 27 in FIG. 3. Alternatively, the main graphics processor 26 can simply act as a gateway, passing through information from the video data lines, and thus allowing the special effects processors 25 to make their output visible on the projector screen 3. This mechanism makes it possible for any processor resident on the VIDEOBUS 22 to produce visible output.

Processors falling into the special effects category are represented, for example, by a game of life processor, which is a dynamic implementation of a mathematical game which for many years could be played only on graph paper. The premise of the game is that each square on the graph paper (or each pixel in the video image) represents a potential living cell, with the fate of each cell depending upon the status of its eight neighbors. Many alternative sets of rules can be formulated to determine the relationships between adjacent cells. A game of life processor can play this mathematical game according to programmable rules at 60 generations per second, i.e. every pixel in the 256 by 256 image is examined with respect to its neighbors and modified accordingly 60 times per second. The starting or seed pixels for the game are taken from the edges of the threshold image, as derived from the threshold signal placed on the VIDEOBUS 22 by the threshold processor 23. The visual effect of the game is achieved by using illuminated pixels to show 'living' cells, while dark pixels represent 'dead' cells.

Another example of a special effects processor 25 is a fractal processor which creates fractal patterns by applying bit-wise logic to output line and pixel values. In other words, a logical function such as AND or XOR (exclusive OR) is applied to the X and Y position values of the pixels displayed during the output scan, yielding an intricate and repetitive geometric pattern which has fractal characteristics. The fractal processor selectively enables and disables sub-patterns within the fractal geometry in response to the area and position of the image of the participant's body. The effect is that the patterns change responsively in real time as the participant 2 moves about in front of the video camera 4.

Yet another example of a special effects processor 25 is a processor which can capture a miniature version of the participant's 2 image and display this image anywhere on the projector screen 3 under software control. This processor is called the human critter processor because of its ability to shrink the image of a human participant 2 down to the dimensions of a graphic sprite or creature (i.e. 'critter'). The human critter board samples the VIDEOBUS 22 threshold signal intermittently, picking out every nth pixel on every nth line and recording the values of these selected pixels in on-board memory on the human critter processor. If, for example, the value of n is 16, then the dimensions of the captured image will be 16 by 16 pixels rather than the 256 by 256 pixels of the normal threshold image. The result is a smaller and cruder version of the threshold image which still clearly shows the shape and motion of the participant's 2 body. This smaller image can be positioned anywhere on screen 3 under software control, thus allowing manipulations of the participant's 2 image which are not normally possible, e.g. causing the image to fly through a maze of graphic objects, or using the miniature image as a paint brush.

The special effects processors 25 mentioned above, i.e. the game of life processor, the fractal processor, and the human critter processor, are not described in great detail herein, but are illustrative of possible alternative representations of the participant's 2 body and motions within the embodiment of the invention shown in FIG. 1. The number and function of such special effects processors 25 is potentially unlimited, bounded only by imagination and by space available on the VIDEOBUS 22.

As a further illustration of computer controlled responsiveness within the embodiment shown in FIG. 1, in FIG. 3 we identify a Fourier synthesizer as item 32. The sounds which accompany certain interactions supported by the embodiment shown in FIG. 1 are produceable by a sixteen channel Fourier synthesizer 32, designed and developed by some of the inventors herein (as mentioned above, the details of synthesizer's 32 design are not described herein, since synthesizers of somewhat different design but similar functionality are available commercially). Each of the synthesizer's 32 sixteen channels can produce a sine wave, or, to be accurate, a close approximation of a sine wave. The pitch and volume of the sound produced by each channel can be specified through software. The sound envelope (the characteristic progression of amplitudes and harmonics which define the perceived tone quality) is defined by a special modulation processor 31, which receives generalized instructions via VIDEOBUS 22 from software running on the main system processor 19 and then sends the requisite detailed updates to the synthesizer memories (not shown individually but included in 32).

Turning now to the realm of control, we begin a discussion of the software hierarchy which orchestrates and controls the activity of the previously described hardware, i.e. processors, shown in schematic form in FIG. 3. Such control is necessary in order to accomplish a goal of the present invention, namely the implementation of the VIDEOTOUCH concept defined earlier. The capabilities of the described hardware, i.e. processors, must be harnessed and directed in order to reach this goal.

Figure 22:
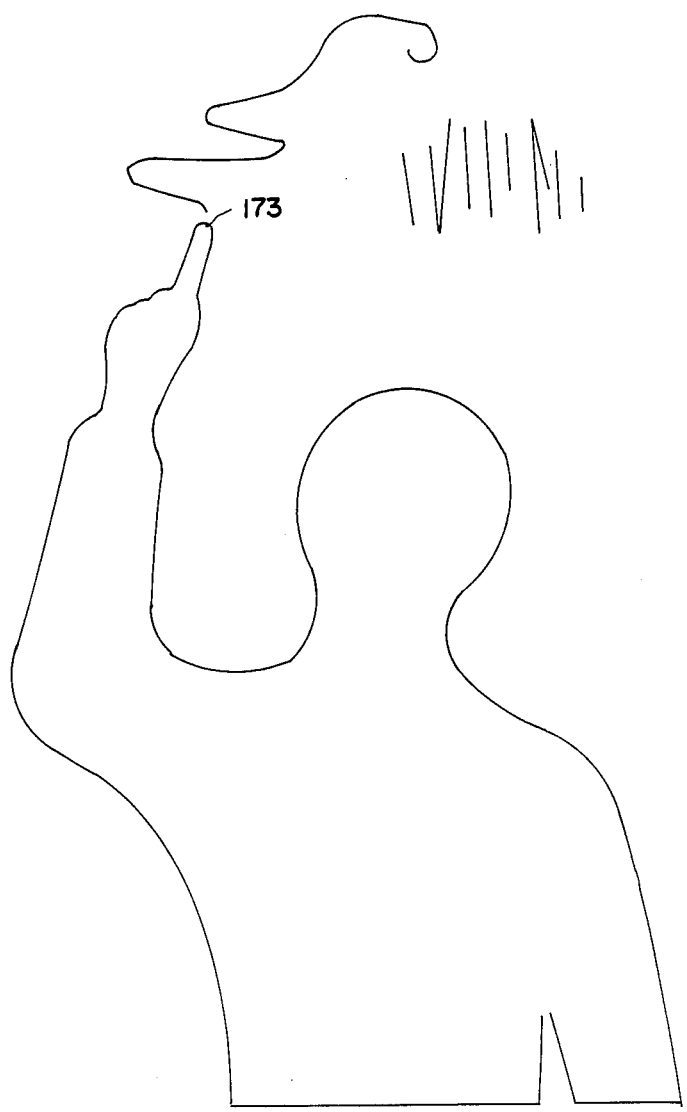
FIG. 22 illustrates an interactive mode within the described embodiment, in which a participant uses the image of his finger to draw graphic curves.

Within the described embodiment of the invention, VIDEOTOUCH is realized in terms of a number of different modes of performance which we call 'interactions'. A participant 2 entering the environment of the embodiment shown in FIG. 1 may find himself involved in any one of a number of different interactions. In each case, the visual and auditory feedback provided by the disclosed device is somewhat different. In some interactions the participant's 2 image is visible on the projector screen 3, while at other times the image may be shrunken (i.e. via the human critter processor described above), distorted, or replaced entirely by abstract geometrical patterns (i.e. via the fractal processor described above). Certain interactions are designed purely to be visually pleasing, responding to body motions with flows of color. Others rely heavily on perception, allowing the participant 2, for example, to draw a picture on screen 3 by moving a fingertip, i.e. 173 in FIG. 22, through the air in view of the video camera 4. FIG. 22 shows the projector 8 output which might be seen on screen 3 during such an interaction.

Figure 23:
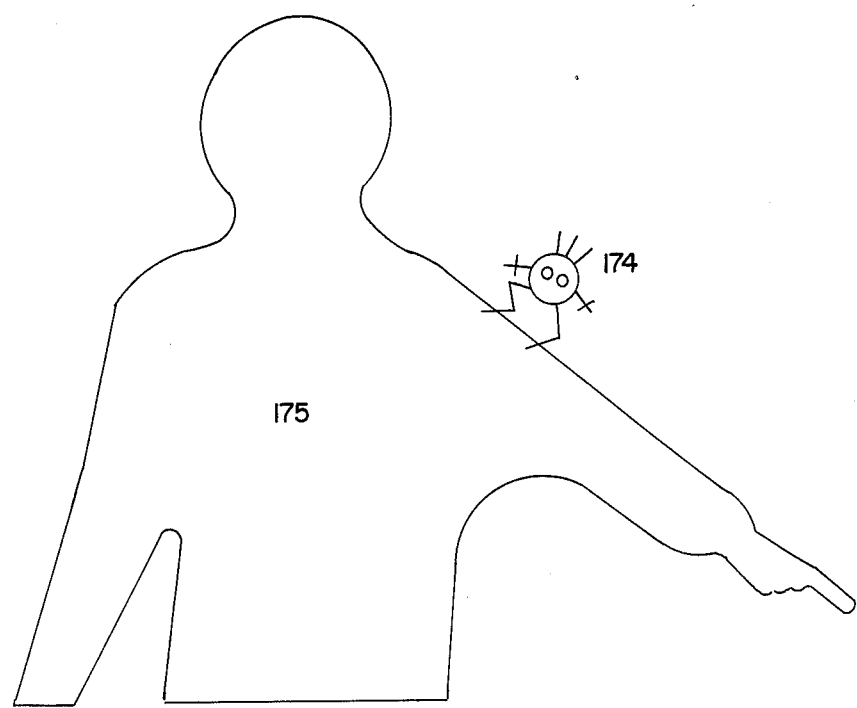
FIG. 23 illustrates another interactive mode within the described embodiment, in which a participant interacts with a graphic creature.

Another example of an interaction involving perception is the 'critter' interaction, in which a small graphic creature, shown as 174 in FIG. 23, appears on the projector screen 3 together with the participant's 2 silhouette image, shown as 175 in FIG. 23. The graphic creature or 'critter' (not to be confused with the human critter described above with respect to the human critter processor) engages in a variety of different behaviors, and at each stage in its activity it can be described as having certain goals and perceptual interests. For example, at one point the critter 174 may be climbing upward along the edge of the silhouette image 175, as shown in FIG. 23. If the participant 2 now reaches out toward the side of the screen with an open hand, a new goal becomes operative, and the critter 174 will abandon its climb in favor of drifting over to the extended hand.

Figure 24:
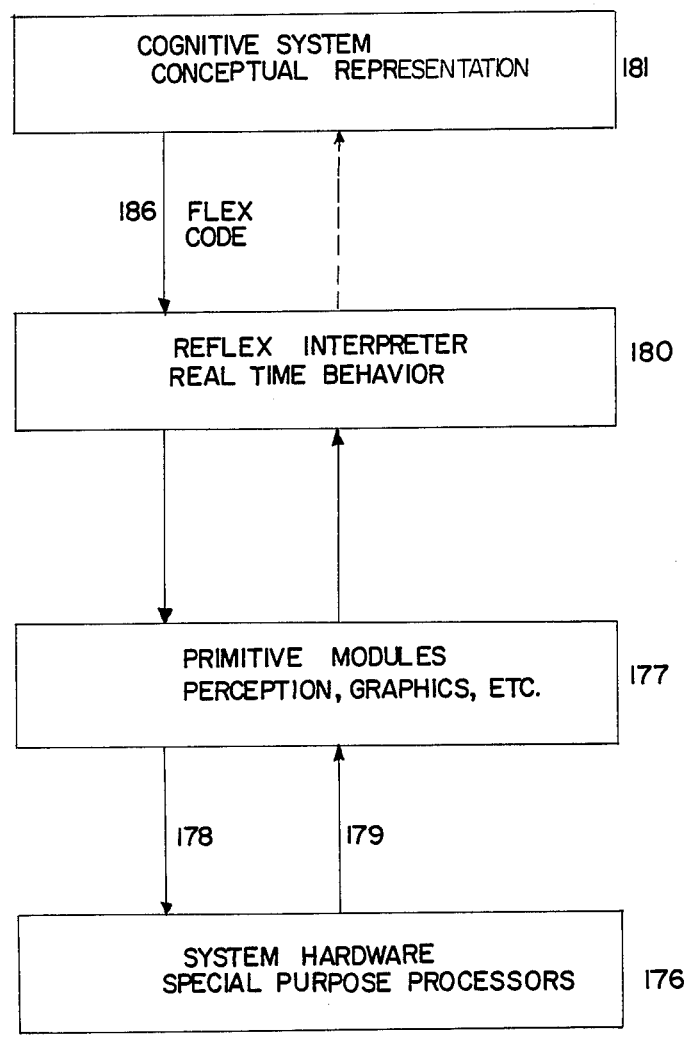
FIG. 24 illustrates a high level diagram of the software control structure used in developing and programming the system, i.e. the embodiment depicted in FIG. 1.

Turning now specifically to the software hierarchy which supports these interactions, and also describing the intimate interrelationship between such software and the previously described hardware, i.e. processors, we first present a justification for the chosen software design strategy. As the disclosed device is an extremely complex system, which has grown and developed in response to the many possibilities in perception and response, an ad hoc approach to software design quickly becomes intolerable. In order to concentrate on hardware expression and on the development of new hardware and software, rather than spending the bulk of software effort on software maintenance, documentation, and the constant struggle to patch over interface problems and design conflicts, we have had to devise a novel approach to software design and to the relationship between software and hardware. To make this possible, common standards of design, and a philosophy governing overall software organization have also been discovered and established. This overall organization is summarized in FIG. 24, showing the novel approach and the relationship between software and hardware.

To lead into this overall organization, on the lowest level the function of system software is to interface with the special purpose hardware which is shown generically as 176 in FIG. 24, and which includes all of the processors previously described with reference to FIG. 3 and subsequent drawings. Each processor has a known absolute address or range of addresses on the VIDEOBUS 22 and is set up to decode a particular set of commands arriving over the VIDEOBUS 22 from the main system processor 19. If, for example, the software running on the main system processor 19 needs some data from the outline processor 55 in FIG. 7, the main system processor 19 places the proper address within the known outline processor 55 address range onto the VIDEOBUS 22 together with a read command. The requested data is then returned to the main system processor 19 by the outline processor 55 via the VIDEOBUS 22 data lines. The low level software dealing with a particular processor, e.g. outline processor 55, incorporates exact knowledge of that processor's specifications, i.e. a programmer writing such low level software usually must work with the chip level schematic in hand.

Once the problem of a new add-on hardware interface has been solved, the solution can be buried in a low level software subroutine. A number of such subroutines have been developed, for example, to handle the lowest level of instruction to the main graphics processor 26, the colorizer 27, and the threshold processor 23. These particular processors are frequently and repeatedly referenced during almost every interaction in the described embodiment; thus the low level software subroutines (not shown in FIG. 24) dealing with these processors, i.e. the main graphics processor 26, the colorizer 27, and the threshold processor 23, are essentially statements that had to be added to the basic programming language, creating a specialized language to fit a specialized hardware environment. By adding such statements to the language, a richer vocabulary for software development is achieved in a graphically oriented system.

The major tenets of software design in a complex and dynamic real time system are (a) speed and (b) flexibility. Speed is necessary for real time response, while flexibility is essential if the system is to be tailored successfully for any application. Unfortunately, these two goals are sometimes at odds. The conventional wisdom in software engineering holds that flexibility and ease of development are best achieved through modularization, i.e. through dividing a large overall problem into smaller and smaller subsidiary problems, each of which is then addressed by an individual software subroutine. Approaching a complex problem in this way may lead to an intricate hierarchy of subroutine calls, with top level subroutines calling second level subroutines, which in turn call third level subroutines, and so on. The opposite extreme is in-line code, which is basically a linear sequence (usually including loops and jumps) of software instructions. In-line code runs much faster than conventional modularized code, but it is difficult to test, debug, and modify.

In the interest of flexibility, therefore, the software in the described embodiment of the invention is organized in a modular fashion rather than being strictly in-line. However, it is important to note that modularity in the present device is not implemented in terms of levels upon levels of subroutines—the overhead of subroutine calls and repeated parameter passing would make this too slow and inefficient, making it impossible to maintain real time response as we have been able to do here.

Instead, a considerable effort has been made to develop a single level of self-contained software modules, shown as 177 in FIG. 24, each of which performs a relatively simple task which is of general use to the system in realizing the interactions described earlier. These simple or 'primitive' tasks may involve perception, colorizing, graphics, or any other basic function which needs to be performed in the course of running the various interactions supported by the described device. The primitive modules 177, i.e. software, are one step above the low level graphics and colorizing routines (not shown) described earlier as an addition to the basic programming language, and, like all system software, the primitive modules 177 often augment the basic programming language by making use of these graphics and colorizing routines. Alternatively, the primitive modules 177 may access hardware, i.e. previously described processors such as the vision processors 54 to 57 shown in FIG. 7, directly, as is implied by the connections shown as 178 and 179 in FIG. 24. The primitive modules 177 exist as software subroutines, written in the C programming language (see FIG. 28 for an example of actual code).

In some cases, the work accomplished by a particular primitive module 177 is essentially delegated to one of the hardware processors described above; i.e. a software primitive module 177 may simply operate as a skeleton program to direct the operations of a processor such as the outline processor 55 or the contour processor 57. In other cases, the work accomplished by a primitive module 177 may actually be executed largely in software on the main system processor 19 in FIG. 3, with very little reference to described special purpose processors shown attached to the VIDEOBUS 22.

In the course of hardware development, such a primitive module 177 which is executed largely in software may be reimplemented as a short skeleton program driving a newly built processor to execute the same tasks. Thus, the function of the primitive module 177 remains exactly the same, but its implementation, and hence its speed of execution, changes significantly. For example, most of the process steps now carried out in firmware (i.e. microcode) and in hardware by the contour processor 57 were originally tested in software, using the pixel read-back function of the bit-map processor 56 to provide the needed information about the bit-map image.

This process of transferring functionality from software to firmware (i.e. microcode) and hardware is what we call vertical migration. Vertical migration is a useful strategy to speed up execution of time critical functions.

Complex interactions supported by the described embodiment are built up by calling some subset of available primitive modules 177 in a specific sequence and by combining the actions and outputs of these primitive modules 177 in a specific way. Thus, in the device as a running system, there are three software levels at most—the low level graphics and colorizing subroutines explained above (not shown), the primitive modules (shown collectively as 177), and a single higher level program 180 which serves to coordinate the calling of primitive modules 177 and the passing of parameters between the primitive modules 177 as necessary. The coordination program 180, which is known as the reflex interpreter, commands all resources of the main system processor 19 in FIG. 3. There is no operating system running in the background, since this would degrade system performance and lead to unpredictable timing.

Turning now to item 181 in FIG. 24, all run time software in the present device is devoted to the execution of the interactions, as defined above with reference to the examples shown in FIG. 22 and FIG. 23. By 'run time software' we mean the software which is actually executed on the main system processor 19 in FIG. 3 while an interaction is taking place. The number of levels in the software hierarchy has been minimized in order to achieve real time response. The corollary of this minimization, however, is that the run time software, i.e. the reflex interpreter 180, the primitive modules 177, and the low level graphics and colorizing routines (not shown), is not in itself an adequate tool for the design of new interactive expressions within the described device.

Figures 25, 26:
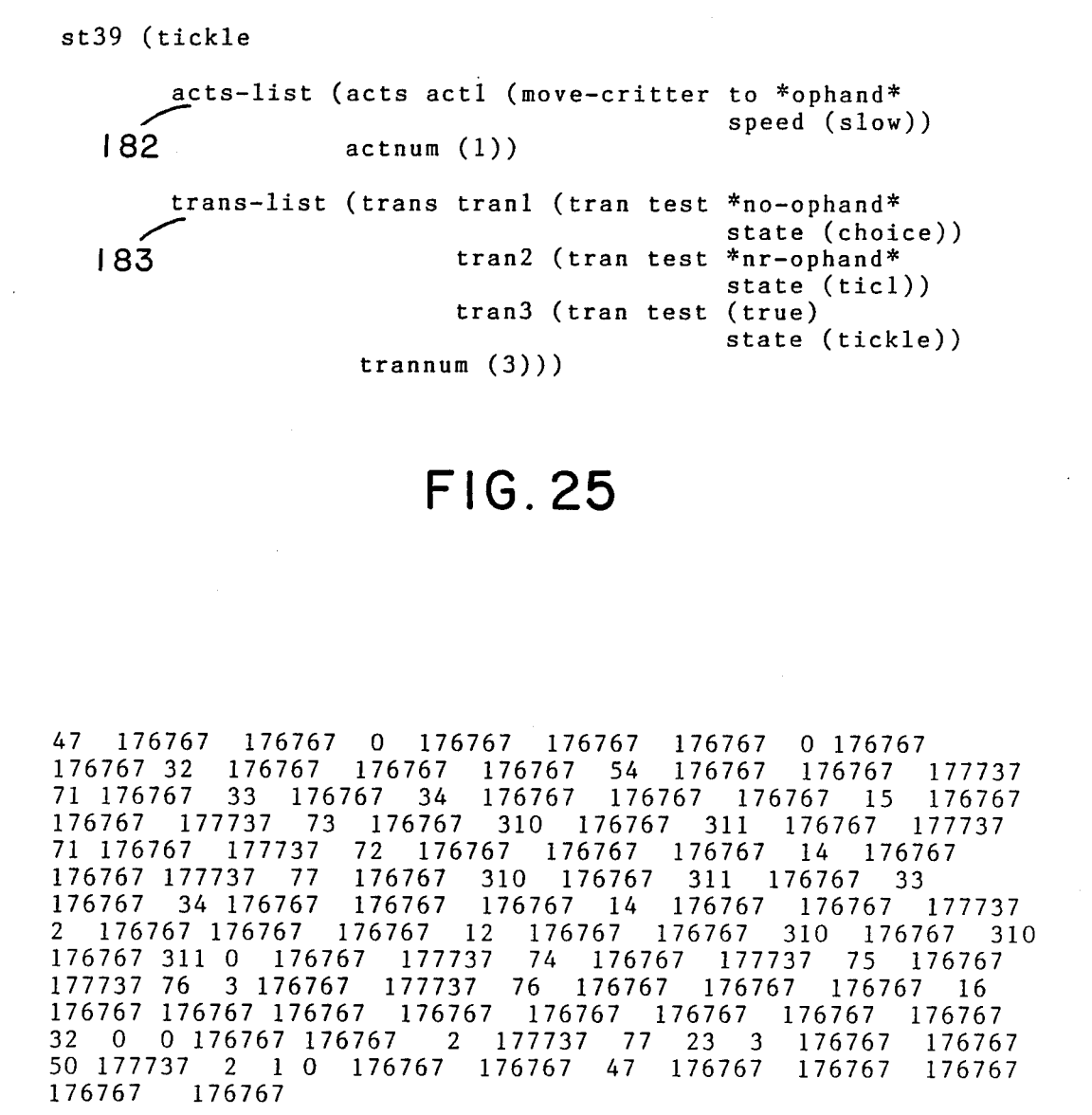

At the top level of software development, a knowledge driven artificial intelligence program 181 serves as an interface between a human being designing a new interaction (not to be confused with a participant 2 who experiences an existing interaction) and a device which will eventually run that interaction. This cognitive level is implemented in LISp (a list oriented programming language which is in common use in the artificial intelligence community) and uses a CD (conceptual dependency) approach to describe the behaviors both of the disclosed device and of a participant interacting with that device. FIG. 25, to be described in more detail below, is an example of the modified CD representation for a particular moment or state within the critter interaction, described above with reference to FIG. 23.

A person designing a new interaction must produce a high level description of all behaviors to be executed and all decisions to be made during the course of the interaction. This description is organized into series of states, with each state consisting of a list of actions and a list of transition decisions. Basically, the action list describes the behavior to be demonstrated by the system during a state, while the transition list describes decisions to be made on the basis of perceptual information collected during this same state.

FIG. 25 consists of the high level description of a single state in the critter interaction (described above with reference to FIG. 23), a playful interchange between a human participant and a self willed graphic sprite known as 'critter', shown as 174 in FIG. 23. During this particular state, i.e. the state described by the CD representation in FIG. 25, the action list 182 consists of a single action, namely to move the critter 174 toward a previously detected open hand. An open hand is defined as a hand with multiple fingers extended. The transition list 183 contains three tests, each with an associated transition to another state. First of all, if the open hand has disappeared, a transition will be made to a switch state (called 'choice') which will choose the next appropriate path to take in the interaction. Otherwise, if the critter 174 is near the open hand (within a certain pre-defined number of pixels), a transition will be made to a state (called 'ticl') where the critter 174 will respond to tickling or poking movements from the participant's finger. If neither of these conditions is met, the present state (called 'tickle') will be repeated, moving the critter 174 closer to the participant's hand in anticipation of the tickling behavior. As soon as a test is satisfied, the corresponding transition takes place—any remaining test conditions are ignored.

The high level CD representation, exemplified by FIG. 25, for each state is evaluated, one concept at a time. This evaluation is done off-line, i.e. prior to run time. Each concept, together with associated roles and fillers, is matched against a reference file, known as the concepts dictionary. The concepts dictionary is a file which uniquely associates each concept from the CD representation, i.e. from a sequence of state descriptions such as shown in FIG. 25, with a specific LISP primitive interface file, a file containing the information needed to specify execution of the concept in terms of the low level functions, i.e. software primitive modules 177, actually available for run time execution in the device.

For each of the previously described software primitive modules, shown collectively as 177 in FIG. 24, an equivalent LISP primitive interface file exists on the cognitive level, i.e. as part of 181. Each LISP primitive interface file knows all about the parameters which must be made available to the corresponding executable primitive module 177 at run time. This means that the LISP primitive interface file also knows where these parameters must come from—i.e. which other primitive modules 177 may have to be called first.

FIG. 27, for example, shows the LISP primitive interface file for the 'presence' primitive, i.e. the software primitive module 177 which reports whether or not a participant 2 is currently present in the environment. In examining FIG. 27, particularly the line marked as 184, it can be seen that a call to 'outlprim'(i.e. the software primitive module 177 which tells the outline processor 55 to start processing a new scan) must precede a call to 'presprim'(i.e. the software primitive module 177 which checks collected outline processor 55 data to determine if presence was actually found during that scan). The LISP primitive interface file, as shown in FIG. 27, eniorces this order of calls by setting up a call to the outline primitive module 177, followed by a call to the presence primitive module 177. Note from the line marked as 185 in FIG. 27 that the outline primitive module 177 need only be called once for each state in the interaction, so the LISP primitive interface file only sets up a call to the outline primitive module 177 if a call to that same primitive module 177 has not been encountered previously during the evaluation of the present state.

The actual code for the presence primitive module 177 is shown in FIG. 28. Like all of the primitive modules 177 in the present device, this code. i.e. the code shown in FIG. 28, is written in the C programming language. Note also that this particular primitive module, i.e. FIG. 28, uses the raw outline point data preserved by the outline processor 55 in the tables of leftside and right-side outine points for each scan line, rather than simply reading the outline processor 55 presence/absence flag described above. This illustrates the flexibility of a system in which the functionality of a given primitive module 177 can be variously apportioned between software and hardware, allowing alternative solutions to the same problem. Specifically, FIG. 28 shows an experimental presence primitive module which uses different process steps to ascertain presence than are used by the outline processor 55; in this way we can compare the quality of different approaches to this particular perceptual task.

The information contained in the LISP primitive interface files, which form part of the cognitive system shown as 181 in FIG. 24, is used to generate a numerical sequence, known as FLEX code (shown as arrow 186 in FIG. 24) for each state in the input representation. The top level LISP program (also a part of 181 in FIG. 24), i.e. the artificial intelligence program which evaluates the CD representation of states (e.g. FIG. 25) with reference to the concepts dictionary and the LISP primitive interface files described above, associates a particular global location in the run time system with every software primitive module 177 known to produce output. An example of such output is the value returned by the presence primitive module shown in FIG. 28 (a return value of '1' indicates that a participant 2 is present, while a return value of '0' indicates the absence of the participant 2).

Any other primitive module 177 which later needs that output as input for its own processing is passed a reference to the appropriate global location via the FLEX code 186 interpreted by reflex interpreter 180. By 'global location', we mean a location whose existence and contents are preserved beyond the boundaries of execution of a particular primitive module 177. Similarly, transition decisions can be based on the values which have been deposited in known global locations during the execution of a state. For example, if the presence primitive module shown in FIG. 28 returns the value '0', then a transition to a different state may be triggered when the value '0' is later retrieved from its global location and tested. The global locations are allocated and deallocated on a state by state basis as the FLEX code 186 is created. It is important to note that these global locations do not actually exist until the created FLEX code 186 is executed—the cognitive level 181 simply uses these variables as place holders for the values they will contain at run time.

Turning now to a more detailed description of the concept identified as FLEX code 186 in FIG. 24, the FLEX code !86 which is the final output of the cognitive level 181 is organized in terms of states, paralleling the states in the original high level input representation (e.g. FIG. 25). Each state has a uniform internal structure, starting with an entry step, followed by one or more perception steps, a series of transition tests based on the results of the perception, and, finally, a set of default actions which will be executed if none of the transition tests succeed. Basically, each state runs through a sequence of perception, test, and action. This sequence repeats again and again as the overall state machinery, i.e. the network of described states, is executed by the reflex interpreter 180, moving from one state to another on the basis of changing perceptual data. FIG. 26 shows the compiled FLEX code for the 'tickle' state of FIG. 25. This sequence of octal values tells the reflex interpreter 180 which global locations to access, which primitive modules 177 to call, which Boolean operations to carry out during transition testing, and which other states to transition to. The first line of numbers in FIG. 26, for example, conveys the fact that the outline primitive module 177, i.e. software which calls the outline processor 55, should be called, and that the values returned by that primitive module 177 should be placed onto the system blackboard, i.e. the global locations mentioned above, starting at location '0'. The first '0' in the first line of FIG. 26 indicates global location '0' while the second '0' is an index into a list of software primitive modules 177. The outline primitive module 177 happens to be the first entry in this list, which contains approximately sixty entries (see FIG. 29, which shows a cognitive system 181 reference file listing existing 'RTS', i.e. 'run time system', primitive modules 177) corresponding to sixty different primitive modules 177 now available in the described device. The repeated value '176767' which appears in FIG. 26 serves as a . delimiter, used by the reflex interpreter 180 to guide parsing of the numerical sequence.

When the FLEX code 186 dictates that a call to a primitive module 177 be made the reflex interpreter 180 takes care of any necessary parameter passing. For example, if the primitive module 177 in question produces output, then the FLEX code 186 will specify where that output is to be placed (see the description of parameters at the top of the primitive module code shown in FIG. 28). The reflex interpreter 180 takes the address of the global output location specified in the FLEX code 186 and puts this address into an array known as the argument vector. The argument vector is a software array which is used to temporarily store any values and addresses needed as parameters by the primitive modules 177.

If input parameters are needed for a particular software primitive module 177, the reflex interpreter 180 either takes these parameters directly from the FLEX code 186 (for parameters which were already known at compile time, i.e. at the time when the FLEX code 186 was created off-line by the cognitive system 181), or, alternatively, takes the parameters from the global locations indicated by the FLEX code 186 (for parameters which acquire values at run time, usually from the output of other primitive modules 177). These input parameters, whatever their origin, are also written into the argument vector. For example, if the 'moveg' primitive ('moveg' being an abbreviation for 'move graphic object') is called in order to move the critter 174 toward an open hand, as specified in FIG. 25, then the present X,Y location of the critter 174 must first be passed to the 'moveg' primitive module via the argument vector in order for that primitive module to perform its operations correctly. An entry for the 'moveg' primitive appears as 187 in the primitive list shown in FIG. 29.

The argument vector represents a uniform and easily controlled method of passing parameters to those primitive modules 177 which require parameters. In addition, this construct, i.e. the argument vector, minimizes the software parameter passing overhead involved with each primitive module 177 call, since the reflex interpreter 180 need only pass a single value, i.e. the starting location of the argument vector, to the primitive module 177. The code shown in FIG. 28 illustrates how a primitive module 177 accesses the argument vector whose address is passed as a parameter.

Turning now to a more detailed description of the primitive modules 177 described above, these primitive modules 177 which make up the basic processing building blocks in executing an interaction within the device, deal directly with system hardware, i.e. the special purpose processors shown in schematic form in FIG. 3. The primitive modules 177 constitute the software which finally converts high level concepts into visible results.

The primitive modules 177 are divided into a number of categories, according to function. Primitive modules 177 known as perceptive primitives perform perceptual tasks, such as locating the participant in the environment, finding various body parts, or making judgements about posture or gesture. The presence detection software shown in FIG. 28 is an example of a perceptive primitive module. Primitive modules 177 known as graphics primitives control visible output, such as the color assigned to the participant's video image or the position of a graphic sprite on screen. The 'moveg' primitive module 187 described above is an example of this type. Any other tasks necessary to the execution of an interaction are performed by primitive modules 177 known as utility primitives. For example, if a graphic object is to be moved to some random location, then the choice of location is made by a utility primitive called 'ranloc' (see 188 in FIG. 29) which is essentially a random number generator.

All of the primitive modules 177, regardless of category, i.e. all of the primitives modules listed in FIG. 29, are on the same level—they do not pass parameters to one another, nor do they communicate directly in any other way. This simplifies software design and debugging, and aids in the development of new interactions. Each primitive module 177 is an independent unit which can be developed and tested in isolation before being integrated into the larger run time system.

Turning to other suggested applications for the present device and its software organization, the cognitive system 181, the reflex interpreter 180, and the primitive modules 177 are the components of an overall model of real time control which we call the AR (artifical reality) model. The AR model is conceived as a general purpose solution to the problem of programming and controlling a complex system which must respond to varying environmental input in real time. The presently disclosed devices shown in FIG. 1 and FIG. 2 are two closely related examples of systems which are amenable to control through the AR model. Applications of the AR model are not limited to the presently disclosed embodiments, however.

The AR model is geared to the needs of real time performance, maximizing the speed of execution by minimizing the complexity of run time code. From a design point of view, the major strengths of the AR approach lie in the flexibility of a conceptually oriented user interface, the overall modularity of design which simplifies the addition of new features, i.e. new hardware as well as new software, and the limitation of system specific knowledge to a relatively small and well defined body of code. By 'system specific knowledge' we mean knowledge directly tied to the hardware organization of the system in question. The cognitive system 181 and the reflex interpreter 180 are both designed to be portable, largely independent of the specific implementation details of the present device as shown in FIG. 1. Only the primitive modules 177 are inherently system dependent. The idea of decomposing large tasks into primitive functions is generally useful, however, making for easier design and implementation in any environment.

Having given a detailed description of the embodiment of the invention shown in FIG. 1, we now turn briefly to the embodiment shown in FIG. 2, i.e. the VIDEODESK. In many ways the VIDEODESK embodiment, i.e. FIG. 2 is the same as the VIDEOPLACE embodiment, i.e. FIG. 1. Therefore, the VIDEODESK embodiment is considered to have been disclosed in the course of the detailed description of the embodiment shown in FIG. 1. The major difference between the two embodiments lies in the physical setting of the device, which is considered peripheral to the nature of the disclosed invention. The means of imaging is basically the same, relying on high contrast between the hands 14 of the participant 10 and a neutral background 13 on the surface of the desk 11. The perceptual processing described above, i.e. the use of special purpose vision processors 54 to 57, is applicable to the VIDEODESK setting, since the main perceptual goal in that setting is to gather information about the participant's 10 hands and fingers 14 as imaged by the video camera 12. Similarly, although the concepts of interest are slightly different, given a different application, the AR control model remains applicable in the alternate embodiment of FIG. 2.

This marks the end of the specification of the invention. A preferred embodiment of the VIDEOTOUCH concept has been described. However, the scope of the invention should not be construed as limited to the exact details described herein, since modifications and alternate implementations will naturally occur to those skilled in the art.

APPENDIX A

Appendix A contains the microcode source file for the outline processor, shown as 55 in FIG. 7.

OUTLINE PROCESSOR MICROCODE -- SOURCE FILE

```
.cparms  80d   000000000000000000000h   E800FEAA20AAA8AD1552h

.fdef top_count (1,2,p)
      clr_top = 0              / clear top counter
      up_top  = 3;             / increment top counter .fdef lo_ram (3,4,p)
      read_lo  = 0             / data out to board
      write_lo = 3;            / write from board to RAM .fdef hi_ram (5,6,p)
      read_hi  = 0             / data out to board
      write_hi = 3;            / write from board to RAM .fdef to_from (7,8d,p)
      to_rams   = 1            / flow from board to RAMs
      from_rams = 0;           / flow from RAMs to board .fdef hi_from_reg (9d,10d,p)
      ld_hi_from_reg  = 3      / load high byte from one of the
                               /    16-bit motion registers
      out_hi_from_reg = 0;     / high byte value to int. bus .fdef hi_to_reg (11d,12d,p)
      ld_hi_to_reg  = 3        / load high byte from int. bus
      out_hi_to_reg = 0;       / out to high byte of adder .fdef dis_or_193 (13d,13d,p)
      count_to_addr = 0        / RAM addr. from 193 counters
      dis_to_addr   = 1;       / RAM addr. from discontinuity
                               /    table counters .fdef curr_or_prev (14d,14d,p)
      previous = 1;            / access previous page in RAM .fdef next_page (15d,15d,p)
      page = 1;                / ready to process next scan .fdef look_at_193 (16d,16d,p)
      out_193_now = 0;         / current value of 193 counters .fdef load_193 (17d,17d,p)
      ld_193 = 1;              / load 193's from int. bus
.fdef updown (18d,19d,p)
      up   = 1                 / go to next scan line info.
      down = 2;                / go to previous scan line info.

.fdef shift (20d,21d,p)
      ld_shift  = 3            / load reg. for divide by 2
      out_shift = 0;           / put result onto int. bus
```

```
.fdef sum (22d,23d,p)
     ld_sum = 3              / store computation result
     out_sum = 0;            / put result onto int. bus .fdef add_sub (24d,24d,p)
     add = 0
     sub = 1;                / form 2's complement for sub.

.fdef b_temp (25d,25d,p)     / working register B
     ld_b = 1;

.fdef a_temp (26d,27d,p)     / working register A
     ld_a = 3
     out_a = 0;

.fdef yleft (28d,29d,p)      / left-most outline point Y
     ld_lefty = 3
     out_lefty = 0;

.fdef xleft (30d,31d,p)      / left-most outline point X
     ld_leftx = 3
     out_leftx = 0;

.fdef yright (32d,33d,p)     / right-most outline point Y
     ld_righty = 3
     out_righty = 0;

.fdef xright (34d,35d,p)     / right-most outline point X
     ld_rithtx = 3
     out_rightx = 0;

.fdef ytop (36d,37d,p)       / top-most outline point Y
     ld_topy = 3
     out_topy = 0;

.fdef xtop (38d,39d,p)       / top-most outline point X
     ld_topx = 3
     out_topx = 0;

.fdef disc_tables (42d,43d,p)  / choose RAM address
     left_line = 0           /   line no. for left disc.
     left_data = 1           /   amount of left disc.
     right_line = 2          /   line no. for right disc.
     right_data = 3;         /   amount of right disc.

.fdef choose_disc (44d,44d,p)
     l_disc = 0              / choose left disc. counter
     r_disc = 1;             / choose right disc. counter .fdef clear_disc (45d,45d,p)
     clr_disc = 0;           / clear both disc. counters .fdef up_left (46d,46d,p)
     up_l_disc = 1;          / next spot in left disc. table .fdef up_right (47d,47d,p)
     up_r_disc = 1;          / next spot in right disc. table
```

```
.fdef ld_mns_right (48d,48d,p)
    ld_mnsright = 1;       / store minus right motion value .fdef out_mns_right (49d,49d,p)
    out_mnsright = 0;      / output of minus right motion .fdef ld_pls_right (50d,50d,p)
    ld_plsright = 1;       / store plus right motion value .fdef out_pls_right (51d,51d,p)
    out_plsright = 0;      / output of plus right motion .fdef ld_mns_left (52d,52d,p)
    ld_mnsleft = 1;    .   / store minus left motion value .fdef out_mns_left (53d,53d,p)
    out_mnsleft = 0;       / output of minus left motion .fdef ld_pls_left (54d,54d,p)
    ld_plsleft = 1;        / store plus left motion value .fdef out_pls_left (55d,55d,p)
    out_plsleft = 0;       / output of plus left motion .fdef inst (56d,59d,p)             / 2910 instructions
    jz = 0                 /   go top of microcode
    cjp = 3                /   conditional jump
    push = 4               /   set up conditional loop
    rfct = 8d              /   go top of loop, check cond.
    cont = 14d;            /   continue -- essentially no-op .fdef cond (60d,63d,p)             / selects to CCMUX
    greater = 0
    less = 1
    equal = 2
    sign = 3
    vblank = 4
    not_vblank = 5
    hblank = 6
    not_hblank = 7
    even = 8d              /   even versus odd scan
    request = 9d
    not_request = 10d
    top_cnt = 11d
    true = 15d;            /   for unconditional branches .fdef br (64d,74d,p)
    left = 400             / left table in current RAM page
    right = 1000           / right table in current RAM page
    width = 1400           / width table in current RAM page
    topx = 1
    topy = 2
    leftx = 3
    lefty = 4
    rightx = 5
    righty = 6
    pres = 7
```

```
        mnsleft = 10
        plsleft = 11
        mnsright = 12
        plsright = 13;

.fdef intdata (75d,75d,p)     / access to internal data bus
        int_from_br = 0;       /   lower 8 br. bits to int. bus .fdef req_flip (76d,76d,p)
        clr_request = 1;       / clock '0' to request flip-flop .fdef connect (77d,79d,p)     / connection to outline sensor
        line = 6               /   get current line number
        lpix = 3               /   left-most pixel on this line
        rpix = 5;              /   right-most pixel on curr line .org 0;
init:   br = 0, int_from_br;
        ld_rightx, ld_righty, ld_lefty, ld_a, ld_b,
            ld_hi_to_reg, br = 0, int_from_br;
        out_a, out_hi_to_reg, add;
        out_a, out_hi_to_reg, add, ld_mnsleft, ld_plsleft,
            ld_mnsright, ld_plsright;
        br = 377, int_from_br;
        ld_leftx, br = 377, int_from_br;
        clr_disc;
        clr_top;

ld_193, br = 0, int_from_br;
        push, br = 256d, true;
        to_rams, write_lo, write_hi, br = 0, int_from_br;
        up;
        rfct;

ld_193, br = 0, int_from_br;
        push, br = 256d, true;
        to_rams, write_lo, write_hi, br = 0, int_from_br,
            left;
        up;
        rfct;

ld_193, br = 0, int_from_br;
        push, br = 256d, true;
        to_rams, write_lo, write_hi, br = 0, int_from_br,
            right;
        up;
        rfct;

ld_193, br = 0, int_from_br;
        push, br = 256d, true;
        to_rams, write_lo, write_hi, br = 0, int_from_br,
            width;
        up;
        rfct;

ld_193, br = 0, int_from_br;
```

```
                cont;
wait_vbl:  cjp, br = wait_vbl, not_vblank;

cont;
wait_scan: cjp, br = wait_scan, vblank;

cjp, br = wait_vbl, even;

////////////////////////////////////////////////////
/ skip first line -- probably incomplete
//////////////////////////////////////////////////// cont;
wait1:  cjp, br = wait1, not_hblank;

cont;
wait2:  cjp, br = wait2, hblank;

////////////////////////////////////////////////////
////////////////////////////////////////////////////
/ repeat the following operations for lines 1 through
/ 19 -- record left, right, width only -- data on first
/ 20 lines is often no good
////////////////////////////////////////////////////
//////////////////////////////////////////////////// push, br = 18d, true;

to_rams, write_lo, ld_a, lpix, left;
        out_a, ld_b;
        to_rams, write_lo, ld_a, rpix, right;
        out_a, sub;
        out_a, sub, ld_sum;
        out_sum, to_rams, write_lo, width;

up;

cont;
done_20: cjp, br = done_20, not_hblank;

cont;
wait_20: cjp, br = wait_20, hblank;

rfct;

////////////////////////////////////////////////////
////////////////////////////////////////////////////
/ repeat the following operations for the next 220d scan
/ lines -- top 20 and bottom 20 lines are ignored for
/ the purposes of most outline processor calculations
////////////////////////////////////////////////////
//////////////////////////////////////////////////// push, br = 219d, true;

to_rams, write_lo, ld_a, lpix, left;
```

```
///////////////////////////////////////////////////
/ calculate left edge motion values with respect to
/ the previous scan
/////////////////////////////////////////////////// previous, from_rams, read_lo, ld_b, left;

out_a, sub;
        out_a, sub, ld_sum;
        out_a, cjp, br = p_left, greater;

cont;
m_left: out_sum, ld_b;
        add, out_mnsleft;
        add, out_mnsleft, ld_mnsleft;
        cjp, br = left_disc, true;

cont;
p_left: out_sum, ld_b;
        add, out_plsleft;
        add, out_plsleft, ld_plsleft;

///////////////////////////////////////////////////
/ look for left edge discontinuity between previous
/ scan line and current scan line
/////////////////////////////////////////////////// cont;
left_disc: down;
           cont;
           from_rams, read_lo, ld_b, left;
           out_a, sub;
           out_a, sub, ld_sum, up;
           ld_b, br = 6, int_from_br;
           out_sum;
           out_sum, cjp, br = left_most, less;

dis_to_addr, out_193_now, to_rams, write_lo,
               l_disc, left_line;
           dis_to_addr, out_sum, to_rams, write_lo,
               l_disc, left_data;
           up_l_disc, br = 0, int_from_br;
           dis_to_addr, to_rams, write_lo, l_disc, left_line,
               br = 0, int_from_br;
           dis_to_addr, to_rams, write_lo, l_disc, left_data,
               br = 0, int_from_br;

///////////////////////////////////////////////////
/ compare current left value to left-most value found
/ so far during the scan -- update if necessary
/////////////////////////////////////////////////// cont;
left_most: ld_b, br = 0, int_from_br;
           out_a;
           out_a, cjp, br = cmp_left, greater;
```

```
            ld_b, right;
            out_a;
            out_a, cjp, br = wide, equal;

cont;
cmp_left:   out_leftx, ld_b;
            out_a;
            out_a, cjp, br = wide, greater;

out_a, ld_leftx;
            out_193_now;
            out_193_now, ld_lefty;
```

////////////////////////////////////////////////////////
/ get right value for current line and find width
////////////////////////////////////////////////////////

```
        cont;
wide:   out_a, ld_b;

to_rams, write_lo, ld_a, rpix, right;

out_a, sub;
        out_a, sub, ld_sum;
        out_sum, to_rams, write_lo, width;
```

////////////////////////////////////////////////////////
/ check whether top-most point has already been found
/ for this scan -- if not, see if current line meets
/ top criteria -- non-zero width must be found on at
/ least 8 successive scan lines -- potential top-most
/ values which do not satisfy this test are dismissed
/ as noise
////////////////////////////////////////////////////////

```
        cjp, br = move_right, top_cnt;
        ld_b, br = 0, int_from_br;
        out_sum;
        out_sum, cjp, br = clear_top, equal;

out_193_now, up_top;
        out_193_now, ld_topy;
        cjp, br = move_right, true;

cont;
clear_top:  clr_top;
```

////////////////////////////////////////////////////////
/ calculate right edge motion values with respect to
/ the previous scan
////////////////////////////////////////////////////////

```
            cont;
move_right: previous, from_rams, read_lo, ld_b, right;

out_a, sub;
            out_a, sub, ld_sum;
            out_a, cjp, br = p_right, greater;
```

```
                    cont;
m_right:    out_sum, ld_b;
            add, out_mnsright;
            add, out_mnsright, ld_mnsright;
            cjp, br = right_disc, true;

cont;
p_right:    out_sum, ld_b;
            add, out_plsright;
            add, out_plsright, ld_plsright;
```

////////////////////////////////////////////////////
/ look for right edge discontinuity between previous
/ scan line and current scan line
////////////////////////////////////////////////////

```
            cont;
right_disc: down;
            cont;
            from_rams, read_lo, ld_b, right;
            out_a, sub;
            out_a, sub, ld_sum, up;
            ld_b, br = 6, int_from_br;
            out_sum;
            out_sum, cjp, br = right_most, less;
            dis_to_addr, out_193_now, to_rams, write_lo,
                r_disc, right_line;
            dis_to_addr, out_sum, to_rams, write_lo,
                r_disc, right_data;

up_r_disc, br = 0, int_from_br;
            dis_to_addr, to_rams, write_lo, r_disc,
                right_line, br = 0, int_from_br;
            dis_to_addr, to_rams, write_lo, r_disc,
                right_data, br = 0, int_from_br;
```

////////////////////////////////////////////////////
/ compare current right value to right-most value found
/ so far during the scan -- update if necessary
////////////////////////////////////////////////////

```
            cont;
right_most: out_rightx, ld_b;
            out_a;
            out_a, cjp, br = newline, less;

out_a, ld_rightx;
            out_193_now;
            out_193_now, ld_righty;
```

////////////////////////////////////////////////////
/ all processing complete for the current line -- count
/ up to the next line number, wait for the end of
/ horizontal blanking, and return to top of loop
////////////////////////////////////////////////////

```
            cont;
newline: up;

cont;
done_240: cjp, br = done_240, not_hblank;

cont;
wait_240: cjp, br = wait_240, hblank;

rfct;

//////////////////////////////////////////////////////
        //////////////////////////////////////////////////////
        / repeat the following operations for lines 240d through
        / 256d -- record left, right, width only -- data on last
        / few lines is often no good
        //////////////////////////////////////////////////////
        ////////////////////////////////////////////////////// push, br = 18d, true;

to_rams, write_lo, ld_a, lpix, left;
        out_a, ld_b;
        to_rams, write_lo, ld_a, rpix, right;
        out_a, sub;
        out_a, sub, ld_sum;
        out_sum, to_rams, write_lo, width;

up;

cjp, br = top_calc, vblank;

cont;
done_256: cjp, br = done_256, not_hblank;

cont;
wait_256: cjp, br = wait_256, hblank;

rfct;

//////////////////////////////////////////////////////
        //////////////////////////////////////////////////////
        / calculate top and make a guess at presence
        //////////////////////////////////////////////////////
        ////////////////////////////////////////////////////// cont;
top_calc: ld_193, pres, int_from_br;
          cjp, br = presence, top_cnt;

to_rams, write_lo, br = 0, int_from_br;
          cjp, br = top, true;

cont;
presence: to_rams, write_lo, br = 1, int_from_br;
          out_topy, ld_a;
          ld_b, br = 7, int_from_br;
```

```
           out_a, sub;
           out_a, sub, ld_sum;
           out_sum;
           out_sum, ld_topy;
      cont;
top:  out_topy, ld_193;
      from_rams, read_lo, ld_a, width;
      out_a;
      out_a, ld_shift;
      out_shift, ld_b;
from_rams, read_lo, ld_a, left;
out_a, add;
out_a, add, ld_sum;
out_sum;
out_sum, ld_topx;

///////////////////////////////////////////////////
///////////////////////////////////////////////////
/ processing during visible for one scan is now done --
/ store left-most, top-most, right-most points, as well
/ as cumulative motion values, in RAM
///////////////////////////////////////////////////
/////////////////////////////////////////////////// ld_193, rightx, int_from_br;
out_rightx, to_rams, write_lo;

ld_193, righty, int_from_br;
out_righty, to_rams, write_lo;

ld_193, leftx, int_from_br;
out_leftx, to_rams, write_lo;

ld_193, lefty, int_from_br;
out_lefty, to_rams, write_lo;

ld_193, topx, int_from_br;
out_topx, to_rams, write_lo;

ld_193, topy, int_from_br;
out_topy, to_rams, write_lo;

ld_193, mnsleft, int_from_br;
to_rams, write_lo, out_mnsleft;
ld_hi_from_reg, out_mnsleft;
out_hi_from_reg, to_rams, write_hi;

ld_193, plsleft, int_from_br;
to_rams, write_lo, out_plsleft;
ld_hi_from_reg, out_plsleft;
out_hi_from_reg, to_rams, write_hi;

ld_193, mnsright int_from_br;
to_rams, write_lo, out_mnsright;
ld_hi_from_reg, out_mnsright;
out_hi_from_reg, to_rams, write_hi;
```

```
ld_193, plsright, int_from_br;
to_rams, write_lo, out_plsright;

ld_hi_from_reg, out_plsright;
    out_hi_from_reg, to_rams, write_hi;

//////////////////////////////////////////////////////////
/ all processing for this scan is now complete -- make
/ information available to external software by paging
/ to the other half of memory -- then go back to the
/ top and wait for another processing request
////////////////////////////////////////////////////////// done: page;

clr_request;
    jz;

.end;
```

APPENDIX B

Appendix B contains the microcode source file for the contour processor, shown as 57 in FIG. 7.

CONTOUR PROCESSOR MICROCODE -- SOURCE FILE

```
.cparms 72d   0000000000000000000h   03F66F89FD764800EFh

.equ ledge 12;     / must correspond exactly to hard-wired
.equ redge 365;    / comparator inputs on the board
.equ tedge 12;
.equ bedge 350;

.fdef cond (0d,3d,p)    / selects to CCMUX
        less = 0
        equal = 1
        greater = 2
        count_down = 3
        contour_done = 4
        take_snap = 5
        whole_contour = 6
        local_contour = 7
        find_features = 8d
        display = 9d
        vblank = 10d
        not_vblank = 11d
        pixel_on = 12d
        beyond_edge = 13d
```

```
              not_request = 14d
              true = 15d;                / for unconditional branches .fdef inst (4d,7d,p)        / 2910 instructions
         jz = 0                /    go top of microcode
         cjp = 3               /    conditional jump
         push = 4              /    set up conditional loop
         rfct = 8d             /    go top of loop, check condition
         cont = 14d;           /    continue -- essentially no-op .fdef br (8d,18d,p)         / bits 16, 17, 18 used to select the
         edge_x = 0            / part of scratchpad RAM to be
         edge_y = 400          / accessed by microcode
         finger_x = 0
         finger_y = 400
         finger_loc = 1000
         curve_count = 1400
         finger_count = 2000
         table_pointer = 2400;

.fdef databus (19d,19d,p)   / access to internal data bus
         data_from_br = 0;
   .fdef add_sub (20d,20d,p)
         add = 0
         sub = 1;

.fdef a_temp (21d,22d,p)
         ld_a = 3              / value from int. bus to reg. A
         out_a = 0;            / A output to adder and bus .fdef b_temp (23d,23d,p)
         ld_b = 1;             / value from int. bus to reg. B .fdef sum (24d,25d,p)
         ld_sum = 3            / computation result to sum reg.
         out_sum = 0;          / sum output onto int. bus .fdef feature_gap (26d,26d,p)   / search interval on contour
         out_gap = 0;

.fdef shift_right (27d,28d,p)
         ld_shift = 3          / load for divide by 2
         out_shift = 0;        / results to int. bus .fdef min_width (29d,29d,p)     / minimum feature width
         out_min = 0;

.fdef max_width (30d,30d,p)     / maximum feature width
         out_max = 0;

.fdef start_x (31d,32d,p)       / X for starting contour point
         ld_xstart = 3
         out_xstart = 0;

.fdef start_y (33d,34d,p)       / Y for starting contour point
         ld_ystart = 3
         out_ystart = 0;
```

```
.fdef x_counter (35d,37d,p)
      ld_xcount = 6           / load X address counter
      x_rgt_prep = 3          / prepare to count up
      x_rgt = 7               / count up
      x_lft_prep = 5          / prepare to count down
      x_lft = 7;              / count down .fdef y_counter (38d,40d,p)
      ld_ycount = 6           / load Y address counter
      y_down_prep = 3         / prepare to count up
      y_down = 7              / count up
      y_up_prep = 5           / prepare to count down
      y_up = 7;               / count down .fdef bit_map (41d,42d,p)
      snap = 3                / new image into bit-map RAM
      image_out = 2;          / display stored image .fdef direction (43d,43d,p)
      direc_prep = 0          / prepare to clock
      ld_direc = 1;           / load direction reg.

.fdef contour_hardware (44d,45d,p)
      select_micro = 2        / microcode control of X,Y
                              /   counters, turn off
                              /   hardware clock
      select_hardware = 0     / give hardware control
      follow_contour = 1;     / let clock start running
                              /.   for contour following .fdef countdown (46d,47d,p)   / counter used for loops
      ld_decrement = 1        /   initial value for loop
      prep_decrement = 2      /   prepare to count down
      decrement = 3;          /   count down .fdef scratchpad (48d,49d,p)  / scratchpad RAM
      write_scratch = 0
      read_scratch = 1;

.fdef scratch_addr (50d,54d,p) / address to scratchpad RAM
      clr_scr_addr = 37       /   clear address counter
      ld_scr_addr = 23        /   load address counter
      out_scr_addr = 13       /   counter value to int. bus
      scr_up_prep = 31        /   prepare to count up
      scr_up = 33             /   count up
      scr_down_prep = 32      /   prepare to count down
      scr_down = 33;          /   count down .fdef contour_addr (55d,58d,p) / address to contour RAMs
      clr_cont_addr = 10      /   clear both addr. counters
      out_cont_addr = 4       /   counter A val. to int. bus
      a_addr_up = 16          /   increment counter A
      b_addr_up = 15          /   increment counter B
      a_b_up = 17;            /   increment both counters .fdef addr_select (59d,59d,p) / which counter addresses RAMs
      a_select = 0
      b_select = 1;
```

```
.fdef xy_in_out (60d,65d,p)      / access to contour RAMs and
                                 / to X,Y counters
        get_xcount = 27          /   current X counter value
        get_ycount = 33          /   current Y counter value
        get_ramx = 47            /   X contour point from RAM
        get_ramy = 53            /   Y contour point from RAM
        put_ramx = 65            /   write to X contour RAM
        put_ramy = 72            /   write to Y contour RAM
        put_both_rams = 60       /   write value to both RAMs
        xy_to_rams = 37          /   X,Y counter outputs to
                                 /     RAM data lines
        xy_disable = 77;         /   turn off all enables to
                                 /     this part of the board .fdef outside_access (66d,66d,p)
        allow_access = 1         / allow outside access
        clr_request = 0;         / deny access -- board busy .org 0;

allow_access;
wait_req:   allow_access, cjp, br = wait_req, not_request;

////////////////////////////////////////////////////////////
////////////////////////////////////////////////////////////
/ did user request a snap ?
////////////////////////////////////////////////////////////
//////////////////////////////////////////////////////////// chk_snap: clr_request, cjp, br = do_snap, take_snap;
          cjp, br = chk_complete, true;

cont;
do_snap:    snap;
wait1_blank: snap, cjp, br = wait1_blank, not_vblank;
wait_visible: snap, cjp, br = wait_visible, vblank;
wait2_blank: snap, cjp, br = wait2_blank, not_vblank;

////////////////////////////////////////////////////////////
////////////////////////////////////////////////////////////
/ did user request complete contour following ?
////////////////////////////////////////////////////////////
//////////////////////////////////////////////////////////// cont;
chk_complete: cjp, br = do_complete, whole_contour;
              cjp, br = do_features, find_features;
              cjp, br = chk_local, true;

////////////////////////////////////////////////////////////
/ first, find and record all off-on transitions in a
/ clockwise circuit of the edge of the screen -- these
/ are potential starting points for contour following
////////////////////////////////////////////////////////////
```

```
                cont;
do_complete:    clr_scr_addr;

select_micro!;      / redefine control word br = ledge, data_from_br;
                    br = ledge, data_from_br, ld_xcount;
                    br = bedge, data_from_br;
                    br = bedge, data_from_br, ld_ycount;
                    cjp, br = start_in, pixel_on;
                    br = 0, data_from_br, ld_b;
                    cjp, br = follow_left, true;

cont;
start_in:       br = 1, data_from_br, ld_b;

cont;
follow_left:    y_up_prep;
                y_up;
                    cjp, br = down_one, beyond_edge;
                    cjp, br = left_on, pixel-on;
                    br = 0, data_from_br, ld_b;
                    cjp, br = follow_left, true;

cont;
left_on:        br = 0, data_from_br, ld_a;
                out_a;
                out_a, cjp, br = lstart, equal;
                cjp, br = follow_left, true;

cont;
lstart:         get_xcount, edge_x;
                get_xcount, edge_x, write_scratch;
                get_ycount, edge_y;
                get_ycount, edge_y, write_scratch, scr_up_prep;
                scr_up, br = 1, data_from_br, ld_b;
                cjp, br = follow_left, true;

cont;
down_one:       y_down_prep;
                y_down;

cont;
follow_top:     x_rgt_prep;
                x_rgt;
                    cjp, br = left_one, beyond_edge;
                    cjp, br = top_on, pixel_on;
                    br = 0, data_from_br, ld_b;
                    cjp, br = follow_top, true;

cont;
top_on:         br = 0, data_from_br, ld_a;
                out_a;
                out_a, cjp, br = tstart, equal;
                cjp, br = follow_top, true;
```

```
                cont;
tstart:         get_xcount, edge_x;
                get_xcount, edge_x, write_scratch;
                get_ycount, edge_y;
                get_ycount, edge_y, write_scratch, scr_up_prep;
                scr_up, br = 1, data_from_br, ld_b;
                cjp, br = follow_top, true;

cont;
left_one:       x_lft_prep;
                x_lft;

cont;
follow_right:   y_down_prep;
                y_down;
                cjp, br = up_one, beyond_edge;
                cjp, br = right_one, pixel_on;
                br = 0, data_from_br, ld_b;
                cjp, br = follow_right, true;

cont;
right_on:       br = 0, data_from_br, ld_a;
                out_a;
                out_a, cjp, br = rstart, equal;
                cjp, br = follow_right, true;

cont;
rstart:         get_xcount, edge_x;
                get_xcount, edge_x, write_scratch;
                get_ycount, edge_y;
                get_ycount, edge_y, write_scratch, scr_up_prep;
                scr_up, br = 1, data_from_br, ld_b;
                cjp, br = follow_right, true;

cont;
up_one:         y_yp_prep;
                y_up;

cont;
follow_bot:     x_lft_prep;
                x_lft;
                cjp, br = right_one, beyond_edge;
                cjp, br = bot_on, pixel_on;
                br = 0, data_from_br, ld_b;
                cjp, br = follow_bot, true;

cont;
bot_on:         br = 0, data_from_br, ld_a;
                out_a;
                out_a, cjp, br = bstart, equal;
                cjp, br = follow_bot, true;

cont;
bstart:         get_xcount, edge_x;
                get_xcount, edge_x, write_scratch;
                get_ycount, edge_y;
                get_ycount, edge_y, write_scratch, scr_up_prep;
```

```
            scr_up, br = 1, data_from_br, ld_b;
            cjp, br = follow_bot, true;

cont;
right_one:  x_rgt_prep;
            x_rgt;

///////////////////////////////////////////////////////
/ all possible starting points have been found --
/ terminate the table with a '0'
/////////////////////////////////////////////////////// select_hardware!;      / return counter clock control to
                                   / hardware -- redefine microword
            br = 0, data_from_br, ld_a;
            out_a, edge_x;
            out_a, edge_x, write_scratch;
            out_a, edge_y;
            out_a, edge_y, write_scratch;

///////////////////////////////////////////////////////
/ initialize curve count table -- set count of curves
/ to '0' and write a '1' into the table pointer --
/ position '1' in the curve count table is where the
/ first curve starting address will be written
/////////////////////////////////////////////////////// clr_scr_addr;
            br = 0, data_from_br, ld_a;
            out_a, curve_count;
            out_a, curve_count, write_scratch;
            br = 1, data_from_br, ld_a;
            out_a, table_pointer;
            out_a, table_pointer, write_scratch;

///////////////////////////////////////////////////////
/ check that at least one starting edge point was found
/////////////////////////////////////////////////////// clr_cont_addr;
            clr_scr_addr;
            edge_x, read_scratch, ld_b;
            br = 0, data_from_br, ld_a;
            out_a;
            out_a, cjp, br = cont_done, equal;

///////////////////////////////////////////////////////
/ get first value from table and put it into the X,Y
/ start registers and counters -- also put curve start
/ address into curve count table
/////////////////////////////////////////////////////// cont;
new_loop:   edge_x, read_scratch;
            edge_x, read_scratch, ld_xstart, ld_xcount;
            edge_y, read_scratch;
```

```
            edge_y, read_scratch, ld_ystart, ld_ycount;
            table_pointer, read_scratch;
            table_pointer, read_scratch, ld_a;
            out_a, ld_scr_addr;
            out_cont_addr, curve_count;
            out_cont_addr, curve_count, write_scratch,
                    scr_up_prep;
            scr_up;
            out_scr_addr, ld_a;
            clr_scr_addr, out_a, table_pointer;
            out_a, table_pointer, write_scratch;

///////////////////////////////////////////////////////
/ determine starting direction for hardware contour
/ following -- if starting pixel is on left edge,
/ starting direction is left, if starting pixel is on
/ top edge, starting direction is up, etc.
/////////////////////////////////////////////////////// out_xstart, ld_b;
            br = ledge, data_from_br, ld_a;
            out_a;
            out_a, cjp, br = lft_dir, equal;

br = redge, data_from_br, ld_a;
            out_a;
            out_a, cjp, br = rgt_dir, equal;

out_ystart, ld_b;
            br = tedge, data_from_br, ld_a;
            out_a;
            out_a, cjp, br = up_dir, equal;

br = bedge, data_from_br, ld_a;
            out_a;
            out_a, cjp, br = dn_dir, equal;

cont;
lft_dir:    br = 7, data_from_br, direc_prep;
            br = 7, data_from_br, ld_direc;
            cjp, br = start_clk, true;

cont;
rgt_dir:    br = 113, data_from_br, direc_prep;
            br = 113, data_from_br, ld_direc;
            cjp, br = start_clk, true;

cont;
up_dir:     br = 55, data_from_br, direc_prep;
            br = 55, data_from_br, ld_direc;
            cjp, br = start_clk, true;

cont;
dn_dir:     br = 156, data_from_br, direc_prep;
            br = 156, data_from_br, ld_direc;
```

////////////////////////////////////////////////////////
/ starting direction information has been given to
/ hardware -- allow hardware clock to start -- hardware
/ contour following will take over until a screen
/ edge is reached again
////////////////////////////////////////////////////////

```
            cont;
start_clk:  xy_to_rams!;        / counter outputs to RAM inputs --
                                / temporarily redefine microword
            follow_contour;
            follow_contour;
run_clk:    follow_contour, cjp, br = rmv_point, contour_done;
            follow_contour, cjp, br = run_clk, true;
```

////////////////////////////////////////////////////////
/ when hardware stops on edge point, that point must
/ be removed from the table of edge points in the
/ scratchpad RAM
////////////////////////////////////////////////////////

```
            xy_disable!;        / redefine -- back to normal
rmv_point:  clr_scr_addr;

cont;
next_pnt:   edge_x, read_scratch, ld_b;
            br = 0, data_from_br, ld_a;
            out_a;
            out_a, cjp, br = chk_display, equal;

x_close:    get_xcount, ld_b;
            edge_x, read_scratch, sub;
            edge_x, read_scratch, sub, ld_sum;
            out_sum, ld_b;
            br = 2, data_from_br, ld_a;
            out_a;
            out_a, cjp, br = y_close, greater;
            scr_up_prep;
            scr_up, cjp, br = next_pnt, true;

cont;
y_close:    get_ycount, ld_b;
            edge_y, read_scratch, sub;
            edge_y, read_scratch, sub, ld_sum;
            out_sum, ld_b;
            br = 2, data_from_br, ld_a;
            out_a;
            out_a, cjp, br = both_close, greater;
            scr_up_prep;
            scr_up, cjp, br = next_pnt, true;

cont;
both_close: edge_x, read_scratch, ld_b;
            br = 0, data_from_br, ld_a;
            out_a;
            out_a, cjp, br = tab_end, equal;
            scr_up_prep;
            scr_up;
```

```
        edge_x, read_scratch, ld_a, scr_down_prep;
        scr_down;
        out_a, edge_x;
        out_a, edge_x, write_scratch, scr_up_prep;
        scr_up;

edge_y, read_scratch, ld_a, scr_down_prep;
        scr_down;
        out_a, edge_y;
        out_a, edge_y, write_scratch, scr_up_prep;
        scr_up;
        cjp, br = both_close, true;
```

////////////////////////////////////////////////////
/ after entry has been removed from table, and all
/ remaining entries moved up, check whether the edge
/ point reached by the contour hardware is the same as
/ the original starting point
////////////////////////////////////////////////////

```
        cont;
tab_end: get_xcount, ld_b;
        out_xstart, sub;
        out_xstart, sub, ld_sum;
        out_sum, ld_b;
        br = 2, data_from_br, ld_a;
        out_a;
        out_a, cjp, br = cmp_ystart, greater;
        cjp, br = start_clk, true;

cont;
cmp_ystart: get_ycount, ld_b;
        out_ystart, sub;
        out_ystart, sub, ld_sum;
        out_sum, ld_b;
        br = 2, data_from_br, ld_a;
        out_a;
        out_a, cjp, br = new_start, greater;
        cjp, br = start_clk, true;
```

////////////////////////////////////////////////////
/ if this particular contour loop is complete,
/ increment the count of curves and record the end
/ address of the curve in the curve count table --
/ then write a '0' into the contour RAMs as a delimiter,
/ and check if there are any further starting points
/ remaining in the scratchpad table
////////////////////////////////////////////////////

```
        cont;
new_start: clr_scr_addr;
        curve_count, read_scratch;
        curve_count, read_scratch, ld_b;
        br = 1, data_from_br, add;
        br = 1, data_from_br, add, ld_sum;
        out_sum, curve_count;
        out_sum, curve_count, write_scratch;
```

```
        table_pointer, read_scratch;
        table_pointer, read_scratch, ld_a;
        out_a, ld_scr_addr;
        out_cont_addr, curve_count;
        out_cont_addr, curve_count, write_scratch,
                scr_up_prep;
        scr_up;
        out_scr_addr, ld_a;
        clr_scr_addr, out_a, table_pointer;
        out_a, table_pointer, write_scratch;

clr_scr_addr;
        edge_x, read_scratch, ld_b;
        br = 0, data_from_br, ld_a;
        out_a;
        out_a, cjp, br = cont_done, equal;

br = 0, data_from_br, put_both_rams;
        a_addr_up;
        cjp, br = new_loop, true;
```

```
////////////////////////////////////////////////////////
/ all contour points have been recorded -- terminate
/ contour RAM tables with 300 '0's -- in case software
/ looks through the table at intervals, make sure
/ termination will not be missed
//////////////////////////////////////////////////////// cont;
cont_done:  push, br = 300d, true;
            br = 0, data_from_br;
            br = 0, data_from_br, put_both_rams;
            a_addr_up;
            rfct;
```

```
////////////////////////////////////////////////////////
////////////////////////////////////////////////////////
/ did user request detection of specified features ?
////////////////////////////////////////////////////////
//////////////////////////////////////////////////////// cont;
chk_features:  cjp, br = do_features, find_features;
                cjp, br = chk_display, true;
```

```
////////////////////////////////////////////////////////
/ first, set the two sets of counters to the start of
/ the contour tables, with counter A set to the first
/ address, and counter B offset by the specified feature
/ search interval -- also, clear the scratchpad address
/ counter in order to start at the beginning of the
/ finger (feature) table
////////////////////////////////////////////////////////
```

```
                        cont;
do_features:  clr_cont_addr, clr_scr_addr;

br = 0, data_from_br, ld_a;
              out_a, finger_x;
              out_a, finger_x, write_scratch;
              out_a, finger_y;
              out_a, finger_y, write_scratch;
              out_a, finger_loc;
              out_a, finger_loc, write_scratch;

out_gap, ld_decrement;

cont;
offset:    b_addr_up, prep_decrement, cjp, br = init_count,
                  count_down;
           decrement, cjp, br = offset, true;

///////////////////////////////////////////////////
/ initialize total finger count to '0' -- also set the
/ count of features for the first curve to '0'
/////////////////////////////////////////////////// cont;
init_count:   br = 0, data_from_br, ld_a;
              out_a, finger_count;
              out_a, finger_count, write_scratch;
              br = 1, data_from_br, ld_a;
              out_a, table_pointer;
              out_a, table_pointer, write_scratch;

out_a, ld_scr_addr;
              br = 0, data_from_br, ld_a;
              out_a, finger_count;
              out_a, finger_count, write_scratch;

clr_scr_addr;

///////////////////////////////////////////////////
/ calculate distance -- deltax + deltay -- between the
/ two contour points under consideration
/////////////////////////////////////////////////// cont;
survey_tab:   b_select, get_ramx, ld_b;

br = 0, data_from_br, ld_a;
              out_a;
              out_a, cjp, br = next_curve, equal;

a_select, get_ramx, sub;
              a_select, get_ramx, sub, ld_sum;
              out_sum, ld_a;

b_select, get_ramy, ld_b;
              a_select, get_ramy, sub;
```

```
        a_select, get_ramy, sub, ld_sum;
        out_sum, ld_b;

out_a, add;
        out_a, add, ld_sum;
        out_sum, ld_b;
```

////////////////////////////////////////////////////
/ check whether the calculated distance falls within
/ the specified bounds for feature width
////////////////////////////////////////////////////

```
        out_max;
        out_max, cjp, br = nextpoint, less;
        out_min;
        out_min, cjp, br = nextpoint, greater;
```

////////////////////////////////////////////////////
/ if width is correct, check that it is a 'positive'
/ feature -- e.g. a fingertip rather than the base of
/ a finger
////////////////////////////////////////////////////

```
         b_select, get_ramx, ld_b;
         a_select, get_ramx;
         a_select, get_ramx, cjp, br = bx_less, greater;
ax_less: a_select, get_ramx, ld_b;
         b_select, get_ramx, sub;
         b_select, get_ramx, sub, ld_sum;
         out_sum;
         out_sum, ld_shift;
         cjp, br = x_mid, true;

cont;
bx_less: a_select, get_ramx, sub;
         a_select, get_ramx, sub, ld_sum;
         out_sum;
         out_sum, ld_shift;

cont;
x_mid:  out_shift, add;
        out_shift, add, ld_sum;
        out_sum, ld_xcount;

b_select, get_ramy, ld_b;
         a_select, get_ramy;
         a_select, get_ramy, cjp, br = by_less, greater;
ay_less: a_select, get_ramy, ld_b;
         b_select, get_ramy, sub;
         b_select, get_ramy, sub, ld_sum;
         out_sum;
         out_sum, ld_shift;
         cjp, br = y_mid, true;
```

```
                    cont;
by_less:    a_select, get_ramy, sub;
            a_select, get_ramy, sub, ld_sum;
            out_sum;
            out_sum, ld_shift;

cont;
y_mid:      out_shift, add;
            out_shift, add, ld_sum;
            out_sum, ld_ycount;

///////////////////////////////////////////////////////
/ pixel at middle of line segment has been found -- now
/ look at it and at its 8 neighbors -- if at least 5
/ are on, it is probably a positive feature -- go on to
/ look past the two end points of the line segment, away
/ from the center of the feature -- if both end points
/ are off, assume that it is indeed a positive feature
/////////////////////////////////////////////////////// br = 0, data_from_br, ld_b;
            cjp, br = neigh_0, pixel_on;
            cjp, br = nextpoint, true;

select_micro!;      / give microcode control of X,Y
                                / counters -- redefine microword
            cont;
neigh_0:    x_lft_prep;
            x_lft;
            cjp, br = neigh_1, pixel_on;

br = 1, data_from_br, add;
            br = 1, data_from_br, add, ld_sum;
            out_sum, ld_b;

cont;
neigh_1:    y_up_prep;
            y_up;
            cjp, br = neigh_2, pixel_on;

br = 1, data_from_br, add;
            br = 1, data_from_br, add, ld_sum;
            out_sum, ld_b;

cont;
neigh_2:    x_rgt_prep;
            x_rgt;
            cjp, br = neigh_3, pixel_on;

br = 1, data_from_br, add;
            br = 1, data_from_br, add, ld_sum;
            out_sum, ld_b;

cont;
neigh_3:    x_rgt_prep;
            x_rgt;
            cjp, br = neigh_4, pixel_on;
```

```
                br = 1, data_from_br, add;
                br = 1, data_from_br, add, ld_sum;
                out_sum, ld_b;

cont;
neigh_4:        y_down_prep;
                y_down;
                cjp, br = neigh_5, pixel_on;

br = 1, data_from_br, add;
                br = 1, data_from_br, add, ld_sum;
                out_sum, ld_b;

cont;
neigh_5:        y_down_prep;
                y_down;
                cjp, br = neigh_6, pixel_on;

br = 1, data_from_br, add;
                br = 1, data_from_br, add, ld_sum;
                out_sum, ld_b;

cont;
neigh_6:        x_lft_prep;
                x_lft;
                cjp, br = neigh_7, pixel_on;

br = 1, data_from_br, add;
                br = 1, data_from_br, add, ld_sum;
                out_sum, ld_b;

cont;
neigh_7:        x_lft_prep;
                x_lft;
                cjp, br = how_many_off, pixel_on;

br = 1, data_from_br, add;
                br = 1, data_from_br, add, ld_sum;
                out_sum, ld_b;

select_hardware!;     / control of X,Y counters back
                                      / to hardware -- redefine ///////////////////////////////////////////////////////
/ after surveying all 9 pixels at the middle of the
/ line segment, look at count of off pixels to determine
/ if the feature is positive or negative
/////////////////////////////////////////////////////// cont;
how_many_off:   br = 5, data_from_br, ld_a;
                out_a;
                out_a, cjp, br = end_points, greater;
                cjp, br = nextpoint, true;
```

```
//////////////////////////////////////////////////////
/ go one pixel past both end points of the line
/ segment -- if it is a positive feature, there should
/ be off pixels on both sides of the feature
////////////////////////////////////////////////////// cont;
end_points:   b_select, get_ramx, ld_b;
              a_select, get_ramx;
              a_select, get_ramx, cjp, br = bx_smaller,
                   greater;

ax_smaller:   b_select, get_ramy, ld_b;
              a_select, get_ramy;
              a_select, get_ramy, cjp, br = case_1, greater;
              cjp, br = case_2, true;

cont;
bx_smaller:   b_select, get_ramy, ld_b;
              a_select, get_ramy;
              a_select, get_ramy, cjp, br = case_3, greater;
              cjp, br = case_4, true;
     case_1:  a_select, get_ramx, ld_b;
              br = 1, data_from_br, sub;
              br = 1, data_from_br, sub, ld_sum;
              out_sum, ld_xcount;

a_select, get_ramy, ld_b;
              br = 1, data_from_br, add;
              br = 1, data_from_br, add, ld_sum;
              out_sum, ld_ycount;

cjp, br = nextpoint, pixel_on;

b_select, get_ramx, ld_b;
              br = 1, data_from_br, add;
              br = 1, data_from_br, add, ld_sum;
              out_sum, ld_xcount;

b_select, get_ramy, ld_b;
              br = 1, data_from_br, sub;
              br = 1, data_from_br, sub, ld_sum;
              out_sum, ld_ycount;

cjp, br = nextpoint, pixel_on;
              cjp, br = found_feature, true;

cont;
     case_2:  a_select, get_ramx, ld_b;
              br = 1, data_from_br, sub;
              br = 1, data_from_br, sub, ld_sum;
              out_sum, ld_xcount;

a_select, get_ramy, ld_b;
              br = 1, data_from_br, sub;
              br = 1, data_from_br, sub, ld_sum;
              out_sum, ld_ycount;
```

```
        cjp, br = nextpoint, pixel_on;

b_select, get_ramx, ld_b;
        br = 1, data_from_br, add;
        br = 1, data_from_br, add, ld_sum;
        out_sum, ld_xcount;

b_select, get_ramy, ld_b;
        br = 1, data_from_br, add;
        br = 1, data_from_br, add, ld_sum;
        out_sum, ld_ycount;

cjp, br = nextpoint, pixel_on;
        cjp, br = found_feature, true;

cont;
case_3: a_select, get_ramx, ld_b;
        br = 1, data_from_br, add;
        br = 1, data_from_br, add, ld_sum;
        out_sum, ld_xcount;

a_select, get_ramy, ld_b;
        br = 1, data_from_br, add;
        br = 1, data_from_br, add, ld_sum;
        out_sum, ld_ycount;

cjp, br = nextpoint, pixel_on;

b_select, get_ramx, ld_b;
        br = 1, data_from_br, sub;
        br = 1, data_from_br, sub, ld_sum;
        out_sum, ld_xcount;

b_select, get_ramy, ld_b;
        br = 1, data_from_br, sub;
        br = 1, data_from_br, sub, ld_sum;
        out_sum, ld_ycount;

cjp, br = nextpoint, pixel_on;
        cjp, br = found_feature, true;

cont;
case_4: a_select, get_ramx, ld_b;
        br = 1, data_from_br, add;
        br = 1, data_from_br, add, ld_sum;
        out_sum, ld_xcount;

a_select, get_ramy, ld_b;
        br = 1, data_from_br, sub;
        br = 1, data_from_br, sub, ld_sum;
        out_sum, ld_ycount;

cjp, br = nextpoint, pixel_on;

b_select, get_ramx, ld_b;
        br = 1, data_from_br, sub;
```

```
                br = 1, data_from_br, sub, ld_sum;
                out_sum, ld_xcount;

b_select, get_ramy, ld_b;
                br = 1, data_from_br, add;
                br = 1, data_from_br, add, ld_sum;
                out_sum, ld_ycount;
                cjp, br = nextpoint, pixel_on;
                cjp, br = found_feature, true;

///////////////////////////////////////////////////
/ if feature was found, move both counters ahead by
/ half of the specified feature search distance -- this
/ will leave counter A pointing to the middle pixel in
/ the contour segment which has been identified as a
/ feature of interest
/////////////////////////////////////////////////// cont;
found_feature:  out_gap;
                out_gap, ld_shift;
                out_shift, ld_decrement;

cont;
midpoint:  a_b_up, prep_decrement, cjp, br = record, count_down;
                decrement, cjp, br = midpoint, true;

///////////////////////////////////////////////////
/ record the X,Y value of the middle pixel in the
/ feature table
/////////////////////////////////////////////////// cont;
record:    a_select, get_ramx, finger_x;
                a_select, get_ramx, finger_x, write_scratch;
                a_select, get_ramy, finger_y;
                a_select, get_ramy, finger_y, write_scratch;
                a_select, out_cont_addr, finger_loc;
                a_select, out_cont_addr, finger_loc, write_scratch;
                scr_up_prep;
                scr_up;

br = 0, data_from_br, ld_a;
                out_a;
                out_a, finger_x;
                out_a, finger_x, write_scratch;
                out_a, finger_y;
                out_a, finger_y, write_scratch;
                out_a, finger_loc;
                out_a, finger_loc, write_scratch;

///////////////////////////////////////////////////
/ increment the total count of fingers and the count of
/ fingers for this particular curve
///////////////////////////////////////////////////
```

```
        out_scr_addr;
        out_scr_addr, ld_xstart;     / use for temp. storage clr_scr_addr, finger_count;
        finger_count, read_scratch, ld_b;
        br = 1, data_from_br, add;
        br = 1, data_from_br, add, ld_sum;
        out_sum, finger_count;
        out_sum, finger_count, write_scratch;

table_pointer;
        table_pointer, read_scratch, ld_a;
        out_a, ld_scr_addr, finger_count;
        finger_count, read_scratch, ld_b;
        br = 1, data_from_br, add;
        br = 1, data_from_br, add, ld_sum;
        out_sum, finger_count;
        out_sum, finger_count, write_scratch;

out_xstart, ld_scr_addr;

////////////////////////////////////////////////////////
/ move both counters again by half the specified
/ feature search distance -- this is necessary to
/ prevent multiple finds on the same feature
//////////////////////////////////////////////////////// out_shift, ld_decrement;
        cont;
spacer: a_b_up, prep_decrement, cjp, br = nextpoint,
           count_down;
        decrement, cjp, br = spacer, true;

////////////////////////////////////////////////////////
/ if a '0' was found in the contour table, check whether
/ this is a delimiter (single '0') between different
/ contour curves, or whether it marks the end of all
/ contour points (multiple '0's)
//////////////////////////////////////////////////////// cont;
next_curve: a_b_up;
           a_select, get_ramx, ld_b;
           br = 0, data_from_br, ld_a;
           out_a;
           out_a, cjp, br = chk_display, equal;

////////////////////////////////////////////////////////
/ another curve follows -- advance pointer for finger
/ count table and initialize count of features for the
/ next curve to '0'
//////////////////////////////////////////////////////// out_scr_addr;
           out_scr_addr, ld_xstart;     / temporary storage
```

```
            clr_scr_addr, table_pointer;
            table_pointer, read_scratch, ld_b;
            br = 1, data_from_br, add;
            br = 1, data_from_br, add, ld_sum;
            out_sum, table_pointer;
            out_sum, table_pointer, write_scratch;
            out_sum, ld_scr_addr;
            br = 0, data_from_br, ld_a;
            out_a, finger_count;
            out_a, finger_count, write_scratch;

out_xstart, ld_scr_addr;

///////////////////////////////////////////////////
/ if another curve follows, must advance counter to
/ point to the beginning of that curve -- advance both
/ counters by the feature search distance
/////////////////////////////////////////////////// out_gap, ld_decrement;
            cont;
new_curve:  a_b_up, prep_decrement, cjp, br = nextpoint,
                count_down;
            decrement, cjp, br = new_curve, true;

cont;
nextpoint:  a_b_up, cjp, br = survey_tab, true;

///////////////////////////////////////////////////
///////////////////////////////////////////////////
/ did user request limited contour following ?
///////////////////////////////////////////////////
/////////////////////////////////////////////////// cont;
chk_local:  cjp, br = do_local, local_contour;
            cjp, br = chk_display, true;

///////////////////////////////////////////////////
/ given a specified starting point, determine if the
/ point is on -- if not, survey the eight neighbors for
/ a pixel which is not off -- starting point given to
/ the board may not always be exact
/////////////////////////////////////////////////// select_micro!;    / give microcode control of X,Y
                              / counters -- redefine
            cont;
do_local:   out_xstart, ld_xcount;
            out_ystart, ld_ycount;

cjp, br = init_on, pixel_on;
            cjp, br = dir_00, true;

cont;
dir_00:     x_lft_prep;
            x_lft;
```

```
                cjp, br = new_center, pixel_on;

cont;
dir_11:     y_up_prep;
            y_up;
            cjp, br = new_center, pixel_on;

cont;
dir_22:     x_rgt_prep;
            x_rgt;
            cjp, br = new_center, pixel_on;

cont;
dir_33:     x_rgt_prep;
            x_rgt;
            cjp, br = new_center, pixel_on;

cont;
dir_44:     y_down_prep;
            y_down;
            cjp, br = new_center, pixel_on;

cont;
dir_55:     y_down_prep;
            y_down;
            cjp, br = new_center, pixel_on;

cont;
dir_66:     x_lft_prep;
            x_lft;
            cjp, br = new_center, pixel_on;

cont;
dir_77:     x_lft_prep;
            x_lft;
            cjp, br = new_center, pixel_on;
            out_xstart, ld_xcount;
            out_ystart, ld_ycount;
            cjp, br = all_done, true;

cont;
new_center: get_xcount;
            get_xcount, ld_xstart;
            get_ycount;
            get_ycount, ld_ystart;

////////////////////////////////////////////////////
/ given a starting pixel which is on, determine a
/ proper starting direction for contour following --
/ want to start contour following algorithm with a
/ neighbor which is off
//////////////////////////////////////////////////// cont;
init_on:    br = 0, data_from_br, ld_b;
```

```
dir_0: x_lft_prep;
       x_lft;
       cjp, br = dir_1, pixel_on;

br = 7, data_from_br, direc_prep;
       br = 7, data_from_br, ld_direc;
       br = 1, data_from_br, add;
       br = 1, data_from_br, add, ld_sum;
       out_sum, ld_b;

cont;
dir_1: y_up_prep;
       y_up;
       cjp, br = dir_2, pixel_on;

br = 25, data_from_br, direc_prep;
       br = 25, data_from_br, ld_direc;
       br = 1, data_from_br, add;
       br = 1, data_from_br, add, ld_sum;
       out_sum, ld_b;

cont;
dir_2: x_rgt_prep;
       x_rgt;
       cjp, br = dir_3, pixel_on;

br = 55, data_from_br, direc_prep;
       br = 55, data_from_br, ld_direc;
       br = 1, data_from_br, add;
       br = 1, data_from_br, add, ld_sum;
       out_sum, ld_b;

cont;
dir_3: x_rgt_prep;
       x_rgt;
       cjp, br = dir_4, pixel_on;

br = 71, data_from_br, direc_prep;
       br = 71, data_from_br, ld_direc;
       br = 1, data_from_br, add;
       br = 1, data_from_br, add, ld_sum;
       out_sum, ld_b;

cont;
dir_4: y_down_prep;
       y_down;
       cjp, br = dir_5, pixel_on;

br = 113, data_from_br, direc_prep;
       br = 113, data_from_br, ld_direc;
       br = 1, data_from_br, add;
       br = 1, data_from_br, add, ld_sum;
       out_sum, ld_b;

cont;
dir_5: y_down_prep;
       y_down;
```

```
        cjp, br = dir_6, pixel_on;

br = 132, data_from_br, direc_prep;
        br = 132, data_from_br, ld_direc;
        br = 1, data_from_br, add;
        br = 1, data_from_br, add, ld_sum;
        out_sum, ld_b;

cont;
dir_6:  x_lft_prep;
        x_lft;
        cjp, br = dir_7, pixel_on;

br = 156, data_from_br, direc_prep;
        br = 156, data_from_br, ld_direc;
        br = 1, data_from_br, add;
        br = 1, data_from_br, add, ld_sum;
        out_sum, ld_b;

cont;
dir_7:  x_lft_prep;
        x_lft;
        cjp, br = on_off, pixel_on;
        br = 166, data_from_br, direc_prep;
        br = 166, data_from_br, ld_direc;
        br = 1, data_from_br, add;
        br = 1, data_from_br, add, ld_sum;
        out_sum, ld_b;

////////////////////////////////////////////////////////
/ after surveying all 8 neighbors check whether pixel
/ is a valid contour point -- if all neighbors are on
/ or all neighbors are off, contour following is not
/ possible -- simply return the original starting point
//////////////////////////////////////////////////////// cont;
on_off: out_xstart, ld_xcount;
        out_ystart, ld_ycount;

br = 0, data_from_br, ld_a;
        out_a;
        out_a, cjp, br = all_done, equal;

br = 8d, data_from_br, ld_a;
        out_a;
        out_a, cjp, br = all_done, equal;

////////////////////////////////////////////////////////
/ now allow hardware to do actual contour following
//////////////////////////////////////////////////////// select_hardware!;      / control of X,Y counters to
                               / hardware -- redefine
        clr_cont_addr;
        xy_to_rams!;           / counter outputs to RAM inputs
```

```
                follow_contour;
loc_cont:       follow_contour, cjp, br = all_done, count_down;
                follow_contour, cjp, br = loc_cont, true;

////////////////////////////////////////////////////////////
////////////////////////////////////////////////////////////
/ did user request display of bit-map RAM contents ?
////////////////////////////////////////////////////////////
//////////////////////////////////////////////////////////// xy_disable!;    / turn off X,Y counters to
                                / contour RAM data lines
chk_display:    cjp, br = do_display, display;
                cjp, br = all_done, true;
                image_out, allow_access;
do_display:     image_out, allow_access, cjp, br = do_display,
                        not_request;
                allow_access, cjp, br = wait_req, true;

cont;
all_done:       jz;

.end;
```

What is claimed is:

1. A device for perceiving, processing and responding in real time to a demonstrative behavior of at least one unmarked participant, said device comprising:

means spaced from at least one unmarked participant for distinguishing the participant from a background;

means for imaging each distinguished participant and providing an image thereof;

means for digitizing said image provided by said means for imaging;

means connected to said means for digitizing for ascertaining features of the digitized image;

means connected to said means for ascertaining for identifying at least one characteristic of at least one of said ascertained features, each of the identified characteristics being a selected one of a location and a movement of a respective ascertained feature, said means for identifying providing a control parameter in response to the at least one identified characteristic;

means responsive to said control parameter for processing said ascertained features of said digitized image to provide a signal indicative of a demonstrative behavior of said participant; and means for responding in real time to said signal indicative of a demonstrative behavior of said participant.

2. The device as defined in claim 1, wherein the means for imaging includes a video camera.

3. The device as defined in claim 1, wherein the means for processing includes control means for controlling said means for ascertaining features of said digitized image.

4. The device as defined in claim 1, wherein the means for digitizing includes an analog to digital convertor receiving said image from said means for imaging, means for digitally thresholding an output of said analog to digital convertor with hysteresis, and means for filtering a digital noise from an output of said means for digitally thresholding.

5. The device as defined in claim 1, wherein said digitized image includes boundary information corresponding to a boundary between the distinguished participant and said background, and the means for imaging and the means for ascertaining are constituted in part by multiple processor means for operating in parallel, said multiple processor means including means for extracting various types of information from said boundary information in said digitized image.

6. The device as defined in claim 5, wherein said at least one unmarked participant includes a left-most participant and a right-most participant and said means for imaging produces a plurality of horizontal scan lines, and wherein the means for ascertaining includes means for performing an analysis of said left-most and said right-most participant as distinguished from said background on each said horizontal scan line.

7. The device as defined in claim 1, wherein said at least one unmarked participant includes a left-most participant and a right-most participant and said means for imaging produces a plurality of horizontal scan lines, and wherein said means for ascertaining includes a micro-coded hardware processor means having means for extracting information from a boundary between said background and said left-most and right-most participants on each said horizontal scan line.

8. The device as defined in claim 1, wherein the means for ascertaining includes means for performing a directed search in a bit-map image for a participant versus background transition and means for capturing and storing said bit-map image from said digitized image.

9. The device as defined in claim 1, wherein the means for ascertaining includes hardware processor means for capturing a bit-map image from said digitized image and means for extracting requested participant versus background transition points from said bit-map image.

10. The device as defined in claim 1, wherein the means for ascertaining includes means for tracing an image contour of said digitized image and means for detecting features of various size by point to point measurements along said image contour.

11. The device as defined in claim 1, wherein the means for ascertaining includes micro-coded hardware processor means including means for capturing a bit-map image from said digitized image, means for tracing contours of said participant in an image area in said bit-map image, and means for finding features of a specified size along said contours.

12. The device as defined in claim 1, wherein said means for ascertaining includes dedicated hardware means for detecting a finger feature of said participant.

13. The device as defined in claim 1, wherein said means for imaging includes a plurality of means for vision processing adapted to accumulate data and the means for ascertaining includes means for processing data accumulated by said plurality of means for vision processing.

14. The device as defined in claim 1, wherein the means for identifying includes means for controlling predetermined perception parameters and has means for processing said perception parameters.

15. The device as defined in claim 1, wherein the means for identifying includes means for controlling a parameter and means responsive to said parameter for placing said device in a selected one of an alternative interactive mode and an alternative interactive function.

16. The device as defined in claim 1, wherein said means for responding includes means for color graphics display.

17. The device as defined in claim 1, wherein the means for responding includes means for generating a video image of said participant, means for creating and displaying graphic objects, and means for real time interaction of said participant's video image with said graphic objects.

18. The device as defined in claim 1, wherein the means for responding includes means for projecting an image of said participant, means for projecting a controllable graphic object and means for real time replacement of said participant's projected image by said controllable graphic object.

19. A device as defined in claim 1, wherein the means for responding includes means for synthesizing sound.

20. A process for controlling a device adapted to perform a plurality of operations to perceive, process and respond in real time to a plurality of demonstrative behaviors of at least one unmarked participant, said process comprising:
associating each of a plurality of demonstrative behaviors of at least one unmarked participant with a respective operation of said device;
generating low level code associated with said operations, said low level code including at least one independent primitive module;
controlling a plurality of special purpose processors of said device in accordance with said low level code; and
sequencing the control of said special purpose processors in accordance with a performed sequence of said demonstrative behaviors so as to realize real time performance of a corresponding sequence of said operations.

21. A device for representing graphically, in real time, at least one unmarked participant in a demonstrative activity associated with said participant, said device comprising:
means for obtaining a contrasting image of said unmarked participant;
means for digitizing said contrasting image to provide a digitized image;
means for timing control of said means for obtaining said contrasting image;
means for ascertaining features of said digitized image;
means connected to said means for timing control for storing ascertained features of said digitized image and for processing said stored ascertained features of said digitized image;
means for identifying at least one characteristic of at least one of said ascertained features, each of the identified characteristics being a selected one of a location and a movement of a respective ascertained feature of said digitized image;
means responsive to said means for identifying for controlling said means for storing and for processing so as to provide information indicative of a demonstrative activity of said participant; and
means responsive to said information for updating a selected one of a graphic and a manipulatable image representation, in real time, of a demonstrative behavior of said participant.

22. The device as defined in claim 21, wherein the means for updating includes means for representing said participant graphically conjointly with a simultaneous image of said participant and is constituted in part by said means for obtaining a contrasting image of said participant.

23. The device as defined in claim 22, wherein said means for updating includes means for providing a simultaneous digitized image representation.

24. The device as defined in claim 22, wherein said means for updating includes means for providing a simultaneous video image representation.

25. The device as defined in claim 21, wherein the means for updating includes means for representing said participant graphically and means for obtaining synthesized sound, said means for obtaining synthesized sound being connected to said means for storing and processing said digitized image.

26. The device as defined in claim 21, wherein the means for updating includes means for representing graphically, in real time, said unmarked participant conjointly and simultaneously with a representation of a pre-selected environment for said participant.

27. The device as defined in claim 26, wherein the pre-selected environment is a graphic environment.

28. The device as defined in claim 27, wherein the pre-selected environment is a fractal graphic environment.

29. The device as defined in claim 26, wherein the pre-selected environment is a synthesized sound environment.

30. The device as defined in claim 26, wherein the pre-selected environment is a synthesized color environment.

31. The device as defined in claim 26, wherein the pre-selected environment is a synthesized sound and color environment.

32. The device as defined in claim 21, wherein said at least one participant is represented graphically on screen means.

33. The device as defined in claim 21, wherein the means for updating further includes means for special effect processing.

34. A method for perceiving, processing and responding, in real time, to a demonstrative behavior of at least one unmarked participant, the method comprising the steps of:
   imaging said unmarked participant to obtain an analog image of the same;
   converting said image from analog to digital form to obtain a digitized form of said image;
   first processing said digitized form of said image to obtain desired features from said digitized form of said image;
   storing said obtained desired features;
   synchronizing said first processing and storing by establishing at least one characteristic of said desired features for identification and comparison with said stored desired features, each of the characteristics being a selected one of a location and a movement of a respective feature;
   further processing, in real time, said stored desired features and said at least one characteristic to provide processed features; and
   projecting, in an imaged environment, a processed image of said processed features, in real time.

35. The method as defined in claim 34, wherein the environment in which said processed image is projected is a graphic environment.

36. The method as defined in claim 34, wherein said processed image is projected with said processed features as graphic features.

37. The method as defined in claim 34, wherein said processed image is projected with said processed features as color.

38. The method as defined in claim 34, wherein said processed image is projected with said processed features as sound.

39. The method as defined in claim 34, wherein the further processing includes obtaining vision processor features; storing the obtained vision processor features; graphically processing said at least one characteristic with the stored vision processor features; adding graphic effects to the graphically processed vision processor features and using the result for further processing, in real time, said at least one characteristic.

* * * * *